United States Patent [19]

Taniguchi

[11] Patent Number: 5,716,586
[45] Date of Patent: Feb. 10, 1998

[54] EXHAUST GAS PURIFIER

[75] Inventor: Hiroyuki Taniguchi, Kariya, Japan

[73] Assignee: Kabushiki Kaisha Toyoda Jidoshokki Seisakusho, Kariya, Japan

[21] Appl. No.: 503,602

[22] Filed: Jul. 18, 1995

Related U.S. Application Data

[63] Continuation-in-part of Ser. No. 229,824, Apr. 19, 1994, abandoned.

[30] Foreign Application Priority Data

| Jun. 3, 1993 | [JP] | Japan | 5-133437 |
| Sep. 7, 1993 | [JP] | Japan | 5-221949 |
| Sep. 13, 1993 | [JP] | Japan | 5-227207 |

[51] Int. Cl.⁶ ............................................. F01N 3/10
[52] U.S. Cl. .............. 422/173; 422/174; 422/179; 422/180; 422/107; 422/108; 422/109; 60/285; 60/286; 55/282
[58] Field of Search ................... 422/173, 174, 422/177, 179, 180, 107, 108, 109, 110; 60/285, 286, 303; 55/282, 283

[56] References Cited

U.S. PATENT DOCUMENTS

| 4,372,111 | 2/1983 | Virk et al. | 60/274 |
| 4,427,418 | 1/1984 | Kogiso et al. | 55/287 |
| 4,505,106 | 3/1985 | Frankenberg et al. | 60/286 |
| 4,512,786 | 4/1985 | Sakurai et al. | 55/282 |
| 4,516,993 | 5/1985 | Takeuchi et al. | 55/283 |
| 4,544,388 | 10/1985 | Rao et al. | 55/282 |
| 4,665,690 | 5/1987 | Nomoto et al. | 60/286 |
| 5,517,848 | 5/1996 | Hosoya et al. | 73/23.31 |

*Primary Examiner*—Christopher Kim
*Attorney, Agent, or Firm*—Brooks Haidt Haffner & Delahunty

[57] ABSTRACT

An exhaust gas purifier includes a filter for collecting particulates, a heater for firing collected particulates, a blower for feeding air, and a controller for controlling power supplied to the heater and air flow rate of the blower. The air flow rate is varied in a regeneration period for improving the regeneration efficiency and for protecting the filter. In one embodiment, the air flow rate is initially reduced in the burning period and increased after burning in the radial direction at the downstream portion of the filter. The burning propagation speed, the heat generation and the increase of the temperature of the filter are limited by suppressing the air flow rate in the burning period. The particulates remaining in the downstream portion of the filter due to the suppressed air flow rate supplied in the burning period can be burned subsequently by supplying an increased air flow rate after the burning period.

34 Claims, 42 Drawing Sheets

FIG. 2
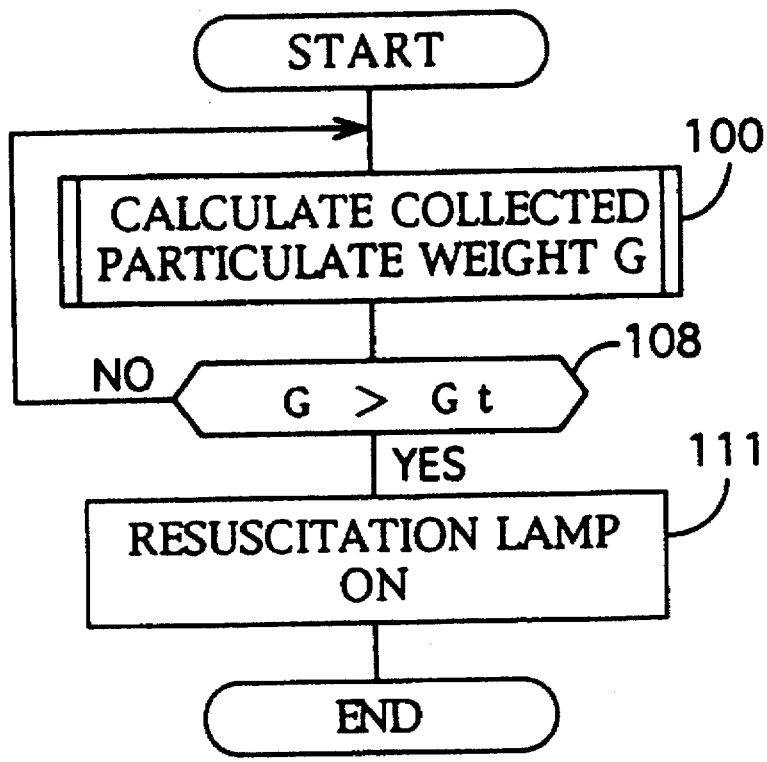
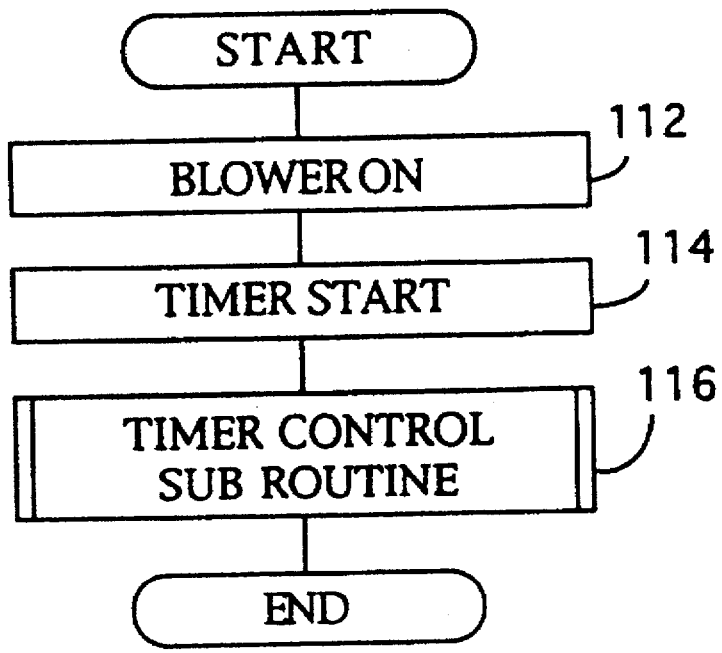

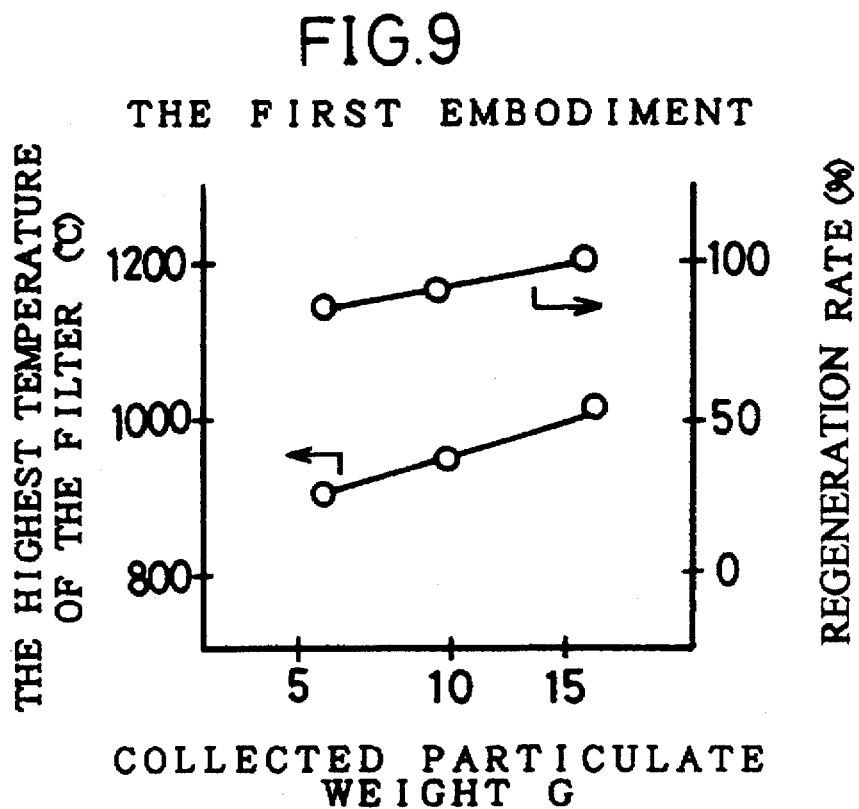
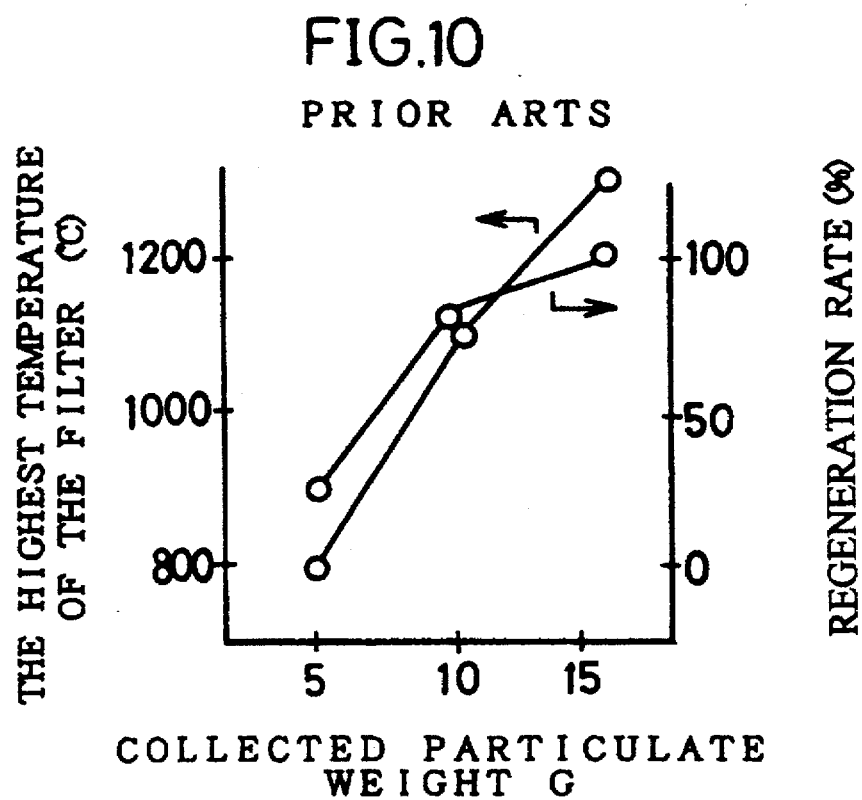

FIG.11
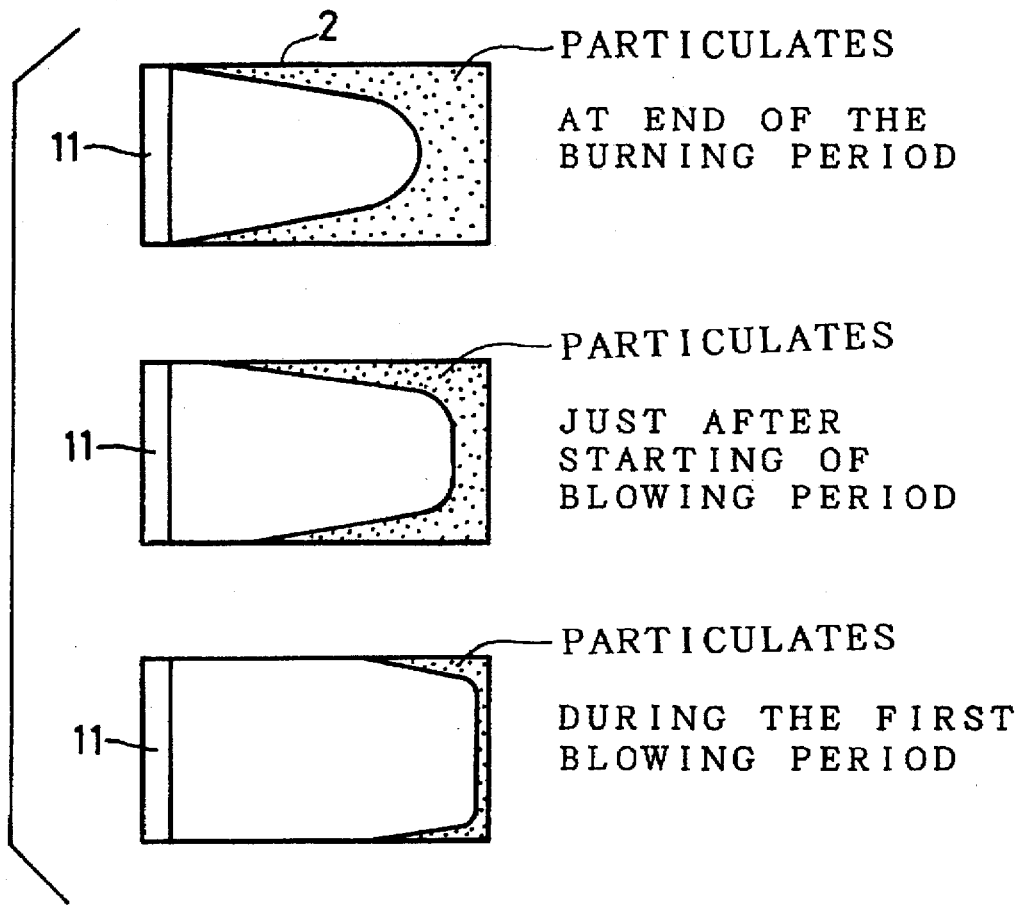
PARTICULATES
AT END OF THE BURNING PERIOD
PARTICULATES
JUST AFTER STARTING OF BLOWING PERIOD
PARTICULATES
DURING THE FIRST BLOWING PERIOD
FIG.12(a) PRIOR ART
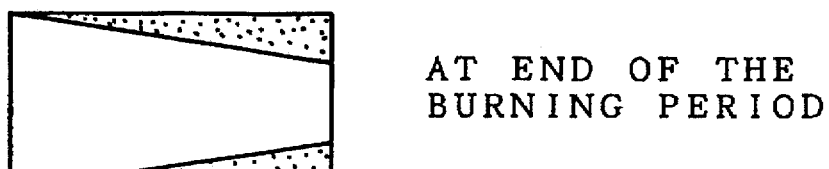
AT END OF THE BURNING PERIOD
DURING THE FIRST BLOWING PERIOD
→ BLOW OUT
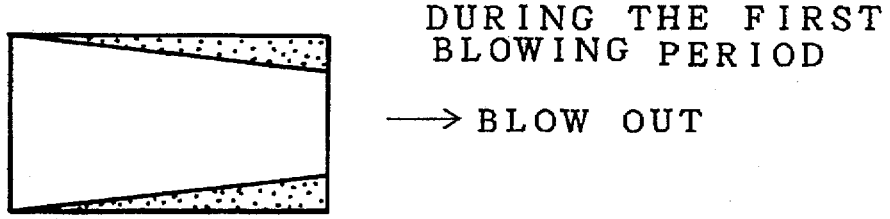
FIG.12(b) PRIOR ART

EXHAUST GAS PURIFIER

This application is a Continuation-in-Part of application Ser. No. 08/229,824, filed Apr. 19, 1994, now abandoned.

BACKGROUND OF THE INVENTION

1. Field of the Invention

The present invention relates to an exhaust gas purifier in which the particles discharged from a diesel engine are burnt.

2. Description of the Prior Art

Japanese Unexamined Patent Publication (KOKAI) No.4-255518 discloses an exhaust gas purifier. The filter of the exhaust gas purifier is regenerated by supplying electric power to a heater placed near the upstream end surface of the filter, located near the engine, and by feeding air into the upstream portion from between the diesel engine and the filter. The particles collected in the filter are burned from the upstream side portion of the filter, nearest to the engine to the downstream portion of the filter, located farther from the engine.

In the traditional exhaust gas purifier, it is known to continue the air supply after cutting off the heating power supplied to the heater in order to cool the filter.

However, it is difficult to burn out perfectly the particles collected in every portion of the filter. Especially, it is difficult to burn out the particles collected in the outer peripheral portion of the downstream side of the filter.

If the particles remain in the filter after the regeneration operation, it causes a pressure loss through the filter. Further, it causes high temperature burning in the filter during subsequent operation, and there is the possibility of accidental melting or cracking of the filter.

We researched and found that the particles remain in the outer peripheral portion of the downstream side of the filter because the outer peripheral portion of the filter is greatly cooled and the burning propagation velocity in the outer peripheral portion of the filter becomes slower than that in the center portion or the middle portion in the radial direction of the filter.

It is possible to increase the air flow rate in order to increase the temperature of the outer peripheral portion of the filter. However, the particles in the outer peripheral portion of the filter can not be decreased by merely increasing the air flow rate.

However, we found that an increase of the air flow rate results in an increase in the burning propagation speed in the center portion of the filter. Consequently, as shown in FIG. 12(a), most of the fed air flows through the center portion in the radial direction of the filter and does not result in an increase of the air flow rate in the outer peripheral portion of the filter. Accordingly, the particles remain in the outer peripheral portion of the filter as shown in FIG. 12(b). Further, an increase of the air flow rate may result in the melting or cracking of the filter due to an increase in the temperature of the filter.

Prior filter regeneration apparatus which utilize a predetermined constant flow of air and a predetermined constant power via the blower and the heater, are likely to cause melting or cracking of even a ceramic filter as the temperature of the filter becomes too high during burning period in which the particles collected in the filter are burned.

In order to solve this problem, cutting off of the heating power by a temperature feedback control system in order to protect the filter can be achieved by a temperature signal outputted from a temperature sensor placed near the filter. However, the above mentioned temperature feedback control system employing a temperature sensor is not sufficiently effective to protect the filter because the temperature sensor placed external to the filter can not respond rapidly and the response of the feedback control system is slow.

Consequently, we found that the efficiency of the regeneration gradually decreases in spite of employing every control method because the filter is gradually blocked by the particles which are not burned.

SUMMARY OF THE INVENTION

A first object of the present invention is to realize an exhaust gas purifier which can burn out the particles almost completely. A second object of the present invention is to realize an exhaust gas purifier which can prevent the filter from cracking or melting during the regeneration operation. A third object of the present invention is to realize an exhaust gas purifier which performs with high regeneration efficiency.

The first feature of the invention

To achieve the above objects, the exhaust gas purifier of the present invention comprises control means which changes the air flow rate in accordance with a predetermined pattern during the regeneration period in which the air supply means or the heating means is driven. Consequently, the air flow rate in the present invention is not constant, namely it varies in accordance with each regeneration stage.

For example, if abundant air is supplied before the firing of the particles, the filter is cooled by the air. Accordingly, the firing of the particles is delayed and the required heating power increases. If the air is lessened before the firing of the particles, differences of the temperature at the respective portions of the filter become large and causes particles to remain after the burning. Further, if the air flow rate is larger than the optimum one in a burning period, the burning propagation speed of the particles at the center portion in the radial direction of the filter is further increased in comparison with the burning propagation speed of the particles at the outer peripheral portion of the filter. Consequently, the supplied air is blown through the center portion of the filter after all of the collected particles in the center portion of the filter has burned out. As the result, the air flow rate at the outer peripheral portion of the filter decreases and some of the particles collected at the outer peripheral portion in the downstream side of the filter remain. The present invention is intended to solve the above problems and to operate a preferred regeneration of the filter.

The second feature of the invention

The particles collected at the center portion in the radial direction in the downstream side of the filter are burned very slowly by controlling the heating means and the air supply means. For example, the temperature of the center portion of the downstream side of the filter is kept lower than the temperature (normally about 600° C.) at which particles can be burned.

Then, if a burning area approaches the downstream end surface of the filter, the air flow rate is increased and the burning speed at the center portion in the radial direction of the filter is increased sufficiently. Therefore, the air is supplied sufficiently to a middle portion and to the outer peripheral portion in the radial direction in the downstream side of the filter and the particles in those portions are burned sufficiently. Accordingly, the remaining particles collected in every portion of the filter, especially, in the downstream side of the outer peripheral portion of the filter decreases sufficiently.

Also, the filter regeneration period includes a burning period and a first blowing period. The first blowing period starts after completion of the burning period. In the burning period, the air flow rate is decreased. Therefore, lack of the supplied air for burning particles in the downstream portion of the filter occurs because oxygen in the decreased air supplied into the filter is consumed in the upstream portion and middle stream portion of the filter before the oxygen in the decreased air reaches the downstream portion of the filter. However, differences of the temperature and the burning speed between the center portion of the filter and the outer peripheral portion of the filter become small. The burning period is continued until the burning area approaches the downstream side end surface of the filter. In the first blowing period, the air flow rate is increased. Therefore, the particles remaining in the filter are burned quickly. Namely, by decreasing the air flow rate, the burning period has a slower burning propagation speed and heat generation less than those in the burning period of the prior regeneration apparatus. Therefore, on account of the above mentioned decreasing of the temperature difference and the above mentioned decreasing of the air flow rate, the difference of the burning propagation speed between the center portion and the outer peripheral portion is reduced. Accordingly, the particles in the outer peripheral portion and the middle portion can be burned sufficiently before the burning area approaches the downstream side end surface in the center portion of the filter.

The particles collected at the outer portion in the downstream portion of the filter can not be burned before the particles collected at the center portion in the downstream portion of the filter are perfectly burned out. However, most particles collected in the outer peripheral portion of the filter have been already burned out and the particles remaining in the outer peripheral portion of the filter can be burned out by feeding a large volume of air which compensates for the blowing out through the center portion of the filter.

As above mentioned, the invention achieves the following objects: the decreasing of the remaining particles; and the protection of the filter.

The third feature of the invention

The heating power supplied in the first blowing period is reduced in comparison with the heating power supplied in the burning period or the heating power supplied in a period which starts after the first blowing period. Therefore, it is possible to save heating power and to prevent the temperature of the filter from rising excessively.

The fourth feature of the invention

A second blowing period is set after the first blowing period. The air flow rate in the second blowing period is greater than the air flow rate in the first blowing period. Therefore, the filter can be rapidly cooled after the completion of the burning of the particles.

The fifth feature of the invention

The air flow rate supplied in a pre-heating period which is established in the period between the commencement of supplying the heating power and firing of the particles is further increased in comparison with the air flow rate supplied in the burning period. Therefore, a difference of the temperature, a difference of the firing timing and a difference of the burning condition between each portion of the filter can be reduced.

The sixth feature of the invention

The pre-heating period is established in the period between the commencement of the supply of heating power to the heater and firing of the particles. The heating power in the pre-heating period is less than the heating power supplied in the burning period. Therefore, the period for burning of the particles is extended. However, the temperature variations among respective portions of the filter are reduced. Specially, the differences of temperature between the various portions of the upstream end surface of the filter are reduced. Further, the differences of the burning speed in the respective portions in the radial direction of the filter are reduced. The air supply in the pre-heating period further decreases the differences of the temperature and burning propagation speed. If the differences of the temperature among the respective portions of the filter are large, there is the possibility of its cracking.

The seventh feature of the invention

The heating power supplied in the pre-heating period is controlled in accordance with a detected air flow rate. If as in the prior art the air flow rate is varied in the pre-heating period, the temperature of the particles and the filter will be varied in the pre-heating period. Therefore, the highest temperature of the filter is varied and the possibility is present of cracking or melting of the filter occurring. Further the particles remaining after completion of the burning increases (that is, the regeneration efficiency decreases).

In the present embodiment, the heating power is increased when the air flow rate has risen and the heating power is decreased when the air flow rate has been reduced. Accordingly, the variation of the temperature of the filter and the remaining particles can be reduced in spite of the variation of the air flow rate.

The eighth feature of the invention

The mass of air supply (called the air mass flow) is calculated or determined by correcting the detected air flow rate in accordance with a detected temperature of air. Further, the air flow rate is controlled by a feedback control method in accordance with the mass of air supply for corresponding the mass of air supply with a predetermined mass value. Therefore, it is prevented that the variation of the mass of air supply varies in relation to the variation of the temperature of air. Accordingly, the cracking or melting of the filter and the decrease of the regeneration efficiency caused by the variation of the temperature of air are prevented even if the present invention apparatus operates in a cold area or a hot area.

The ninth embodiment of the invention

The mass of air supply is calculated or determined by correcting the detected air flow rate in accordance with a detected pressure of air. Further, the air flow rate is controlled by a feedback control method in accordance with the mass of air supply for corresponding the mass of air supply with a predetermined mass value. Therefore, it is prevented that the mass of air supply varies in accordance with the variation of the pressure of air. Accordingly, the cracking or melting of the filter and the decrease of the regeneration efficiency caused by the variation of the pressure of air are prevented in spite of the operation of the apparatus in any altitudes.

The tenth feature of the invention

The pre-cooling period is established before a commencement of the supply of heating power. In the pre-cooling period, the blower and the air supply means are driven during a predetermined period and the filter is cooled before the heating. Therefore, the variation of the temperature of the filter at a commencement of the pre-heating is reduced in spite of the variation of the temperature of the filter before starting of the regeneration operation. Accordingly, the cracking or melting of the filter and the decrease of the regeneration efficiency caused by the variation of the temperature of the filter are prevented in spite of the regeneration operation being started immediately after stopping of the engine.

BRIEF DESCRIPTION OF THE DRAWINGS

A more complete appreciation of the present invention and many of its advantages will be readily obtained as the same becomes better understood by reference to the following detailed description when considered in connection with the accompanying drawings, all of which form a part of the disclosure:

FIG. 2 is a flow chart illustrating the main routine of regeneration operation of the exhaust gas purifier shown in FIG. 1.

FIG. 9 is a graph showing the relation between the highest temperature of the filter and the weight of particles collected in the filter employed by the preferred embodiment 1.

FIG. 10 is a graph showing the relation between the highest temperature of the filter and the weights of particles collected in a filter employed by the prior art.

FIG. 11 is a schematic sectional side elevation of the filter, and shows particles in the filter employed by the preferred embodiment 1.

FIGS. 12(a) and (b) are a schematic sectional side elevations of the filter, and shows particles in the filter employed in the prior art.

DETAILED DESCRIPTION OF THE EMBODIMENTS

Having generally described the present invention, further understanding can be obtained in reference to the specific embodiments which are provided herein for purposes of illustration only and are not intended to limit the scope of the appended claims.

EMBODIMENT 1

Figure 1:
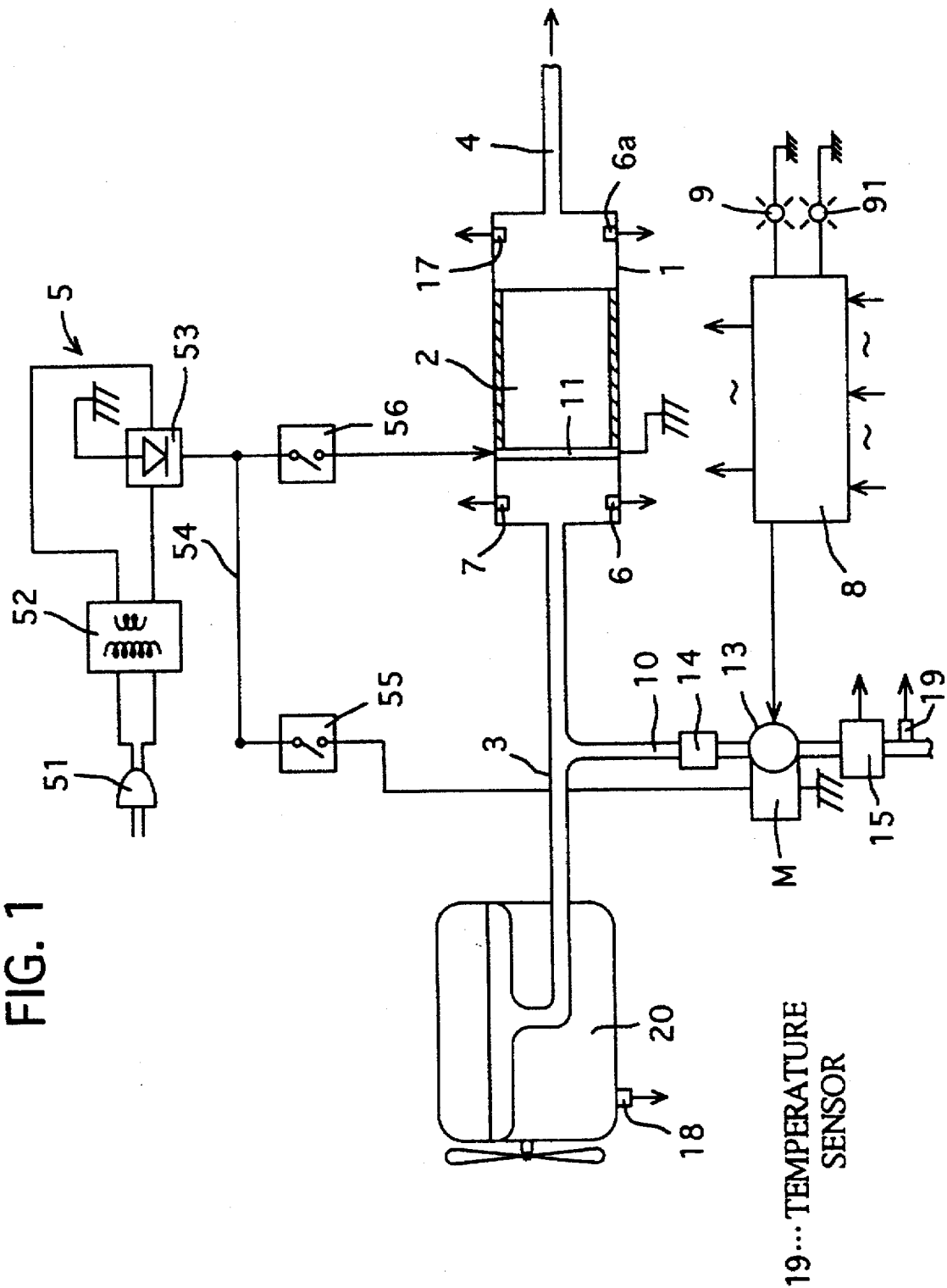
FIG. 1 is a basic block diagram illustrating the preferred embodiment 1 of an exhaust gas purifier according to the present invention.

FIG. 1 illustrates the embodiment 1 of the exhaust gas purifier according to the present invention. The exhaust gas purifier has a case 1 for accommodating a filter. Both of the end surfaces of the case 1 are almost closed. An upstream side pressure sensor 7, a temperature sensor 6, a heater (a heating means) 11, a filter 2, a downstream side pressure sensor 17 and a temperature sensor 6a are sequentially arranged from the upstream side toward the downstream side in the case 1. An outlet of the upstream portion of the exhaust tube 3 of a diesel engine 20 is connected to the upstream end wall of the case 1, and a downstream portion 4 of the exhaust tube 3 is connected to the downstream end wall of the case 1.

One end of an air supply tube 10 is connected to the upstream portion of the exhaust tube 3. The other end of the air supply tube 10 is connected, via an electromagnetic valve 14, to the outlet of a blower (or an air pump) 13 for air supply. The inlet of the blower 13 is communicated with the atmosphere via an inlet tube which has an air flow rate sensor 15 and an air temperature sensor 19 for sensing air flow rate and the temperature of the air.

Electric power supplied to the heater 11 and to a motor M for driving the blower 13 are controlled by a controller (a control means) 8. A rotation speed sensor 18 attached to the diesel engine 20 sends a rotation speed signal to the controller 8. The controller 8 has an I/O interface and an A/D converter (not shown). The controller 8 controls switches 55 and 56 for controlling the heater 11 and the blower 13, respectively, and turns on an alarm lamp 9 when an accident occurs. 91 is a lamp for indicating a regeneration period. The controller 8 controls the voltage applied to the motor M in accordance with a signal of the air flow rate sensor 15 by means of a common feedback control method employing a duty ratio, and controls exactly the air flow rate of the blower 13 to correspond with a predetermined level.

A power supply equipment 5 consists of a plug 51, a transformer 52 and a full wave rectifier 53. The plug 51 is provided for connection to a commercial power source line (not shown). The direct voltage outputted by the full wave rectifier 53 is supplied to the motor M and the heater 11 via the semiconductor power switches 55 and 56.

The filter 2 consists of a ceramic having a honeycomb structure and a column shape and is made of porous cordierite and is supported by the case 1. An expandable ceramic mat (not shown) is inserted between the outer peripheral surface of the filter 2 and the inner peripheral surface of the case 1. The filter 2 has many small through holes (not shown) penetrating in the axial direction. The edge portions of half of the holes facing the upstream side are blocked by plugs (not shown) and the edge portions of another half of the holes facing toward the downstream side are blocked by plugs (not shown). Further, each hole of which the edge portion facing the upstream side is blocked is adjacent to each hole of which the edge portion facing the downstream side is blocked. When the exhaust gas penetrates through the porous wall between the above two types of holes, the particles are collected in the porous wall. Both ends of the filter 2 are respectively opposed to the inner end surfaces of the case 1.

The heater 11 consists of a resistance line made of Kanthal and is arranged along the end surface facing the upstream side.

Figure 3:
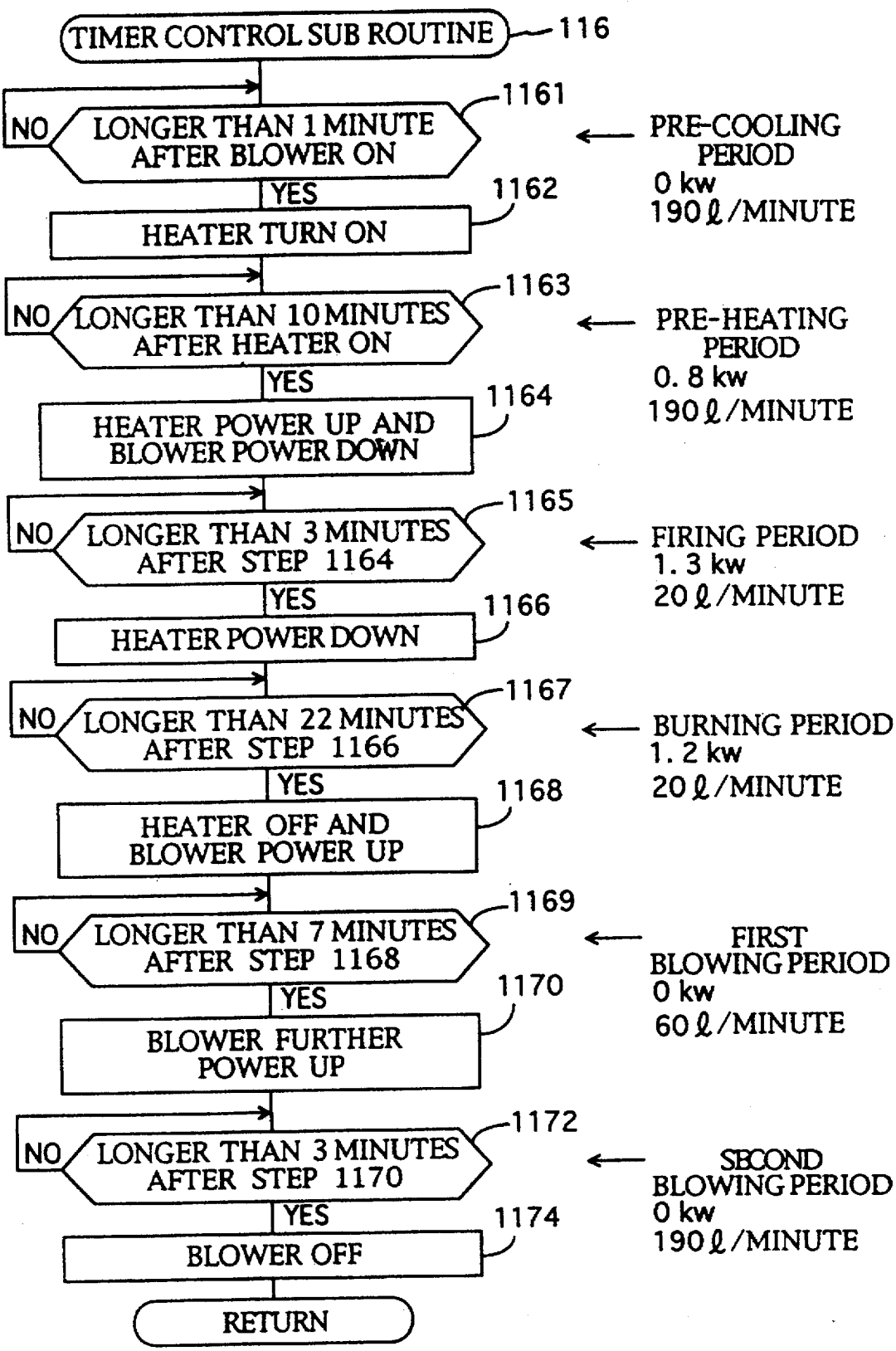
FIG. 3 is a flow chart illustrating a timer control subroutine of that shown in FIG. 2.

The operation of the above apparatus is described below.
Collection of particles:

The exhaust gas exhausted out of the diesel engine 20 flows in the case 1 via the upstream portion of the exhaust tube 3. The particles included in the exhaust gas are collected by the filter 2. The purified exhaust gas is discharged from the downstream portion of the exhaust tube 4.
Regeneration of the filter:

The regeneration operation of the filter 2 is shown by flowcharts in FIGS. 2 and 3.

In the present embodiment, electric power is supplied to the apparatus by an outside power source during the period in which the engine is stopped. The apparatus is started manually.

The controller 8 opens the electromagnetic valve 14 when the regeneration operation is commenced and closes it after the regeneration operation has ended.

FIG. 2 shows the filter regeneration subroutine consisting of the filter regeneration timing decision subroutine having steps from 100 to 111 and the filter regeneration operation subroutine having steps from 112 to 116.

When the engine 20 is operating, the filter regeneration timing decision subroutine having steps from 100 to 111 is commenced. Initially, at the step 100, the subroutine calculates the weight of the collected particles. In the subroutine which detects the weight of the collected particles, the weight G of the collected particles is estimated from a map stored in the memory of the controller 8 by inputting the pressures P1 and P2 of the exhaust gas detected by the pressure sensors 7 and 17, the engine rotation speed n detected by the rotation speed sensor 18 and the temperature T of the exhaust gas detected by the temperature sensor 6. Next, at the step 108, it is judged whether the estimated weight G is greater than the predetermined value Gt or not.

If G is not greater than Gt, the routine returns to the step 100. If G is more than Gt, the step 111 is executed. At the step 111, the lamp 91 is turned on, which indicates the filter regeneration timing. Then the routine is over.

Then, if an operator notices the illumination of the lamp 91 and turns on a regeneration switch (not shown) while the engine 20 is stopped, the filter regeneration operation subroutine is started. In the filter regeneration operation subroutine, the blower 13 is driven at the step 112 initially, next the timer (not shown) in the controller 8 is started at the step 114 and the timer control subroutine for regenerating the filter is executed at the step 116. Then, the regeneration operation is over.

The above mentioned timer control subroutine is shown in FIG. 3. The timer control subroutine executes the power supply control and the air flow rate control in accordance with the timer. The timer control subroutine executes the pre-cooling period, the pre-heating period, the firing period, the burning period and the after-cooling period in order. The after-cooling period consists of the first blowing period and the second blowing period.

The pre-cooling period:

Initially, at the step 1161, power is supplied to the blower 13 for 1 minute. The air flow rate (volume of the air supply) of the blower 13 is 190 liters per minute. The filter 2 and the heater 11 are cooled by the air, and they are almost equal to the temperature of the fresh air (namely room temperature) in spite of variation of the temperatures of the filter 2 and the heater 11 before starting the regeneration operation. Therefore, the variation of the firing timing of the collected particles and the excessive temperature of the filter 2 are prevented.

The pre-heating period:

At the step 1162, the heating power of 0.8 kW is supplied to the heater 11. The air flow rate of the blower 13 is 190 liters per minute. At the next step 1163, the routine waits 10 minutes after supplying the heating power to the heater 11. Then, the next step 1164 is executed. Therefore, every portion of the filter 2 is heated by the hot air from the heater 11.

The firing period:

At the step 1164, the heating power of 1.3 kW is supplied to the heater 11 and the air flow rate of 20 liters per minute is supplied by the blower 13. At the next step 1165, the routine waits 3 minutes after increasing the heating power at the step 1164. Therefore, the temperature of particles collected at the front end surface (the upstream side end surface) of the filter 2 rises rapidly and the particles are fired. Especially, by decreasing of the air flow rate, the temperature of the particles collected near the front end surface of the filter 2 is increased quickly.

The burning period:

At the next step 1166, the heating power of 1.2 kW is supplied to the heater 11 and the air flow rate of 20 liters per minute is supplied by the blower 13. Therefore, the burning occurs from the front (the upstream side) end surface of the filter 2 toward the downstream direction. However, the burning propagation speed decreases gradually as proceeding of the burning toward the downstream direction because the air flow rate and the heat generation of the burning particles are not substantial.

The oxygen density of the air which exists at the extreme front point of the burning gradually decreases as proceeding of the burning toward the downstream direction because the oxygen is consumed gradually by the particles remaining in the upstream portions of the filter. Further, as the downstream portion is far apart from the heater 11, the downstream portion of the filter receives less heat generated by the heater 11. Therefore, the burning propagation speed becomes slow in the downstream portion of the filter 2 and almost stops near the back end surface (the downstream side end surface) of the filter 2. The burning propagation speed at the center portion, in the radial direction, of the filter 2 is faster in comparison with the outer peripheral portion of the filter 2 because the outer peripheral portion of the filter 2 loses the heat from the outer peripheral surface of the filter 2.

Accordingly, even after burning at the center portion has finished on account of the lack of heat being supplied, near the back end surface of the filter 2, the burning at the outer peripheral portion and the middle portion in the radial direction is still going on. The temperature of the center portion, in the downstream of the filter 2 drops less than 600° C. Therefore, it is prevented that the burning reaches the back end surface of the filter and the supplied air is blown out through the center portion of the filter 2. Consequently, the burning of the particles in the middle portion and the outer peripheral portion can be continued on account of the sufficient amount of air being supplied. The burning at the middle portion and the outer peripheral portion of the filter 2 is continued after the burning at the center portion has mostly stopped near the back end surface of the filter 2.

In this embodiment, the highest temperature of the filter is 900° C. when the weight of the collected particles is 8.6 g.

The after-cooling period:

The first blowing period:

At the next step 1168, the supply of the heating power is halted and the air flow rate of the blower 13 is 60 liters per minute. At the next step 1169, the routine waits 7 minutes after the step 1168.

On account of the increasing of the air supply, burning of the particles in each burning portion of the filter 2 is accelerated and they can be perfectly burned out in a short period. After the ending of the burning in the center portion of the filter 2, the supplied air blows out through the center portion of the filter 2. However, the burning of the particles in the middle portion and the outer peripheral portion of the filter 2 has already been commenced and the temperature of the outer peripheral portion of the filter 2 has been heated sufficiently to maintain the burning process.

The second blowing period:

At the next step 1170, the air flow rate of the blower 13 is further increased from 60 liter per minute to 190 liters per minute. At the next step 1172, the routine waits 3 minutes after the step 1170. The filter 2 and the heater 11 having the high temperature are rapidly cooled on account of the increase of the air supply. Therefore, deterioration of the filter 2 and the heater 11 is prevented and the regeneration period can be shortened.

The experimental results are shown from FIG. 4 to FIG. 12.

Figure 4:
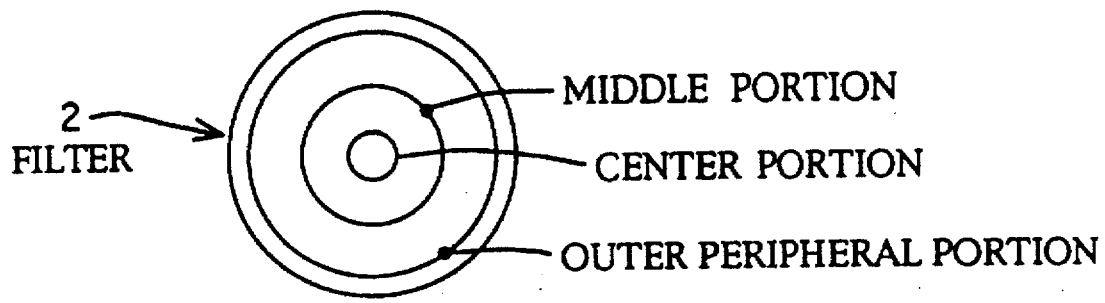
FIG. 4 is a schematic elevation of the filter and shows the arrangement of temperature sensors therein as employed by the preferred embodiment 1.
Figure 5:
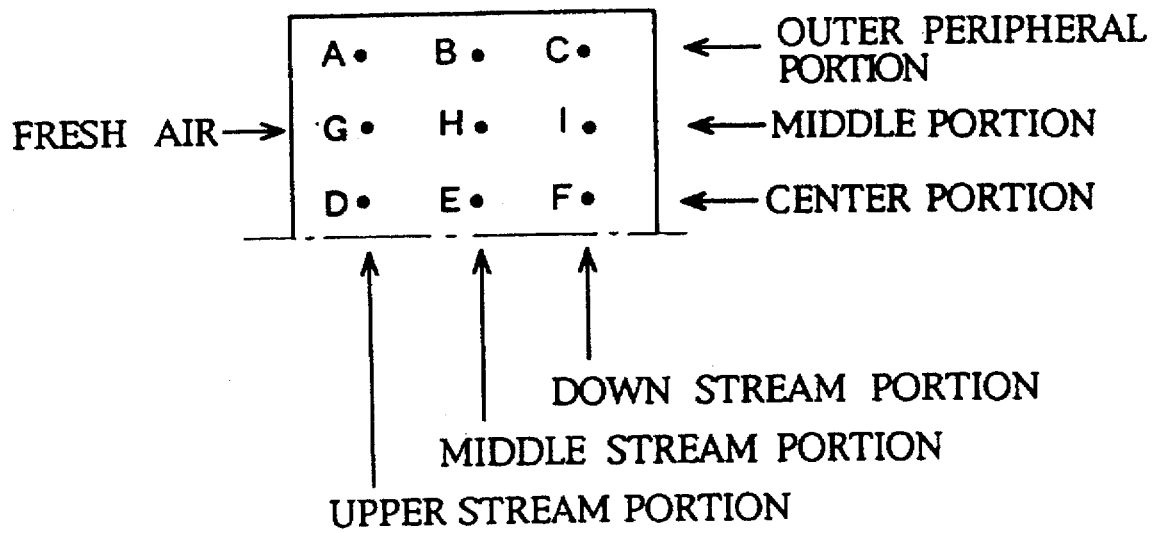
FIG. 5 is a schematic side view of the filter of FIG. 4, and shows the arrangement of temperature sensors therein as employed by the preferred embodiment 1.

Referring to FIGS. 4 and 5, the length in the axial direction of the filter 2 is 152 mm and the diameter of the filter is 144 mm. The center points D, E and F for detecting the temperature are positioned on the circle which has the diameter, of 40 mm. The middle points G, H and I for detecting the temperature are positioned on the circle which has the diameter of 80 mm. The outer peripheral points A, B and C for detecting the temperature are positioned on the circle which has the diameter of 120 mm. The upstream points A, D and G are positioned at portions 12 mm from the upstream end surface of the filter 2. The midstream points B, E and H are positioned at portions 77 mm from the upstream side end surface of the filter 2. The downstream points C, F and I are positioned at portions 15 mm from the downstream side end surface of the filter 2.

The weight of the collected particles G is about 8.6 g per liter, and patterns of the heating power supply and air supply are similar to the above mentioned patterns.

Figure 6:
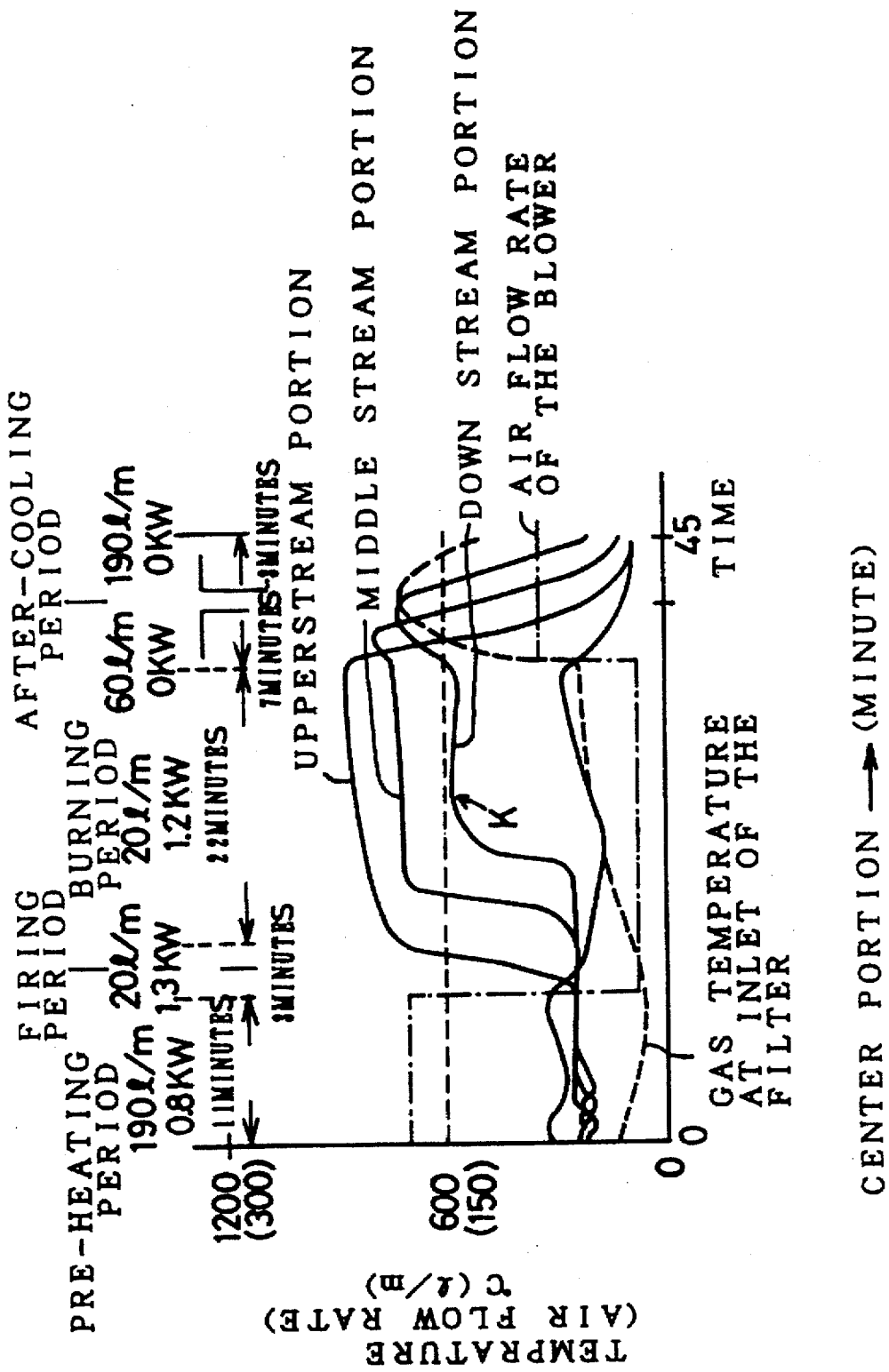
FIG. 6 is a graph showing variation of the temperature at the center portion in the radial direction of the filter employed by the preferred embodiment 1.

FIG. 6 shows a variation of the temperature at the center portion in the radial direction. The point K shown in FIG. 6 indicates the state that the burning at the center portion in the downstream portion of the filter 2 has almost stopped or has a slow burning propagation speed.

Figure 7:
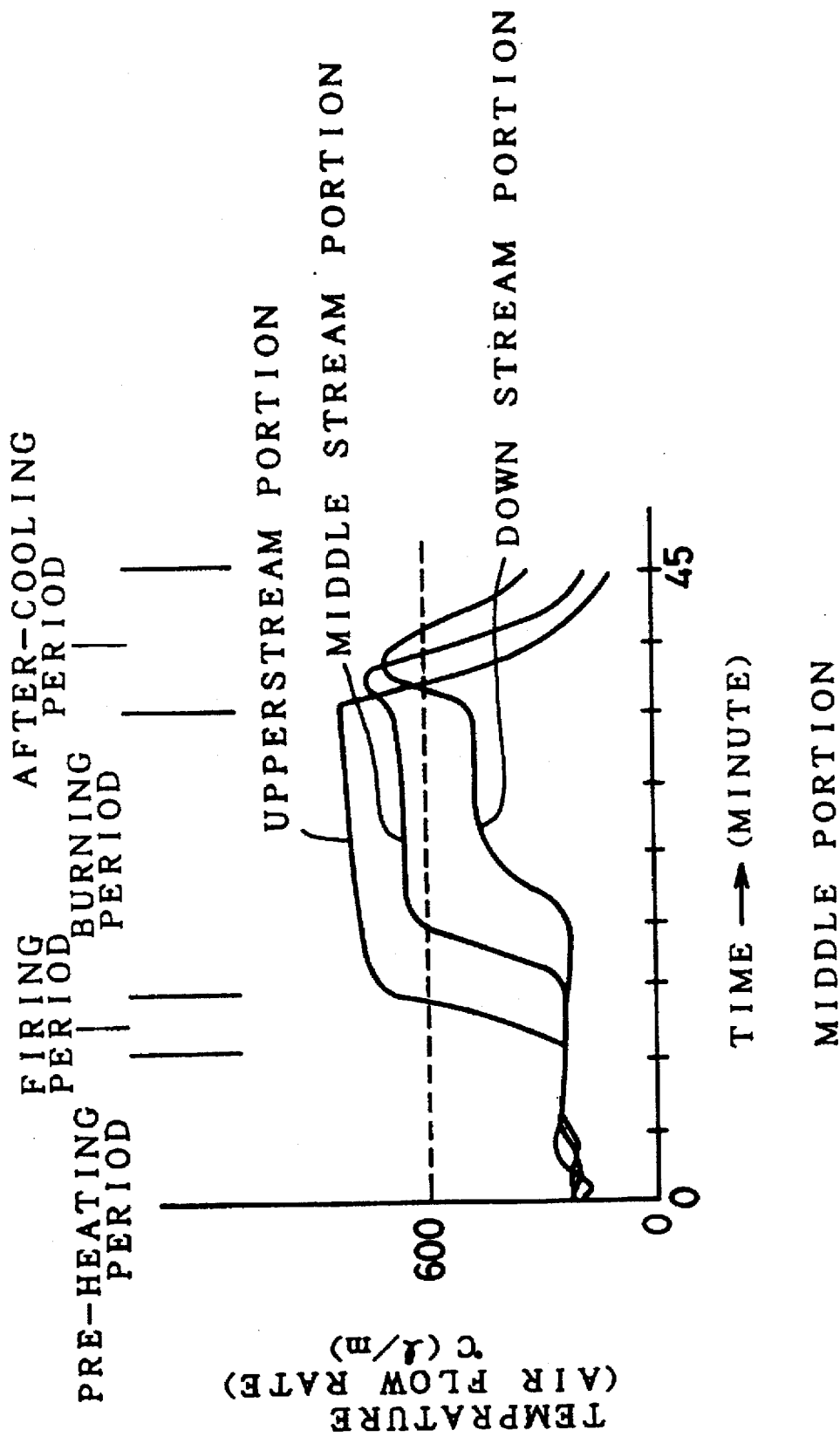
FIG. 7 is a graph showing variation of the temperature at the middle portion in the radial direction of the filter employed by the preferred embodiment 1.

FIG. 7 shows the variation of the temperature at the middle portion in the radial direction. FIG. 7 indicates the state that the particles collected at the middle portion H had been mostly burned already in the burning period.

Figure 8:
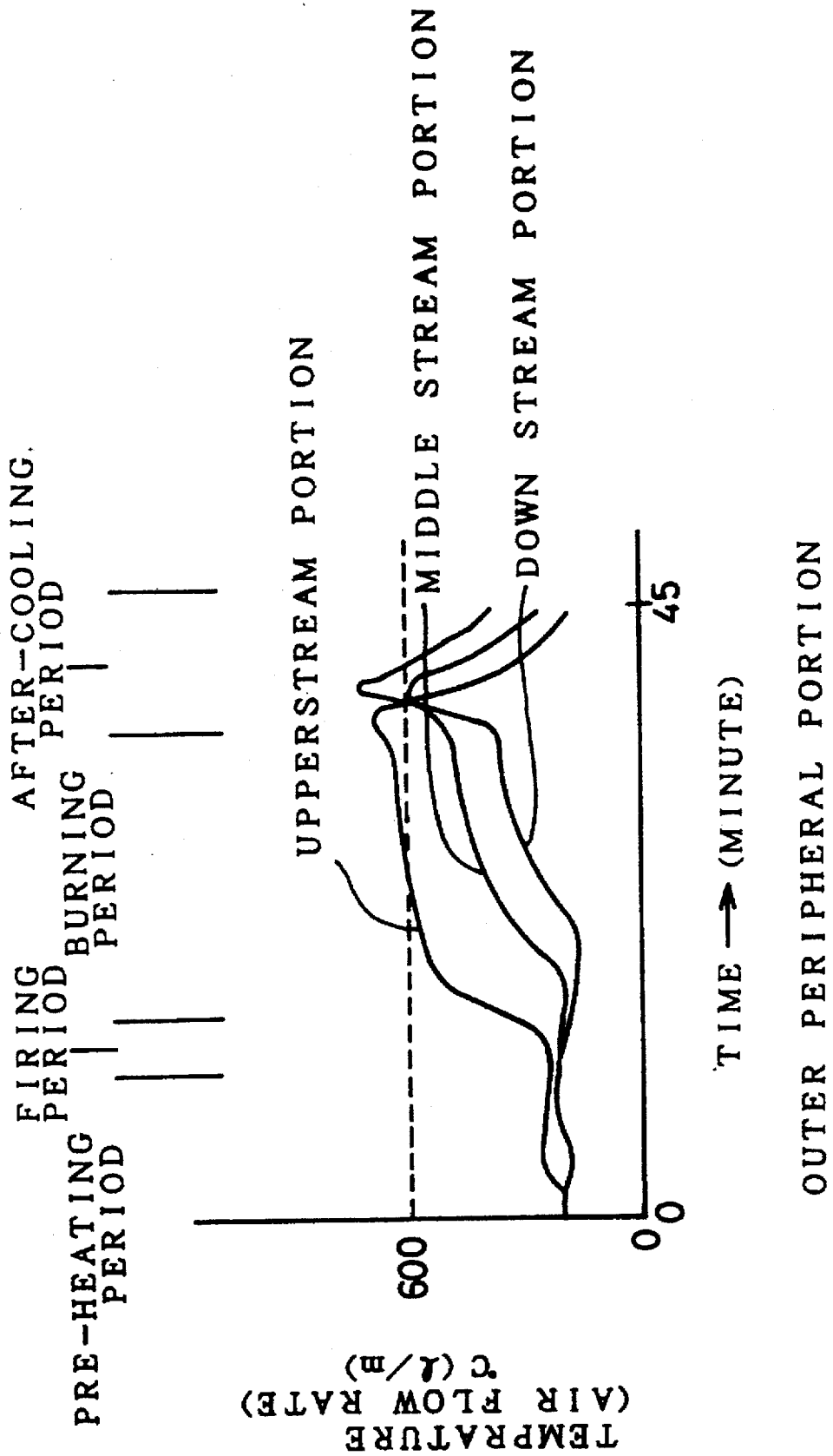
FIG. 8 is a graph showing variation of the temperature at the outer peripheral portion in the radial direction of the filter employed by the preferred embodiment 1.

FIG. 8 shows the variation of the temperature at the outer peripheral portion. FIG. 8 indicates the state that the particles collected at the outer peripheral portion A had been mostly burned out in the burning period.

FIG. 9 shows the relation between the highest temperature of the filter and the weight G of the collected particles. FIG. 9 also shows the relation between the regeneration rate and the weight G. The regeneration efficiency rate is shown by the following formula.

$$(\text{regeneration efficiency rate}) = (1-X) \times (100\%)$$

The value X is the remaining weight of particles per the weight of the collected particles. In FIG. 9, it is clear that the temperature of the filter 2 can be less than 1000° C. which is the allowable highest temperature of the filter 2 when the weight G is less than 10 g.

FIG. 10 shows the relation between the highest temperature and the weight G and the relation between the regeneration rate and the weight G in the regeneration operation of the prior art where a predetermined constant air flow rate (60 liters per minute) has been supplied. In FIG. 10, the temperature of the filter 2 exceeds 1000° C. when the weight of the collected particles is 10 g. Therefore, danger of damage to the filter 2 occurs.

Namely, in the prior art keeping the air flow rate constant, a predetermined volume (for example, 30 liters per minute or more) of air supply is necessary to prevent cessation of burning in the downstream portion of the filter 2. However, as the air flow rate is high, if the particulate weight is a little over the allowable volume, the temperature of the filter 2 also exceeds the allowable temperature and cracking or melting of the filter 2 may occur. The above mentioned problem is solved by the present embodiment.

FIG. 11 is a schematic sectional view indicating the remnant state of particles in the filter 2 in the burning period and the first blowing period.

FIG. 12 is a schematic sectional view indicating the particles remnant state in the filter 2 in the burning period and the first blowing period. The filter 2 of the prior art shown in FIG. 12 is supplied air flow at a constant rate.

Further, if an outer peripheral heater is wound around the outer peripheral surface of the filter 2 additionally, the regeneration efficiency is increased. The air flow rate is possible to be increased step by step or continuously between the first blowing period and the second blowing period.

EMBODIMENT 2

Figure 13:
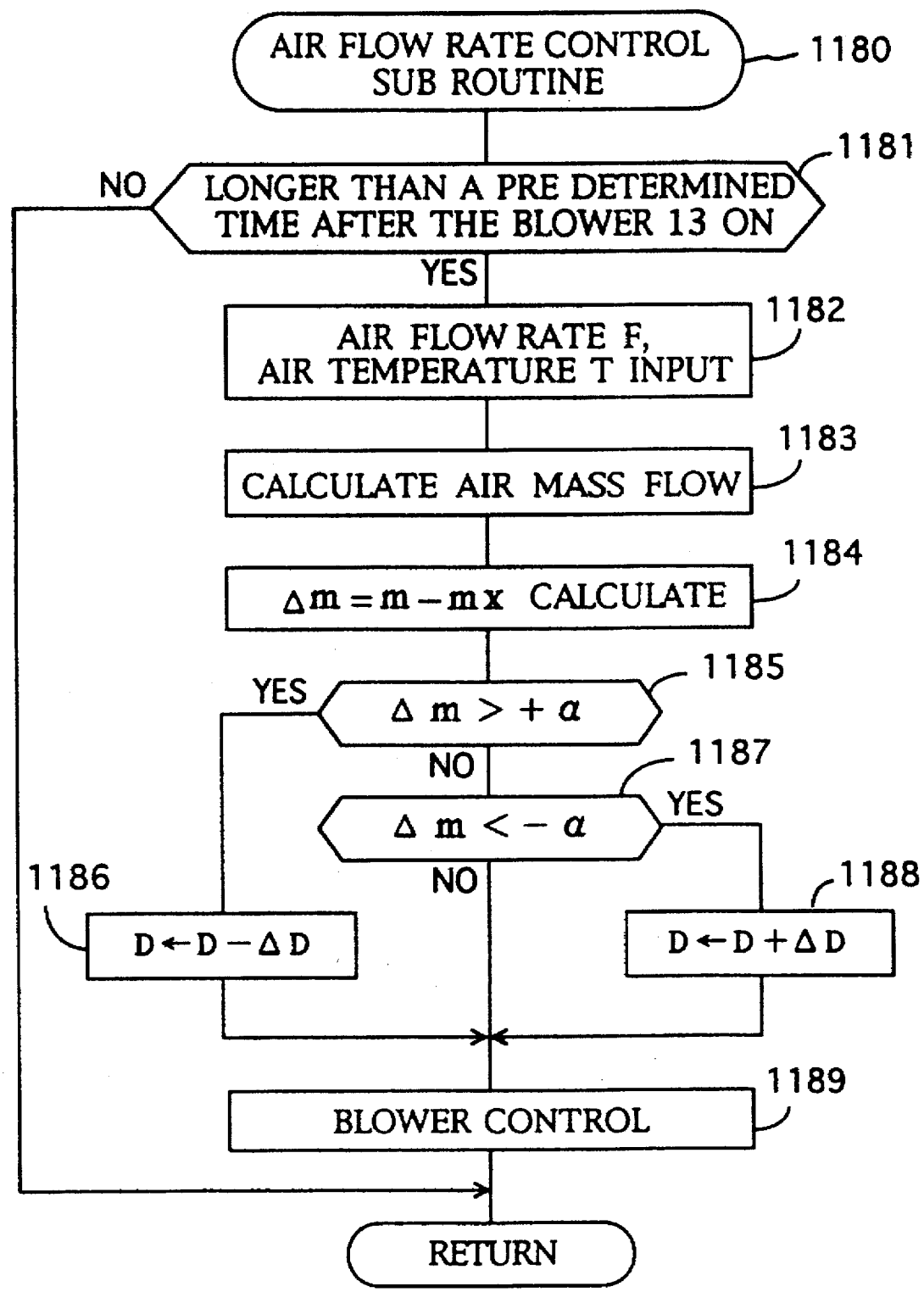
FIG. 13 is a flow chart illustrating an air flow rate control subroutine employed by the embodiment 2.

FIG. 13 illustrates the embodiment 2 which has an air flow rate control subroutine added to the preferred embodiment 1, which is executed at constant intervals. Initially, at the step 1181, the starting of the blower 13 is judged. If it has not been started, the subroutine returns to the main routine. And if it has been started, the subroutine waits a predetermined constant period (for example 10 minutes). At the next step 1182, the air flow rate F and the temperature of the supplied air T are read in the controller from the air flow rate sensor 15 and the air temperature sensor 19. At the next step 1183, a mass of the air supply (air mass flow) m is calculated in accordance with the next formula.

$$m = F \times 29/(T \times R)$$

R is a constant value which is 0.082 in the present embodiment.

At the next step 1184, the difference value $\Delta m$ between the calculated mass m and the predetermined mass mx which is a logical mass value is calculated. The predetermined value of the air mass flow mx is set at 224 g per minute in the present embodiment.

At the next step 1185, the difference $\Delta m$ and the predetermined threshold value $+\alpha$ are compared. If the $\Delta m$ is larger than $+\alpha$, the predetermined constant value $\Delta D$ is substracted from the current duty ratio D of the voltage applied to the blower 11. If the $\Delta m$ is not larger than $+\alpha$, at the step 1187, the difference $\Delta m$ and the predetermined threshold value $-\alpha$ are compared. If the $\Delta m$ is not smaller than $-\alpha$, the routine goes on to the step 1189 and if the $\Delta m$ is smaller than $-\alpha$, at the step 1188, $\Delta D$ is added to current duty ratio D. At the step 1189, the duty ratio of the voltage applied to the motor M for driving the blower 13 is corresponded with the duty ratio D corrected at the step 1186 or 1188. Therefore, the air mass flow can keep a constant value by controlling the rotation speed of the motor M. Consequently, the heat quantity generated by burning of the particles is corresponded with a constant level and the melting or cracking of the filter 2 and the decrease of the regeneration efficiency are prevented.

In the present embodiment, the heating power supplied in the pre-heating period is less than the heating power supplied in both the period of the firing and the burning. Further, the blower 13 is driven in the pre-heating period. Therefore, the difference of the temperature between the pre-heated portions in the filter and the heat stress of the filter are decreased. Consequently, the difference of the burning propagation speed among the portions in the filter and the remaining particles are also decreased.

EMBODIMENT 3

Figure 14:
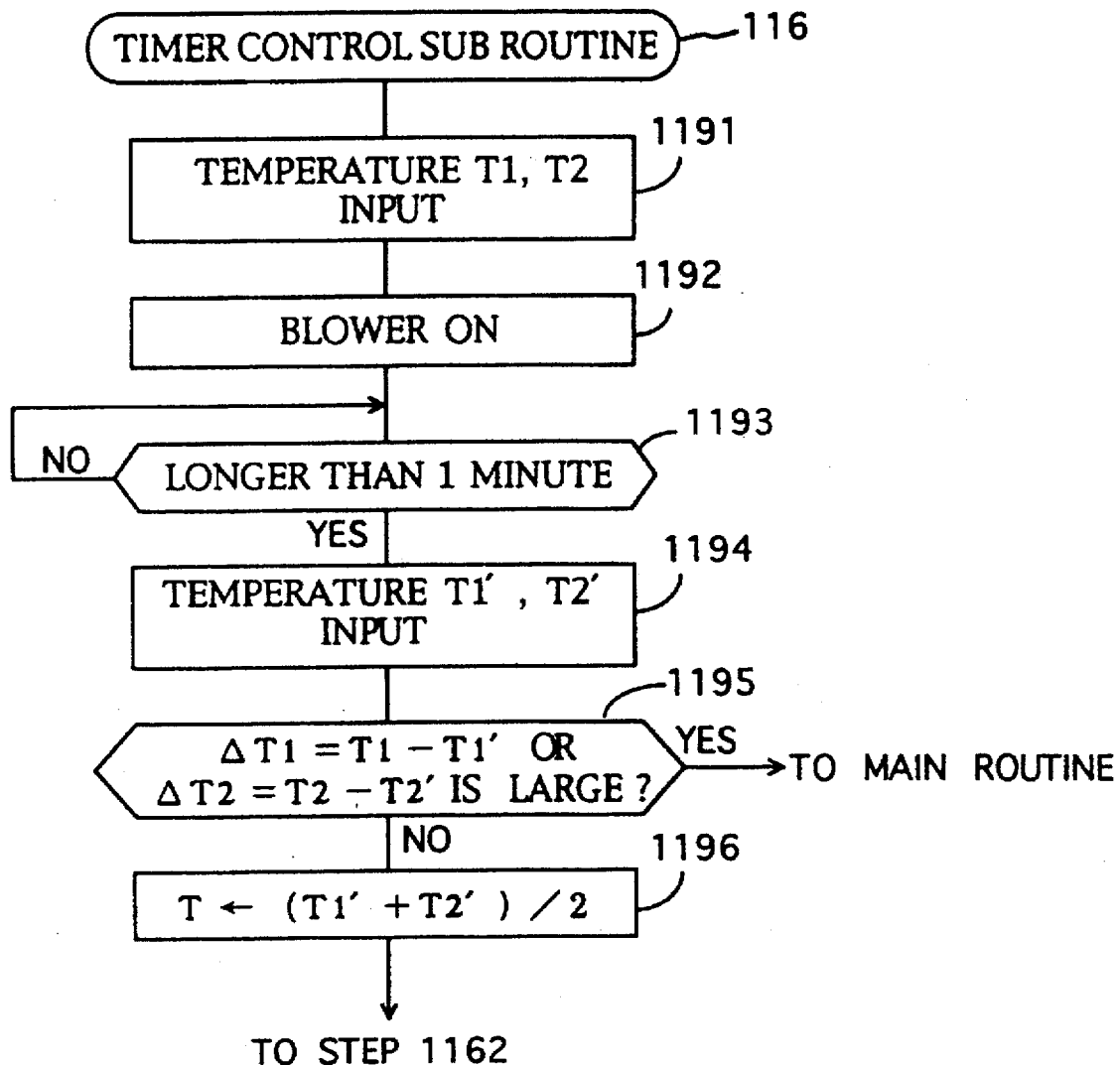
FIG. 14 is a flow chart illustrating the timer control subroutine employed by the embodiment 3.

FIG. 14 illustrates the embodiment 3 showing another timer control subroutine for detecting the temperature of the air by the temperature sensors 6, 6a instead of the temperature sensor 19 shown in FIG. 1.

Initially, at the step 1191 at the beginning of the timer control subroutine, the temperatures T1, T2 outputted from the sensors 6, 6a are read in the controller 8. Then, the motor M of the blower 13 is driven at the step 1192. At the next step 1193, the routine waits 1 minute. Then, at the step 1194, the temperatures T1', T2' outputted from the sensors 6, 6a are read again. At the next step 1195, the difference of the temperature $\Delta T1$ between T1 and T1' is calculated. Similarly, the difference of the temperature $\Delta T2$ between T2 and T2' is calculated. Further, the $\Delta T1$ and $\Delta T2$ are compared with the predetermined value $T_0$. If the $\Delta T1$ or $\Delta T2$ is greater than $T_0$, it is determined that the filter 2 is hot. Then, the routine goes on to the main routine.

If the ΔT1 or ΔT2 is not greater than T₀, it is 0 determined that the filter 2 is cold and goes to the step 1196. At the next step 1196, the average value of T1' and T2' is calculated as the temperature T of the air and goes on to the step 1162. The temperature T of the air is used at the step 1182 shown in FIG. 13. Therefore, the temperature sensor can be abbreviated.

EMBODIMENT 4

Figure 15:
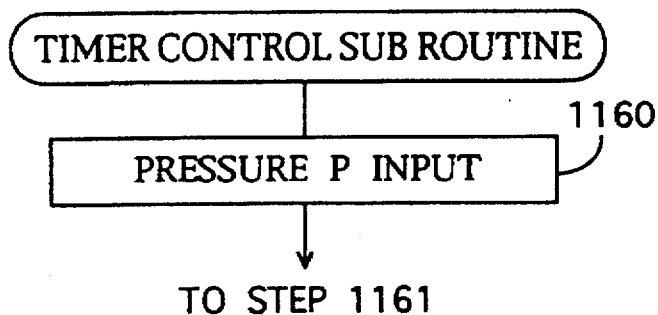
FIG. 15 is a flow chart illustrating the timer control subroutine employed by the embodiment 4.

FIG. 15 illustrates the embodiment 4 showing another timer control subroutine. In the present embodiment, at the step 1160 which is the beginning of the timer control subroutine, the pressure P outputted from the pressure sensor 17 are read in.

Figure 16:
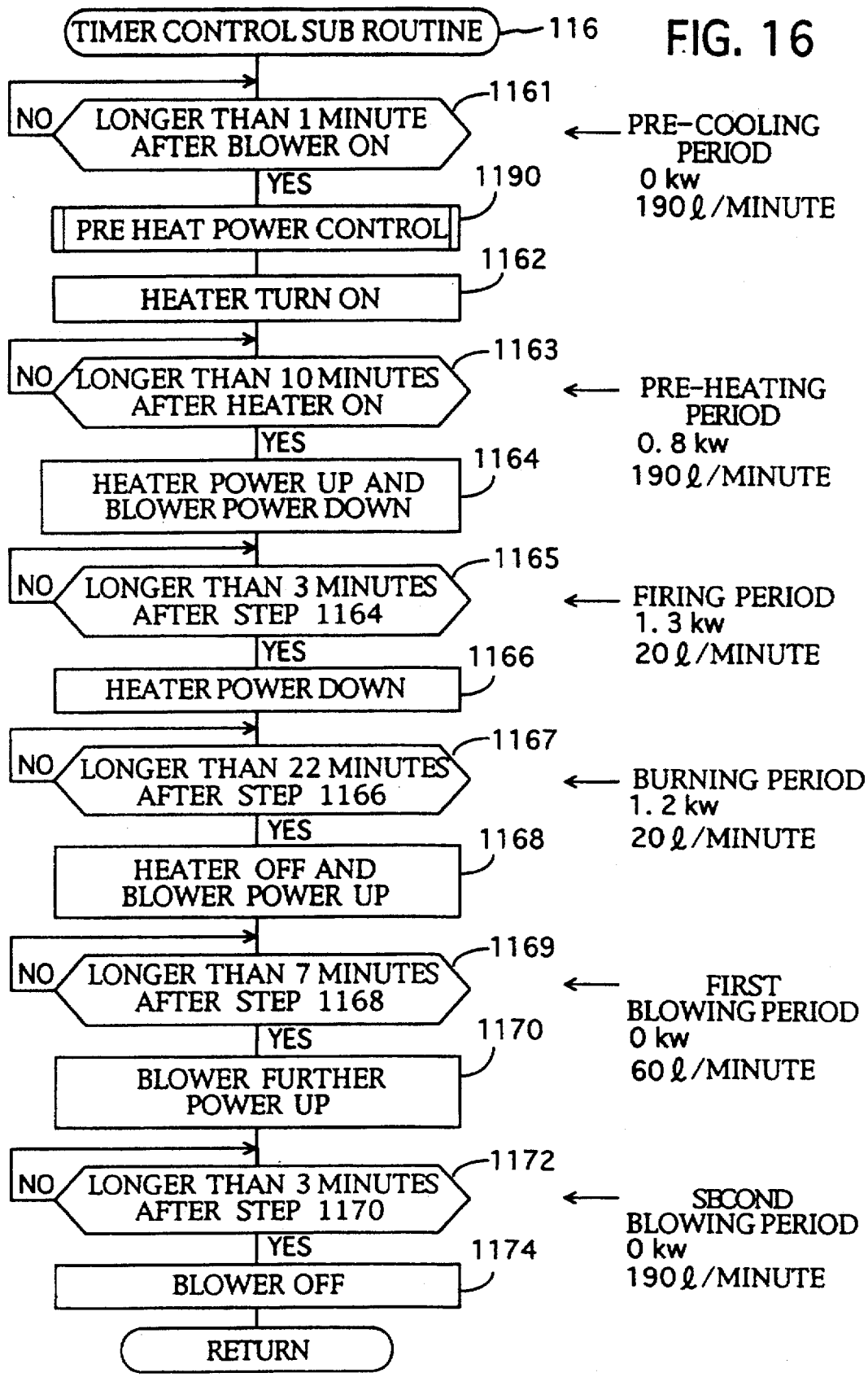
FIG. 16 is a flow chart illustrating the timer control subroutine employed by the embodiment 5.

Then, the routine goes on to the step 1161 shown in FIG. 16. At the step 1183 shown in FIG. 13, the air mass flow is determined in accordance with the air flow rate F, the temperature T and the pressure P. In the present embodiment, the air mass flow is searched from the map installed in the controller 8 by parameters F, P and T. Naturally, the air mass flow can be calculated. Therefore, the correct air mass flow can be determined and the efficiency of the regeneration can be increased neither affecting the filter nor special sensor. In the present embodiment, the pressure of the air is detected in the period in which the engine 20 and the blower 13 are stopped.

EMBODIMENT 5

Figure 17:
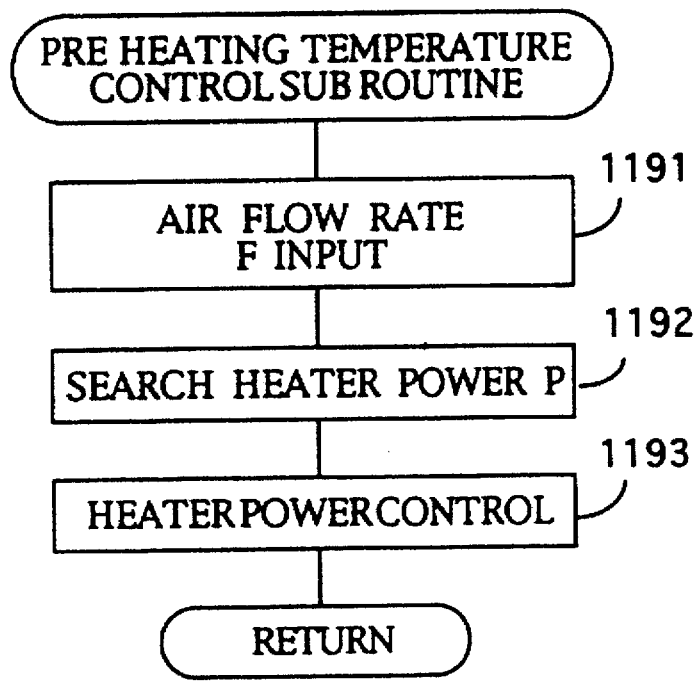
FIG. 17 is a flow chart illustrating the pre-heating temperature control subroutine employed by the embodiment 5.

FIGS. 16 and 17 illustrate the embodiment 5 showing another timer control subroutine. In the present embodiment, the step 1190 is added to the flow chart shown in FIG. 3 of the Preferred Embodiment 1. The step 1190 is the pre-heating control subroutine. Its details are shown in FIG. 17.

The step 1190 detects the air flow rate of the blower 13 in the pre-heating period in accordance with a signal of the air flow rate sensor 15 and controls the heating power supplied to the heater 11 in order to pre-heat the filter until the temperature of the heater 2 reaches the predetermined constant temperature. At the step 1191, the air flow rate is obtained from the air flow rate sensor 15. At the next step 1192, the heating power P or its duty ratio is searched in the map (not shown) stored in the memory (not shown) in order to correspond the temperature of the supplied air with the predetermined constant level. At the next step 1193, it controls the duty ratio of the switch 56 for controlling the heating power supplied to the heater 11. Then the routine returns to the main routine. Therefore, the filter 2 and the heater 11 are protected on account of the decreasing of the heating power supplied to the heater 11 even if the air flow rate is decreased by known or unknown causes despite employing the feedback control system.

In the present embodiment, the heating power supplied to the heater 11 is controlled in accordance with the air flow rate. Consequently, after the expiration of the pre-heating period, the filter 2 has been heated to a correct predetermined pre-heating temperature.

EMBODIMENT 6

Figure 18:
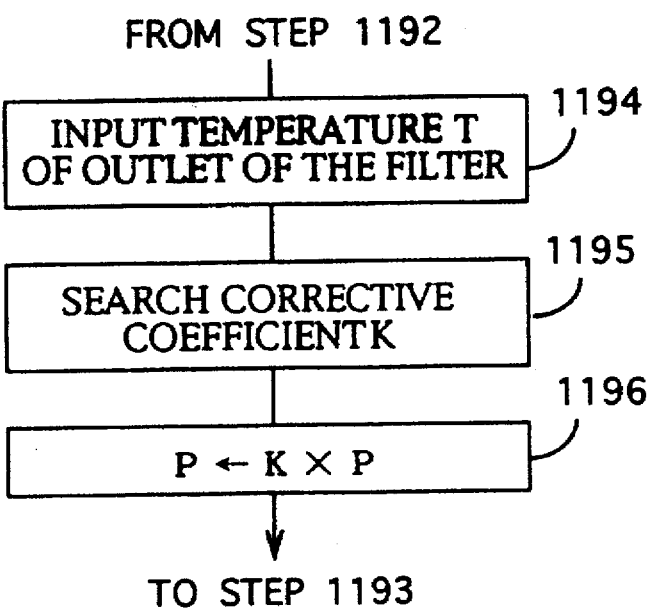
FIG. 18 is a flow chart illustrating the pre-heating power control subroutine employed by the embodiment 6.

FIG. 18 illustrates the embodiment 6 showing another embodiment of the pre-heating power control subroutine shown at the step 1190 in FIG. 16. In the present embodiment, the temperature of the filter is detected by the temperature sensor 6a and the heating power supplied to the heater in the pre-heating period is controlled in accordance with the temperature of the filter.

Initially, at the step 1194, after executing the step 1192, the outlet temperature of the filter 2 is obtained from the sensor 6a. At the next step 1195, the correction coefficient is searched from the map stored in the memory. At the next step 1196, the heating power P is multiplied by the correction coefficient K in order to correct the heating power P. Then, the routine goes on to the step 1193. The controller which has the map employed at the step 1195 controls to decrease the heating power P relatively if the outlet temperature is high. Further, the controller controls to increase the heating power P relatively if the outlet temperature is low. Therefore, it is prevented that the temperature of the filter 2 rises too high by pre-heating even if the filter 2 is hot before pre-heating.

The temperature of the filter 2 after the pre-heating is corresponded to the predetermined constant temperature because the pre-heating power is controlled in accordance with the parameter related to the air flow rate.

EMBODIMENT 7

Figure 19:
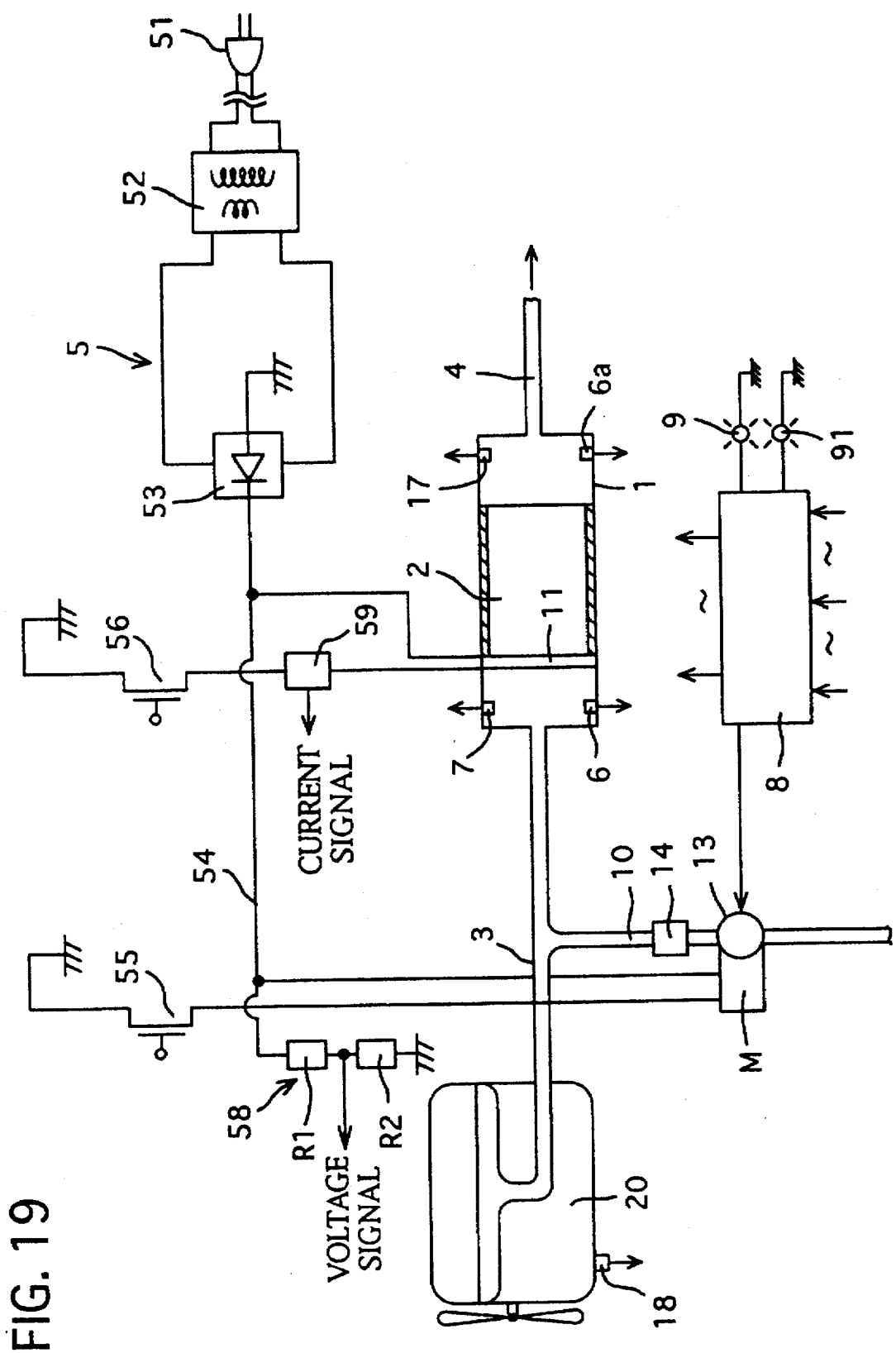
FIG. 19 is a basic block diagram illustrating the embodiment 7 of the exhaust gas purifier.
Figure 20:
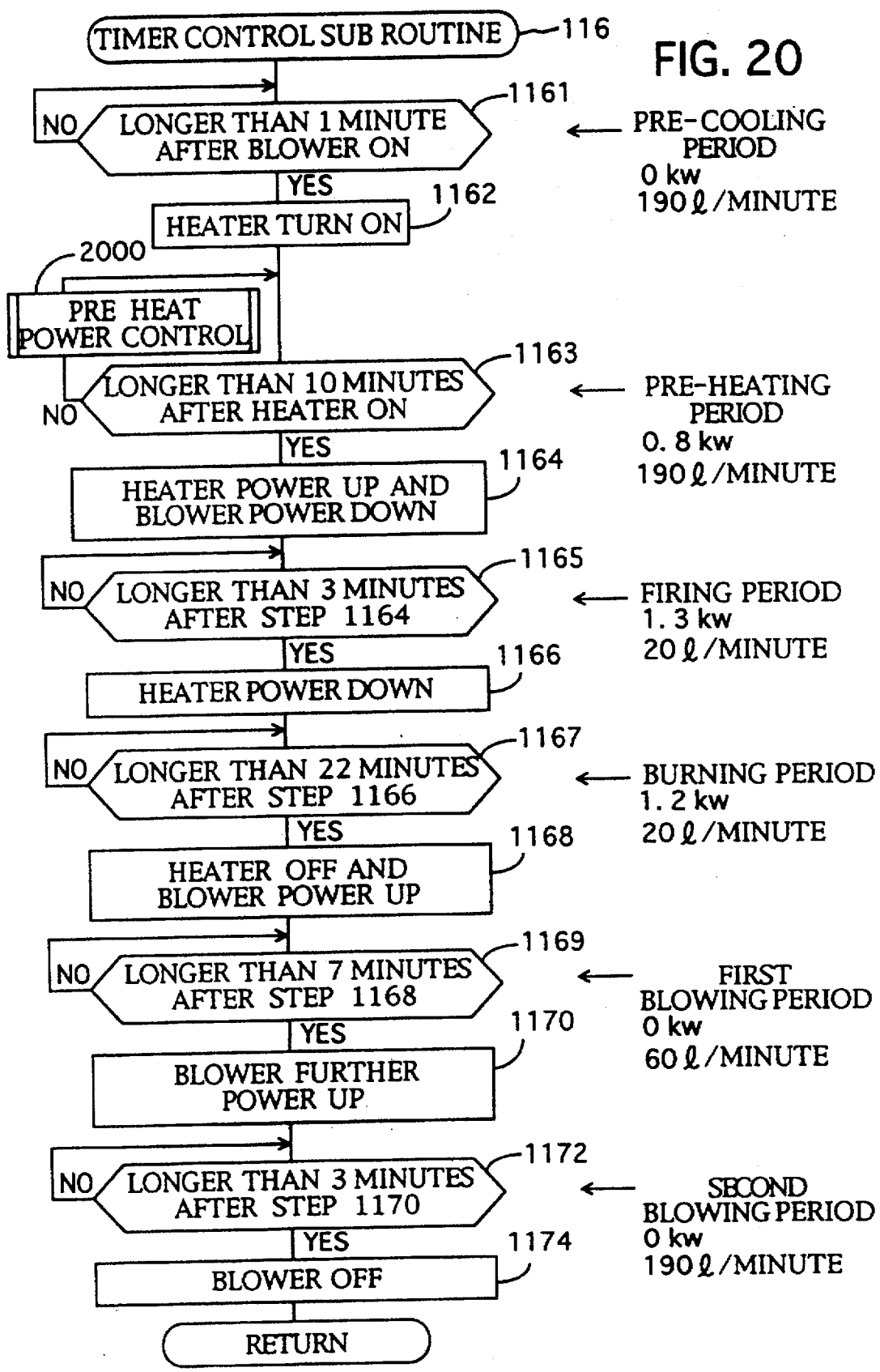
FIG. 20 is a flow chart illustrating the timer control subroutine employed by the embodiment 7.
Figure 21:
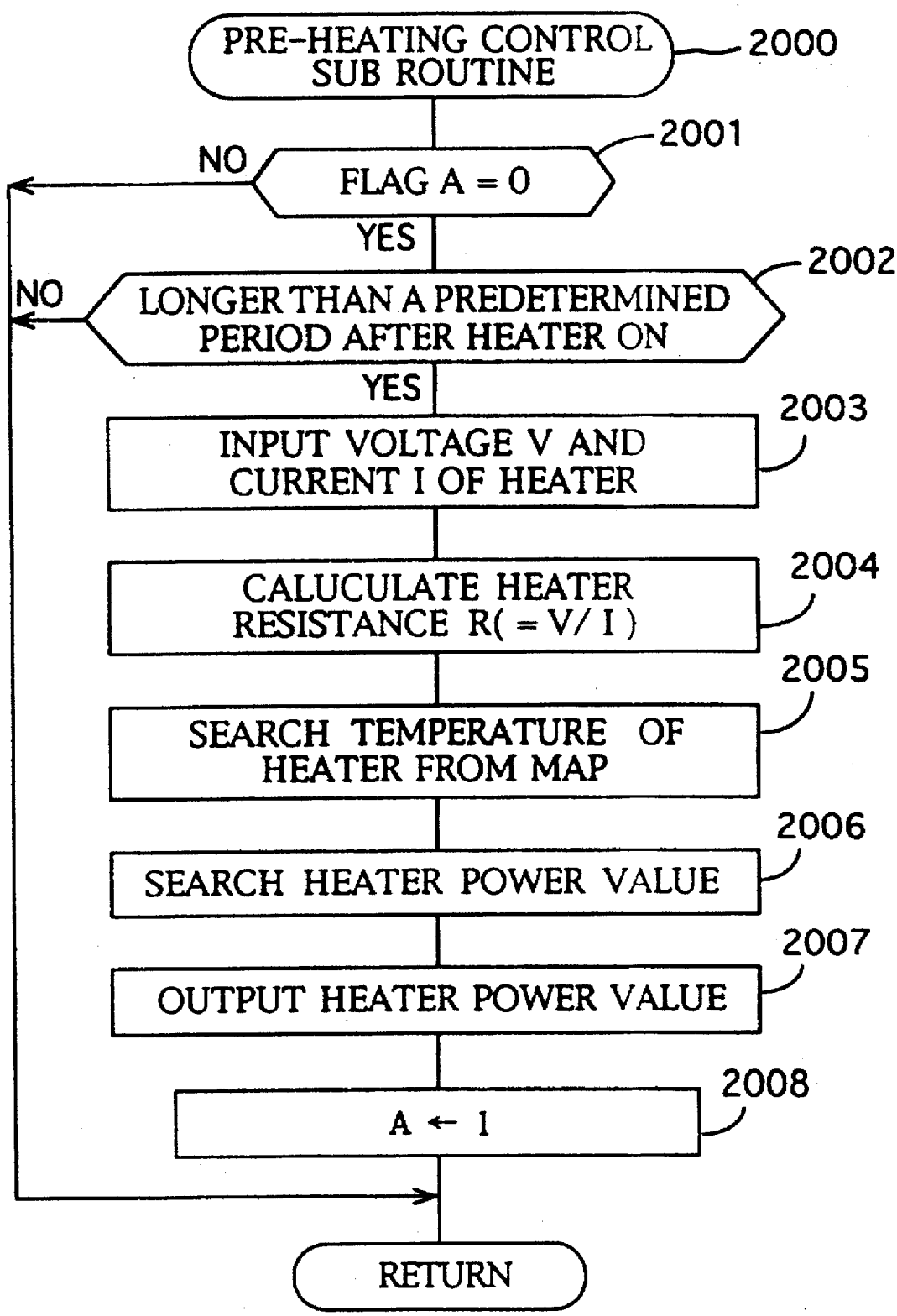
FIG. 21 is a flow chart illustrating the pre-heating power control subroutine shown in FIG. 20.

FIGS. 19, 20 and 21 illustrate the embodiment 7. FIG. 19 shows another embodiment of the apparatus shown in FIG. 1. The apparatus shown in FIG. 19 has the voltage division circuit 58 and the current sensor 59. The air flow rate sensor 15 shown in the FIG. 1 is omitted. The voltage division circuit 58 detects a voltage applied to the heater 11 and the current sensor 59 detects electric current supplied to the heater 11. The switches 55, 56 consist of low side switches.

The flow chart shown in FIG. 20 shows the operation of the apparatus shown in FIG. 19. In the flow chart shown in FIG. 20, the step 2000 is added and the step 1190 shown in the FIG. 16 is abbreviated. The step 2000 is the pre-heating power control subroutine and is executed in the pre-heating period when the current time is within 10 minutes after starting of the power supply to the heater. The step 1163 judges whether the current time is within 10 minutes or not from the starting of the heating power supply because the pre-heating period has been executed for 10 minutes.

FIG. 21 shows the pre-heating power control subroutine in the present embodiment. Initially, at the step 2001, the value of the flag A, which is set to 0 at the time of starting the regeneration operation, is researched. If the flag A is not 0, the routine returns to the main routine. At the next step 2002, if the flag is 0, it is judged whether the time detected from the start of the heating power supply is longer than the predetermined period (30 seconds in the present embodiment) or not. If the time is shorter than the predetermined period, the routine goes back to the main routine. Else if the time is longer than the predetermined period, the supplied voltage V and the supplied current I obtained from the circuit 58 and the sensor 59 are read at the step 2003. At the next step 2004, the resistance value R of the heater 11 is calculated in accordance with the voltage V and current I. At the next step 2005, the temperature Th of the heater 11 is searched from the map stored in the memory in accordance with the calculated resistance value R.

At the next step 2006, the heater power is searched in the map in accordance with the temperature Th. The temperature Th is a parameter related to the air flow rate. If the air flow rate is greater than the predetermined constant air flow rate, the detected temperature Th becomes lower than the predetermined constant temperature Tth, vice versa.

At the next step 2007, the searched heater power is outputted. Then the routine returns to the main routine shown in FIG. 20 after the flag A is set to 1 at the step 2008.

Accordingly, in the present embodiment, the heating power is controlled in accordance with the temperature difference ΔT between the detected temperature Th and the constant temperature Tth in order to keep the temperature of the supplied air to the constant value in spite of abbreviating of the air flow rate sensor 15. Furthermore, the influence of the filter temperature is reduced.

EMBODIMENT 8

The embodiment 8 is illustrated in FIGS. 22–27. The present embodiment adds the valve check subroutine to the routine as shown in FIG. 2.

Figure 22:
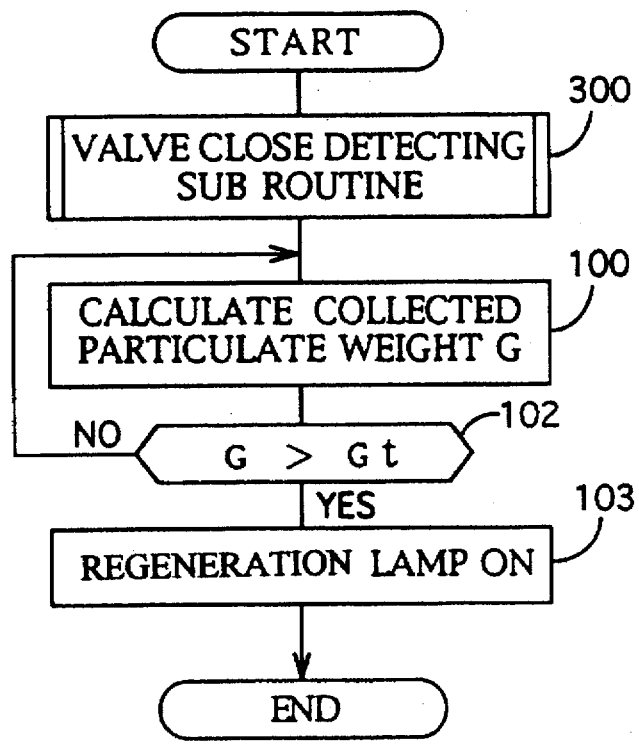
FIG. 22 is a flow chart illustrating the first part of the main routine employed by the embodiment 8.

In FIG. 22, after executing the valve close detection subroutine at the step 300, the steps 100–103 are executed. The steps 100, 102 and 103 in the FIG. 22 are equal to the steps 100, 108 and 111 in the FIG. 2, respectively.

Figure 23:
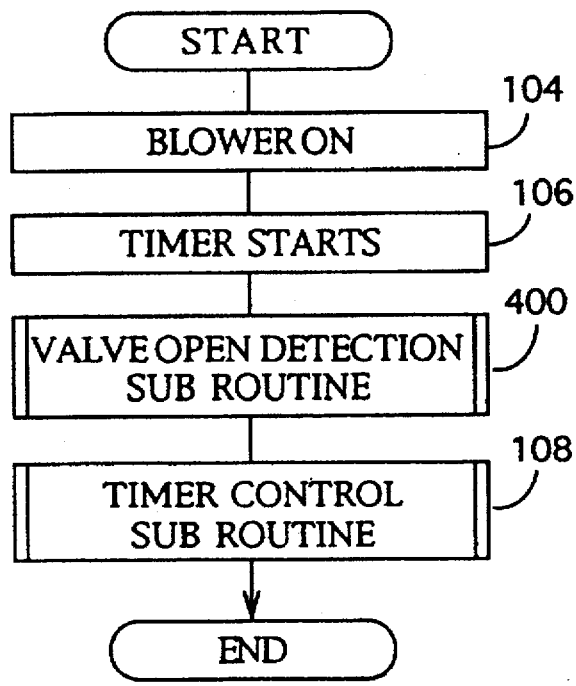
FIG. 23 is a flow chart illustrating the remainder of the main routine employed in the embodiment 8.

In FIG. 23, the regeneration operation is executed. The steps 104, 106 and 108 in the FIG. 23 are equal to the steps 112, 114 and 116 in the FIG. 2, respectively. The valve open detection subroutine 400 is added between the step 106 and the step 108.

Figure 24:
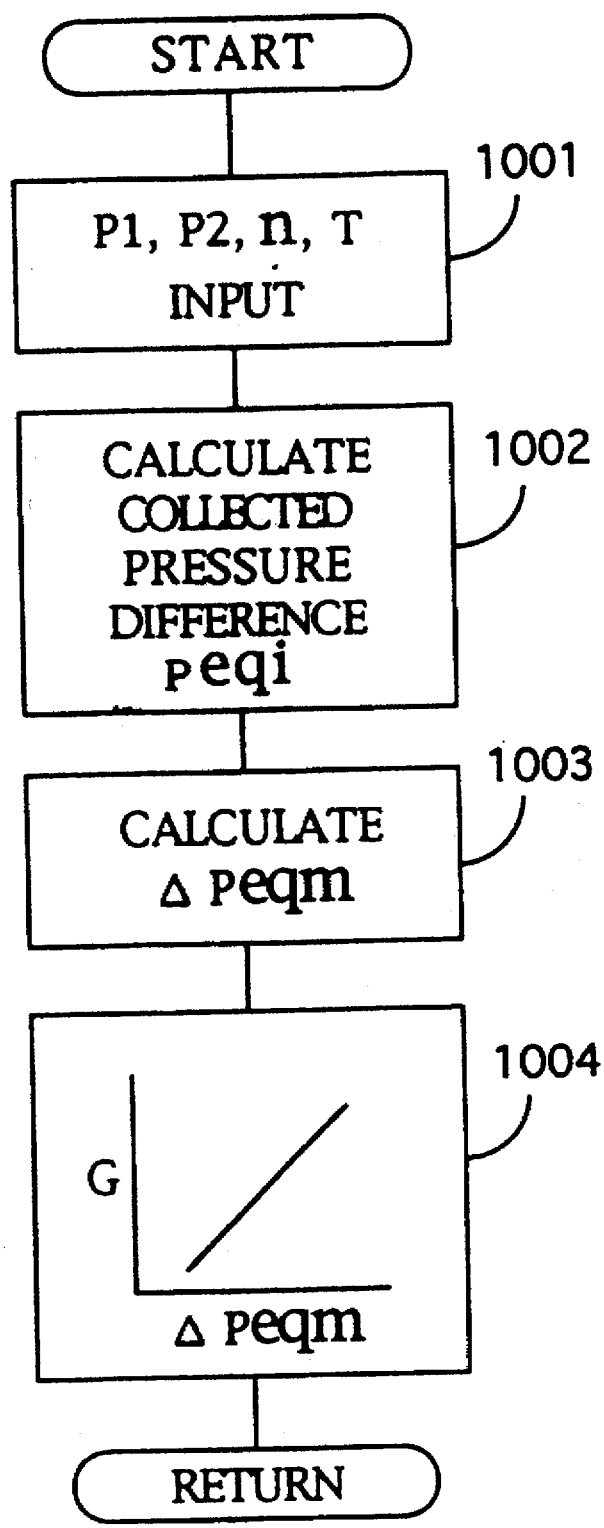
FIG. 24 is a flow chart showing the weight of the collected particles detection subroutine illustrated in FIG. 22.

The collected particles detection shown in FIG. 24 is described below.

Initially, at the step 1001, the exhaust pressures P1, P2, the engine rotation speed n, the exhaust gas temperature T detected by the sensors 7, 17, 18 and 6 are inputted.

At the next step 1002, the corrected pressure difference ΔPeqi is calculated in accordance with the following formula in order to decrease the influence of n and T against the filter pressure loss ΔP which is shown by the following formula.

$$\Delta Peqi = \Delta P \times (523/T) \times (2600/n)$$

$$\Delta P = P1 - P2$$

The exhaust temperature T is described as an absolute temperature (°K.). The rotation speed n is described in revolutions per minute. Accordingly, the pressure difference ΔP is equal to the corrected pressure difference ΔPeqi at the condition that T is 523 and n is 2600. The corrected pressure difference ΔPeqi is calculated every 50 m sec.

At the next step 1003, the average pressure ΔPeqm is calculated an average of 64 data which are the corrected pressure difference ΔPeqi calculated at the step 1002. At the next step 1004, the weight of the collected particles G is searched from the table which shows the relation between the average of corrected pressure difference ΔPeqm and the weight G of the collected particles. The table is stored in the memory (not shown) of the controller 8.

Therefore, the heat quantity generated by the burning particles is controlled at a constant value despite the variation of the T or n. Accordingly, a cracking or melting of the filter 2 on account of the increase of the heat generated by the burning particles is prevented. Further, it is prevented that the regeneration efficiency decreases on account of the lack of the heat quantity generated by the burning particles.

Figure 25:
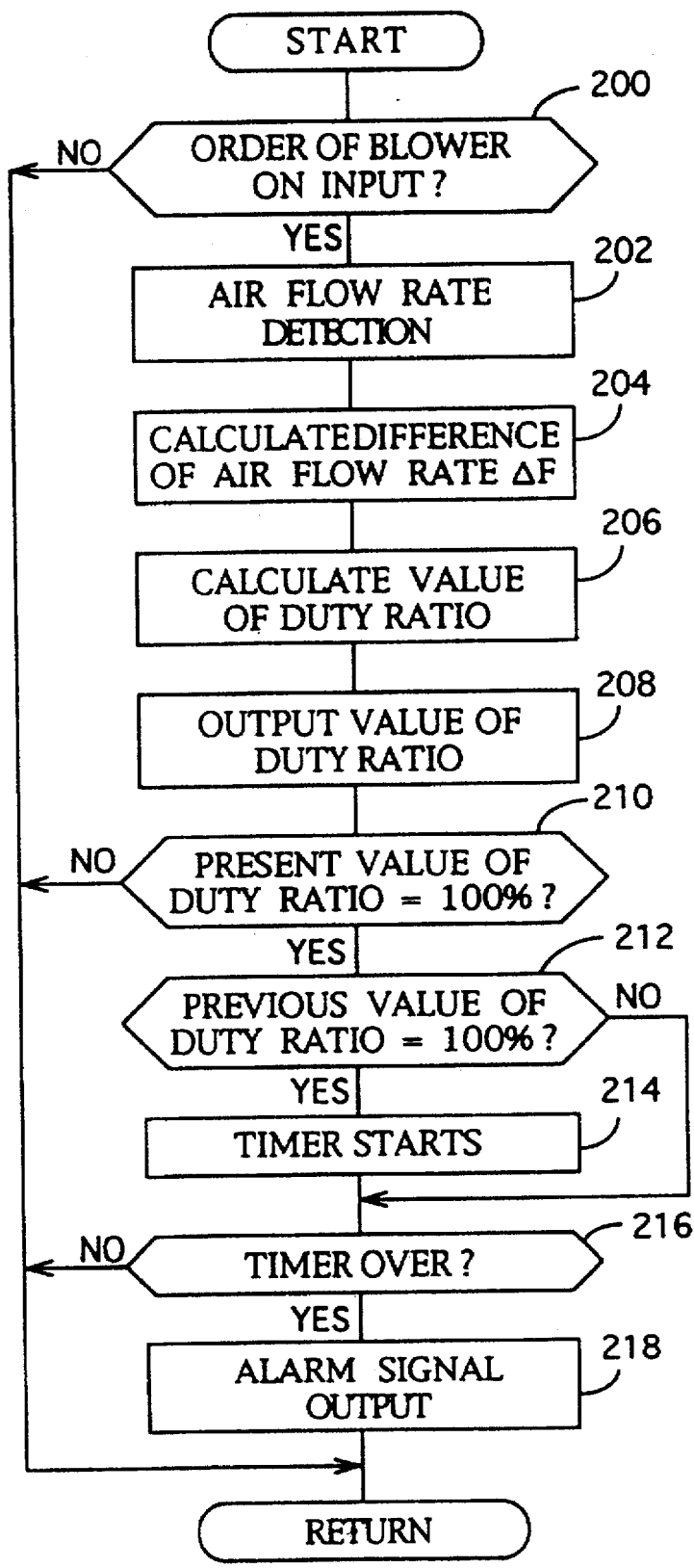
FIG. 25 is a flow chart showing the air flow rate control subroutine employed by the embodiment 8.

FIG. 25 shows the blower control and test subroutine executed at each short interval.

At the step 200, it is judged whether the driving order of the blower has been inputted or not. If the order is not inputted, the routine returns to the main routine at once. Else if the order is inputted, the air flow rate obtained from the sensor is read at the step 202.

At the next step 204, the difference ΔF between the detected air flow rate and the predetermined air flow rate is calculated. At the next step 206, the duty ratio for the power which corresponds to the ΔF is calculated.

At the next step 208, the calculated duty ratio for the power is outputted to the power switching controller which controls the duty ratio of power supplied to the motor M for driving the blower 13. The power switching controller (not shown) which is a part of the controller 8 has a gate controller and a MOS power transistor circuit.

The gate controller holds the inputted duty ratio for the power, and outputs 3 phase pulse signals having the above duty ratio. The MOS power transistor is switched by the 3 phase pulse signals. The detail description of the gate controller and MOS power transistor circuit is abbreviated because they are well known.

Consequently, the blower 13 is controlled by means of the feedback control method such that the difference ΔF is 0.

At the next step 210, it is judged whether the new duty ratio of the power calculated at the step 206 in the present routine is 100% or not. If the new duty ratio is 100%, the routine goes to the step 212. If the new duty ratio is not 100%, the routine returns to the main routine.

At the step 212, it is judged whether the previous duty ratio of the power calculated at the step 206 in the previous routine is 100% or not, by reading out of the memory of the controller 8 which holds the previous duty ratio. If the previous duty ratio is not 100%, the routine goes to the step 216. If the previous duty ratio is 100%, the routine goes to the step 216 after starting of a timer at the step 214.

At the step 216, it is judged whether a time counted by the timer reaches the predetermined time (3 seconds in the present embodiment) or not. If the counted time does not reach the predetermined time, the routine goes to the main routine. Else if the counted time reaches the predetermined time, the routine goes to the step 218. At the step 218, the alarm lamp 9 is turned on for the indication of trouble with the blower 13, the timer is turned off and the power supplied to the heater 11 is stopped. Then the routine is over.

Figure 26:
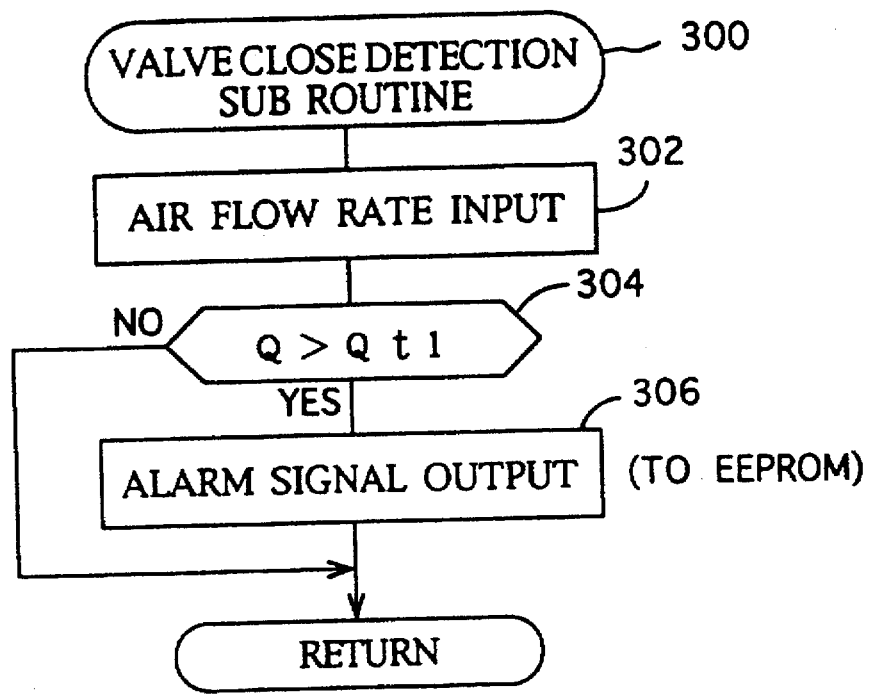
FIG. 26 is a flow chart showing the valve close detection subroutine illustrated in FIG. 22.

FIG. 26 shows the above mentioned valve close detection subroutine 300.

Initially, at the step 302, the air flow rate Q which is obtained from the air flow rate detection sensor 15 is inputted in the condition that the valve 14 is closed and the blower 13 or the engine is driven. At the next step 304, it is judged whether the air flow rate Q is larger than the predetermined air flow rate Qt1 or not. If the air flow rate Q is not larger than Qt1, the routine returns to the main routine because the valve 14 has been closed. Else if the air flow rate Q is larger than a predetermined volume Qt1, the valve-opening signal which indicates the opening of the valve 14 is memorized to the non volatile memory (EEPROM) and the non volatile memory outputs the alarm signal for turning the alarm lamp 9 on. The routine returns to the main routine after the alarm lamp 9 is turned on.

Figure 27:
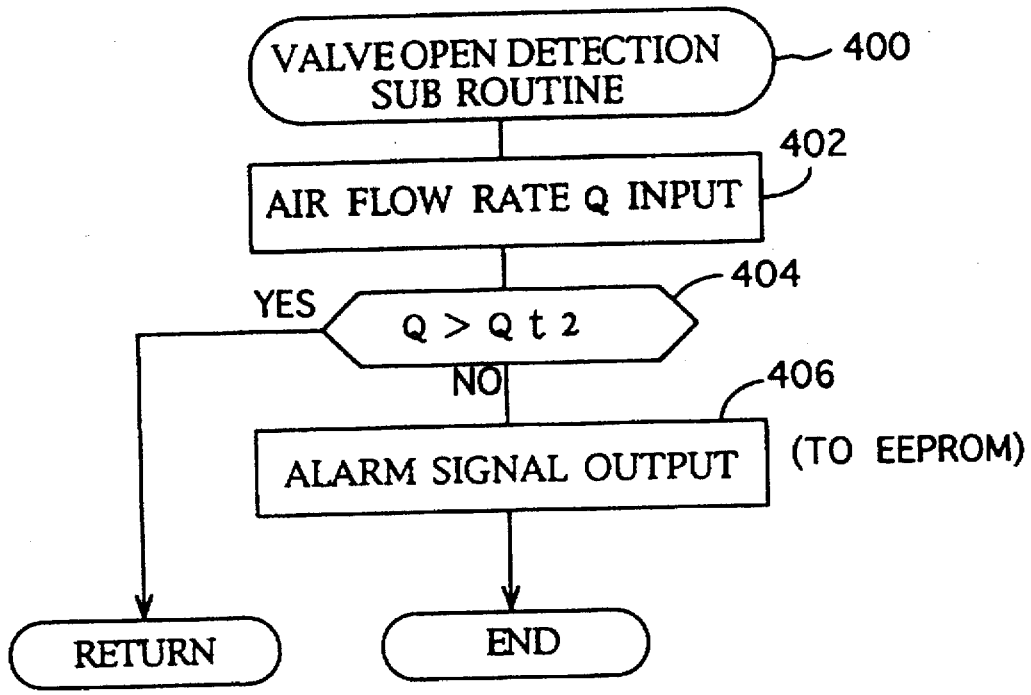
FIG. 27 is a flow chart showing the valve open detection subroutine illustrated in FIG. 23.

FIG. 27 shows the valve open detection subroutine 400.

Initially, at the step 402, the air flow rate Q obtained from the air flow rate detection sensor 15 is inputted at a condition that the valve 14 is opened and the blower 13 is driven. At the next step 404, it is judged whether the air flow rate Q is larger than the predetermined air flow rate Qt2 or not. If the air flow rate Q is larger than Qt2, the routine returns to the main routine because the valve 14 opens. Else if the air flow rate Q is not larger than Qt2, the valve-closing signal which indicates the closing of the valve 14 is memorized to the non volatile memory (EEPROM) and the non volatile memory outputs an alarm signal for turning the alarm lamp 9 on. Then, the routine ends after the alarm lamp 9 is turned on.

As described above, in the present embodiment, the air flow rate can be controlled exactly by means of the feedback control method. Therefore, in the regeneration operation, the temperature of the filter doesn't become too high or too low. If the temperature of the, filter becomes too high in the burning period, cracking or melting of the filter may occur. Else if the temperature of the filter becomes too low in the burning period, the regeneration efficiency decreases.

We found that the most important parameter determining the temperature of the filter is the air flow rate in the burning period. Namely, a variation of the temperature of the filter is mainly caused by a variation of the air flow rate.

Further, in the present embodiment, the trouble of the valve 14 can be detected by using the sensor 15 which is employed for controlling the air flow rate.

Namely, if the air flow rate is lower than the predetermined value, the regeneration operation is controlled as if the valve is insufficiently opened. If the air flow rate is higher than the predetermined value while the engine is driven, it is judged that the valve 14 cannot be closed. Further, the trouble that the valve 14 can not be closed is detected by detecting the air flow rate in the condition that the valve close signal is outputted and the blower 13 is driven.

In the present invention, the over-heating of the heater 11 and blower 13 is prevented even if the valve 14 does not open. Also, an accumulation of the particles in the blower 13 is prevented even if the valve 14 is not closed.

EMBODIMENT 9

Figure 28:
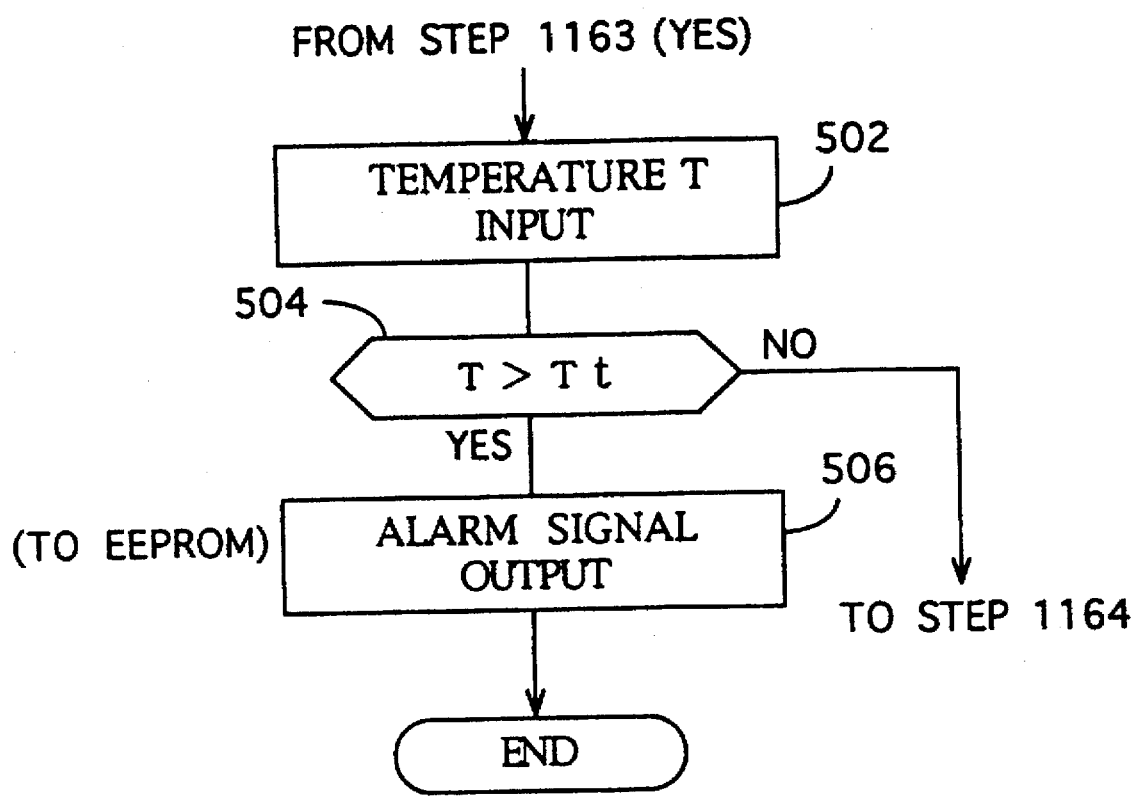
FIG. 28 is a flow chart showing the valve close detection subroutine employed by the embodiment 9.

The embodiment 9 is illustrated in FIG. 28. The present embodiment detects trouble with the valve 14 by the temperature which is detected by the temperature sensor 6 in the pre-heating period.

Initially, the pre-heating is executed at the step 1163. At the next step 502, the temperature T is detected by the temperature sensor 6. If the valve 14 is closed, the temperature rises extremely high. At the step 504, it is judged whether the detected temperature T is higher than the predetermined temperature Tt or not. If T is not higher than Tt, the routine returns to the main routine (at the step 1164) as the valve has been opened. Else if T is higher than Tt, the valve-closing signal is memorized in the non volatile memory (EEPROM) as the valve has not been opened. The non volatile memory outputs an alarm signal for turning the alarm lamp 9 on at the step 506. Then, the routine ends after the alarm lamp 9 is turned on.

EMBODIMENT 10

Figure 29:
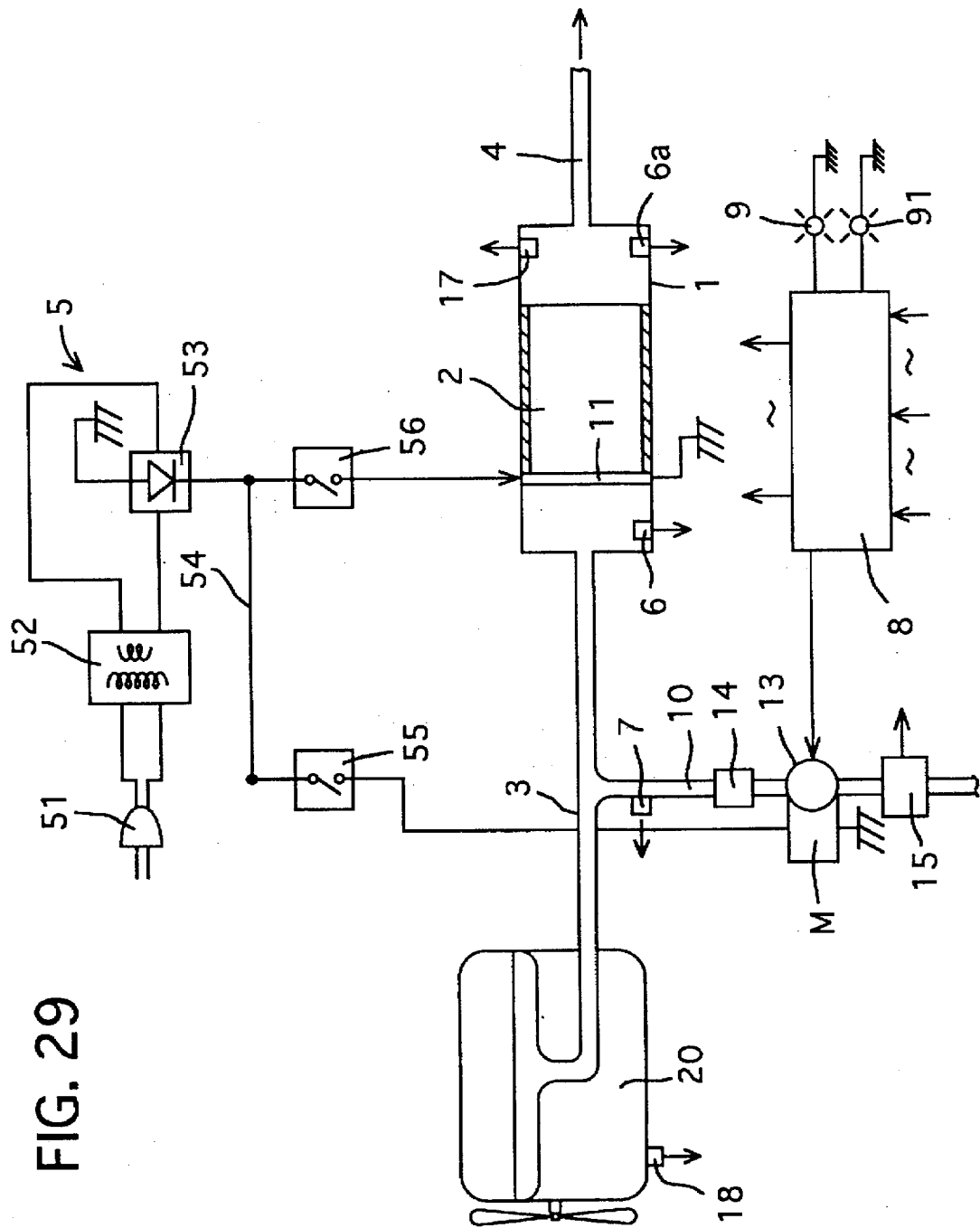
FIG. 29 is a basic block diagram illustrating the embodiment 10 of the exhaust gas purifier.

The embodiment 10 is illustrated in FIG. 29. In the present embodiment, the upstream side pressure sensor 7 is disposed in a portion of the blowing tube 10, which is positioned at the downstream side of the valve 14. The pressure sensor 7 may be disposed in a tube diverging from the blowing tube 10. Consequently, the particles attached to the pressure sensor 7 are removed by the supplied fresh air. Accordingly, the pressure sensor 7 is always kept clean. Further, the particles attached to the pressure sensor 7 are decreased because the valve 14 is closed while the engine 20 is driven. Accordingly, the trouble of the pressure sensor 7 is prevented. Also, the temperature sensor 6 may be disposed in the blowing tube 10.

EMBODIMENT 11

The embodiment 11 is illustrated in FIG. 19. The present embodiment is related to a power supply system for the regeneration operation.

After the plug 51 is connected to a commercial power source line (AC 200 V), the transformer 52 drops the voltage and the rectifier 53 rectifies the voltage and supplies a direct voltage 24 V to the high level power line 54 as shown in FIG. 19. However, the controller 8 is supplied power by the car battery independently.

In the present invention, the blower motor M and the heater 11 are supplied power via the switches 55 and 56 from the high level power line 54. The switches 55 and 56 are switched by the duty ratio signal. The voltage divider 58 which consists of the resistors R1 and R2 connected in series is connected between the high level power line 54 and the earth line. The divided voltage outputted from the voltage divider 58 is inputted to the controller 8 as the signal of the applied voltage and is converted to the digital signal by an A/D converter (not shown). Further, the current sensor 59 is disposed in the power supply line which connects the heater 11 and the switch 56. The current sensor 59 detects the current supplied to the heater 11.

Figure 30:
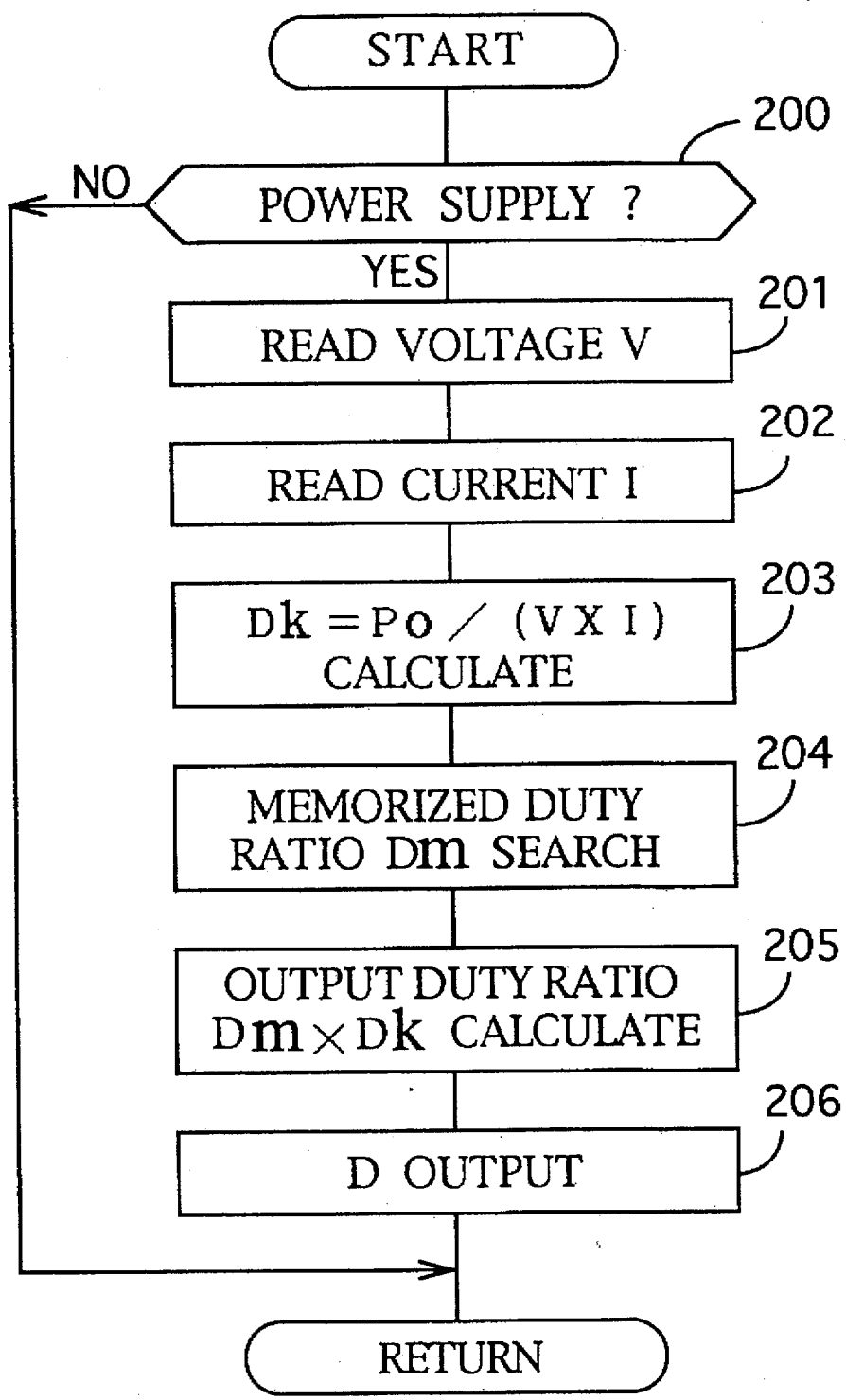
FIG. 30 is a flow chart showing the power control sub routine employed by the embodiment 11.

FIG. 30 shows the duty ratio control subroutine executed at intervals of a certain predetermined period, for example 500 m seconds.

Initially, at the step 200, it is judged whether the power is supplied to the heater 11 or not. If the power is not supplied, the subroutine operation returns to the main routine. Else if the power is supplied to the heater 11, the voltage V applied to the high level power line 54 is detected by the voltage divider 58 at the step 201. Further, the current supplied to the heater 11 is detected by the current sensor 59 at the step 202. At the next step 203, the duty ratio corrective coefficient Dk is calculated in accordance with the next formula.

$$Dk=Po/(V\times I)$$

Po is the standard power value which must be supplied at the condition that the duty ratio is 100%. The value of "(V×I)" indicates an actual heating power value.

At the next step 204, the current duty ratio Dm which is stored in the memory is searched. At the next step 205, the output duty ratio D is calculated by the following formula.

$$D=Dm\times Dk$$

Then, at the step 206, the calculated output duty ratio D is outputted and the switch 56 is switched by the constant frequency carrier signal having the output duty ratio D.

Therefore, the variation of the heat quantity that the heater 11 generates is prevented despite a variation of the voltage applied to the heater 11 and a variation of the resistance of the heater 11. Consequently, the highest temperature of the filter becomes constant in spite of the above mentioned causes. In the present embodiment, the voltage supplied to the heater 11 and the current supplied to the heater 11 are detected. Therefore, the duty ratio is controlled in accordance with a corrective ratio between the actual heating power P, which shows as following formula, and a required heating power.

$$P=V\times I$$

Namely, the duty ratio of the switch for controlling the heating power is controlled in accordance with the corrective ratio to correspond the actual heating power with the necessary heating power.

Therefore, the variation of the heating power is prevented despite the variation of the resistance of the heater 11 and the variation of the voltage applied to the heater 11.

EMBODIMENT 12

Figure 31:
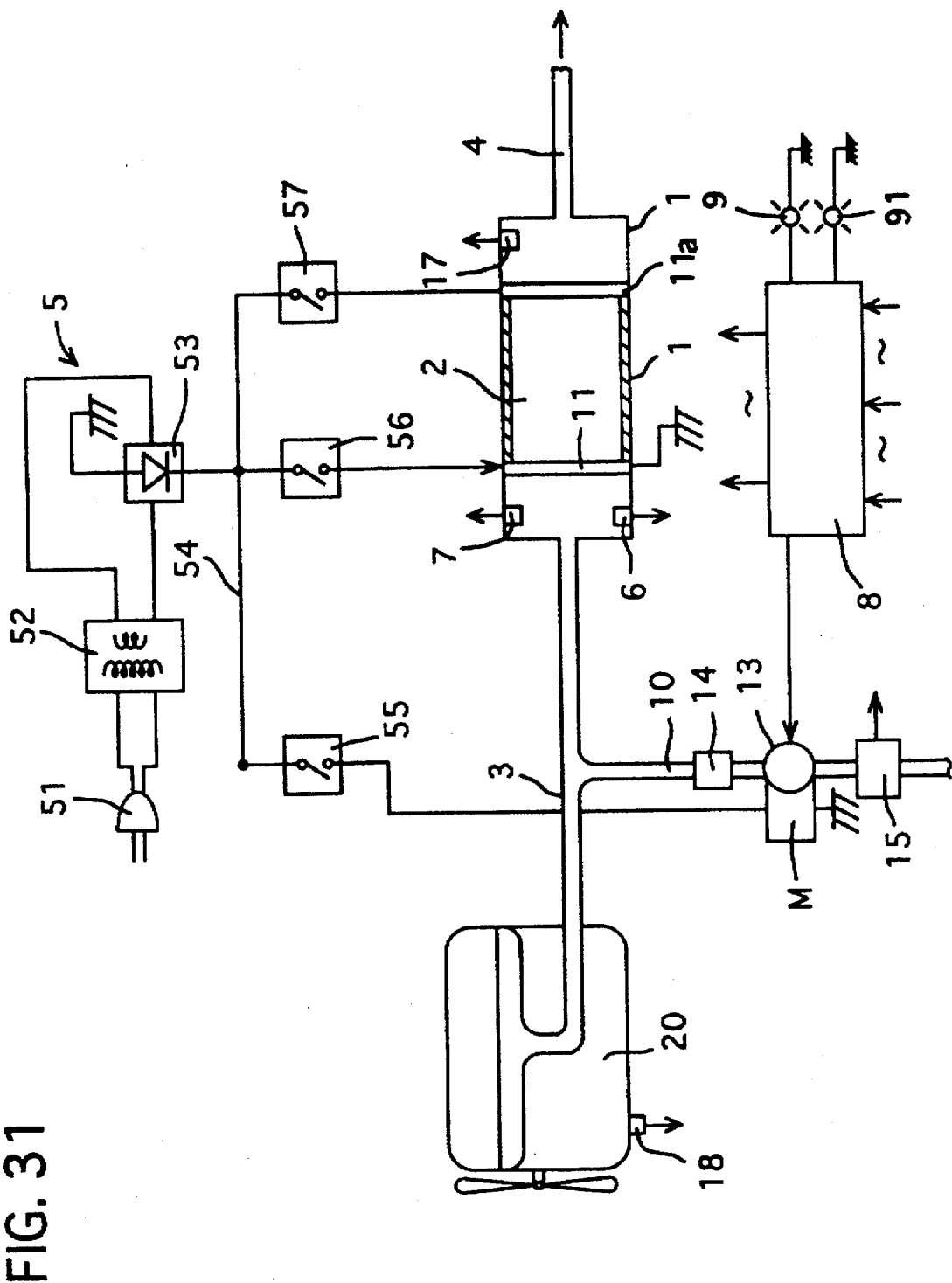
FIG. 31 is a basic block diagram illustrating the embodiment 12 of an exhaust gas purifier.
Figure 32:
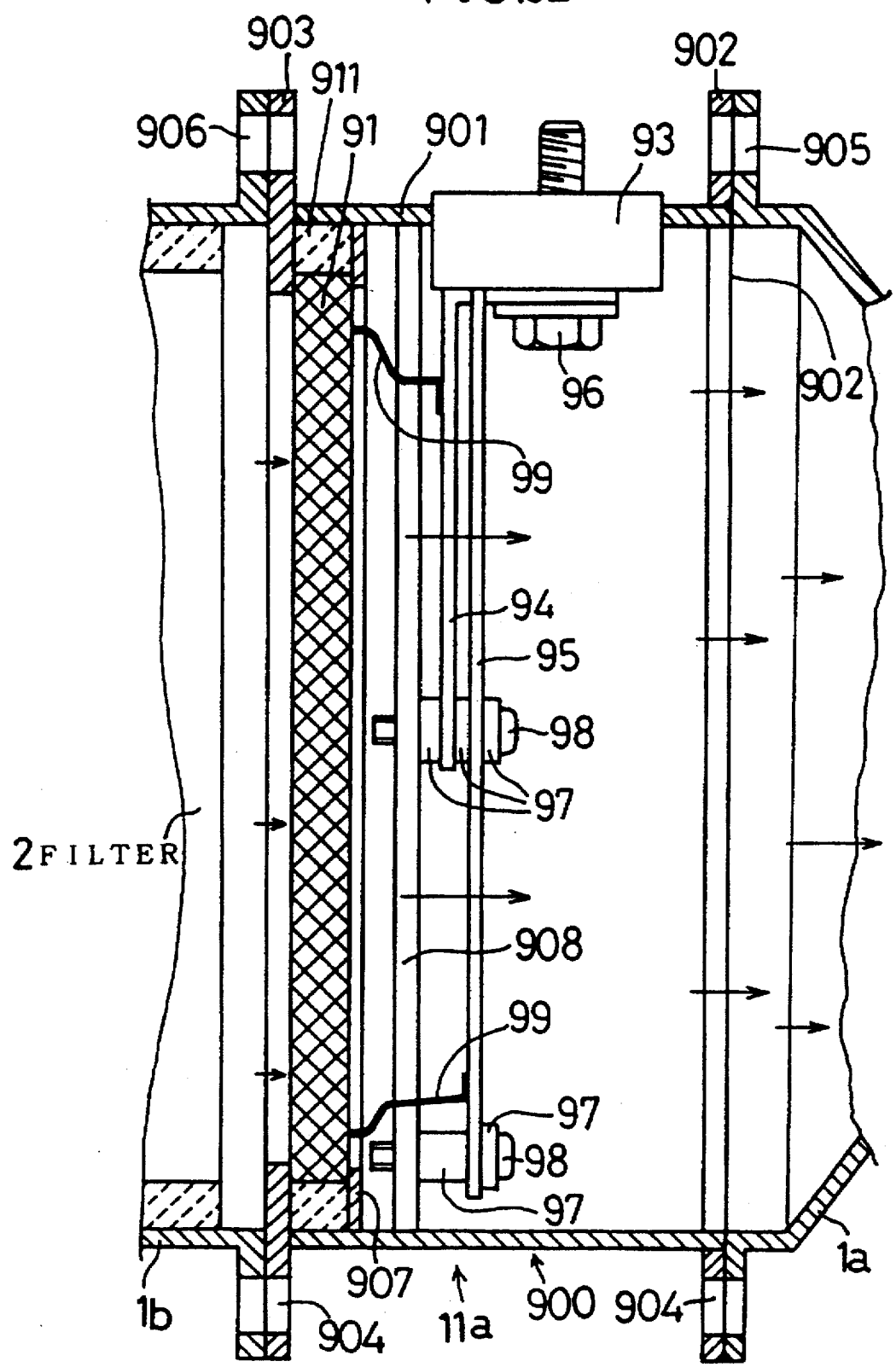
FIG. 32 is an expanded side sectional elevation illustrating an area located near the catalytic heater of the exhaust gas purifier illustrated in FIG. 31.
Figure 33:
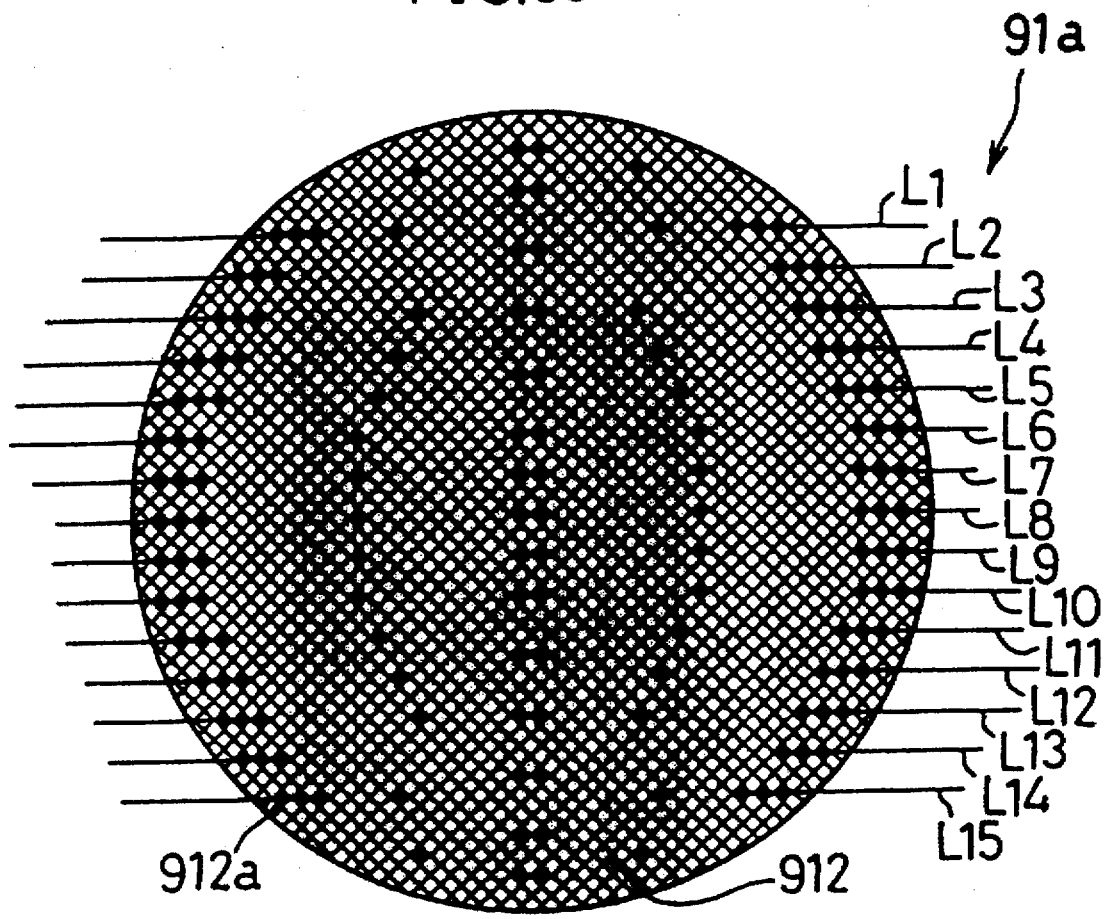
FIG. 33 is an expanded sectional elevation illustrating an area located near the catalytic heater of the exhaust gas purifier illustrated in FIG. 31.

The embodiment 12 is illustrated in FIGS. 31–33.

The FIG. 31 shows a catalyst heater 11a disposed near the downstream end surface of the filter 2. The catalyst heater 11a has a holder 900 and the electric heating line 91a. The holder 900 consists of a ceramic honeycomb body having catalyst particles. The electric heating line 91a is made of Kanthal.

In the present embodiment, the heater 11 for the firing has fundamentally the same structure and material as the catalyst heater 11a, but does not have the catalyst particles. The heater 11 is disposed near the upstream end surface of the filter 2. The structure of the catalyst heater 11a is described as referred to FIGS. 32–34. The catalyst heater 11a has a case 90. The case 90 is disposed between the funnel shape tube 1a and the cylindrical portion 1b. The tube 1a is connected to the tail pipe 4 which consists of the downstream portion of the exhaust tube. The cylindrical portion 1b accommodates the filter 2. The filter accommodating case 1 consists of the case 90, the funnel shape tube 1a and the cylindrical portion 1b. The case 90 accommodates the honeycomb shape holder 91 holding the electric heating line 91a. Accordingly, the case 90, the holder 900 and the electric heating line 91a are the main members of the catalyst heater 11a.

The case 90 consists of the cylinder 901 and the ring plates 902, 903. The cylinder 901 is made of stainless steel. The ring plates 902, 903 are fixed to both ends of the cylinder 901 by welding. The outer peripheral portions of the ring plates 902 and 903 have the through holes 904. The through holes 904, the through holes 905 of the tube 1a and the through holes 906 of the cylinder portion 1b are fixed by bolts (not shown).

Figure 34:
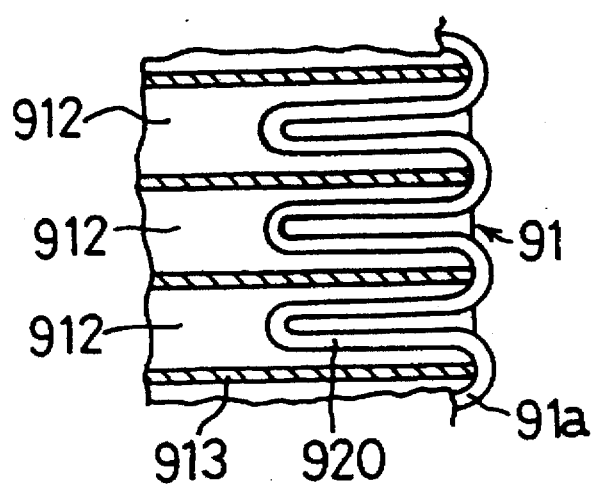
FIG. 34 is an expanded cross-sectional view in the radial direction illustrating an area located near the catalytic heater of the exhaust gas purifier illustrated in FIGS. 32 and 33.

The holder 900 consists of the honeycomb structure made of the same material and by same production process with the filter 2. Furthermore, the holder 900 has the catalyst particles. As shown in FIG. 34, the holder 900 has a number of cells (through holes) 912. As shown in FIG. 33, the holder 900 is accommodated in the downstream portion of the cylinder 901. The mat 911 made of expandable ceramic material is disposed between an outer peripheral surface of the holder 900 and an inner peripheral surface of the cylinder 901. The downstream end surfaces of the mat 911 and the outer peripheral portion of the holder 900 are attached to the ring plate 903. The ring plate 907 is fixed in the cylinder 901. The mat 911 and the holder 900 are disposed between the ring plates 907 and 903.

FIG. 34 shows the electric heating line 91a. The electric heating line 91a, which is made of the bare Kanthal line, has, a number of bending portions 920. Each bending portion 920 has a character U shape and is inserted into each cell 912 from the downstream side end surface of the holder 900.

FIG. 33 shows the downstream end surface of the holder 900.

The heating line 91a consists of heating lines L1–L15 to connect each other in series (or in parallel). The heating lines L1–L15 are disposed in the horizontal direction of FIG. 33 along the end surface of the holder 91. Each heating line L1–L15 has the bending portion 920 accommodated in each of the cells 912. Further, cells 912a shown as black points in FIG. 33, which are cells 912 accommodating the bending portion 920, are filled up by ceramic filling material (name of the product is SUMICERAM which is produced by SUMITOMO THREE M CO., LTD.). The ceramic filling material which is hardened fixes the electric heating line 91a.

Furthermore, the catalyst heater 11a has the bare electric heating line 91a having a number of bending portions which have a character U shape and are inserted into the cells of the holder consisting of the ceramic honeycomb. Therefore, it is possible to supply the power to the catalyst heater without increasing of air supply resistance.

FIG. 32 shows the holding means of the heater. The holding plate 908 is disposed in the radial direction at the downstream side of the ring plate 907. Both ends of the holding plate 908 are fixed to the inner peripheral surface of the cylinder 901. Further, the insulator 93 is fixed at the cylinder 901. The insulator 93 is screwed by two bolts 96. Both ends of the terminal bars 94, 95 are fixed on the insulator 93 and the holding plate 908 respectively. 97 is an insulator tube and 98 is a screw for fixing the terminal bars 94, 95. Further, the power supply lines 99 individually connect the terminal bars 94 and 95 with both ends of the electric-heating line 91a.

The holder 900 is made of porous cordierite material and has the catalyst particles. In the present embodiment, platinum (Pt) particles are employed as the catalyst particles. There are 2 g of platinum particles per liter of the holder 900. The platinum particles are fixed to the porous wall 913 of the holder 900. In order to increase a surface area, the catalyst particles are fixed after coating γ- alumina on the surface of the holder 900.

The process fixing the catalyst to the holder 900 is described as follows.

Initially, the holder 900 (made by NGK CO, LTD.) made of porous cordierite is sunk in slurry. The slurry consists of γ- alumina powder (JAC 400, made by CATALER INDUSTRY CO., LTD.), alumina sol (made by NISSAN CHEMICAL CO., LTD.) and aluminum nitrate aqueous solution and has a viscosity of 100–400 PSI. Then, the holder 900 is heated at 120° C. and burned at 650° C. Then, by absorbing platinum ammonium complex, the platinum content in the holder 900 is controlled to 2 g per liter of volume. Next, the holder 900 is heated for 1 hour at 500° C. in the electric furnace after the holder 91 had been dried for 2 hours at 120° C.

The regeneration operation of the filter is described as follows.

Figure 35:
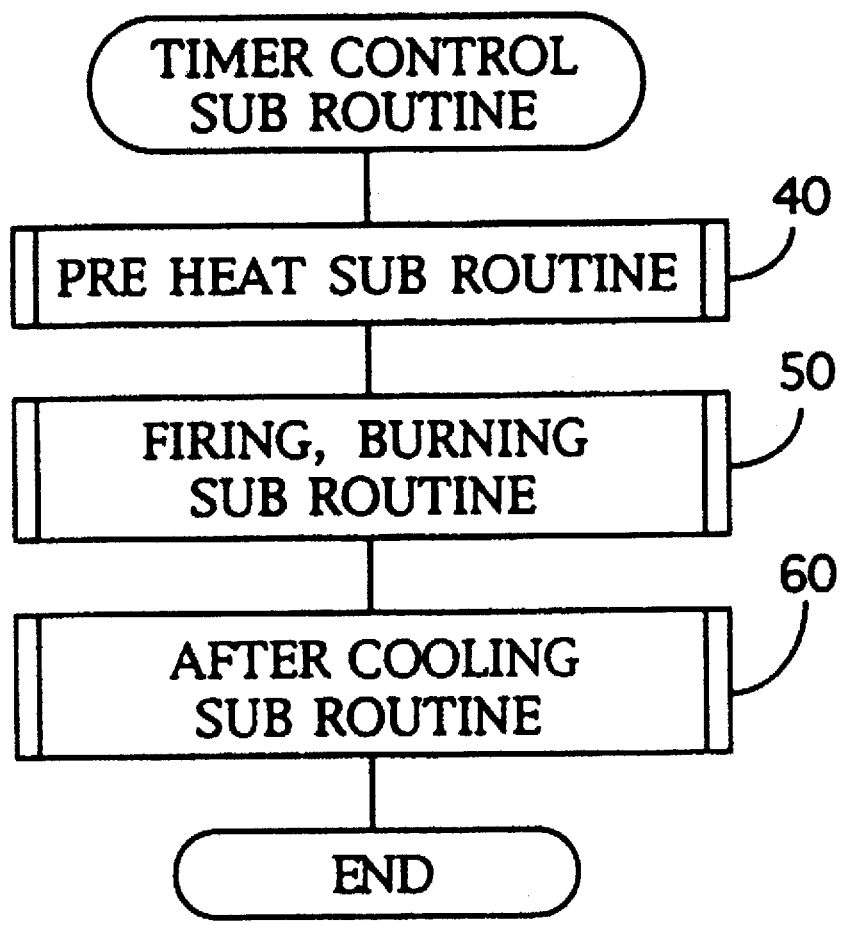
FIG. 35 is a flow chart showing the timer controlling subroutine employed by the exhaust gas purifier of the embodiment 12.

The regeneration operation of the preferred embodiment 12 is fundamentally the same as the preferred embodiment 1 except for the timer control subroutine. The timer control subroutine of the present embodiment as shown in FIG. 35 consists of the pre-heating subroutine 40, the firing and burning subroutine 50 and the after cooling subroutine 60.

The pre-heating subroutine 40 rises of the temperature of the filter 2 by driving the heater and the blower. The firing and burning subroutine executes the burning of the particles. The after-cooling subroutine executes the cooling of the filter. The pre-heating subroutine 40 takes 10 minutes. In the pre-heating subroutine 40, a power of 0.9 kW is supplied to the firing heater 11 and to the catalyst heater 11a. Further, an air flow rate of 200 liters per minute is supplied. The firing and burning subroutine 50 takes 40 minutes. In the firing and burning subroutine 50, a power of 2 kW is supplied to the firing heater 11 and a power of 0.3 kW is supplied to the catalyst heater 11a. Further, an air flow rate of 20 liters per minute is supplied. The after cooling subroutine 60 takes 10 minutes. In the after cooling subroutine 60, the heater 11 is cut off the power and a, power of 0.3 kW is supplied to the catalyst heater 11a. Further, an air flow rate of 200 liters per minute is supplied.

In the period of the pre-heating subroutine, S.O.F. including in the collected particles in the filter 2 is vaporized and becomes the regeneration smoke after the temperature of the filter 2 has risen above 200° C. The then temperature of the catalyst heater 11a is about 500° C. Therefore, the regeneration smoke is resolved by, the catalyst particles. In the periods of the firing and burning subroutine and after-cooling period, the catalyst heater 11a also resolves the regeneration smoke.

EMBODIMENT 13

The catalyst heater 11a can resolve exhaust fumes and blue-white smoke which are generated when a diesel engine is started cold.

Figure 36:
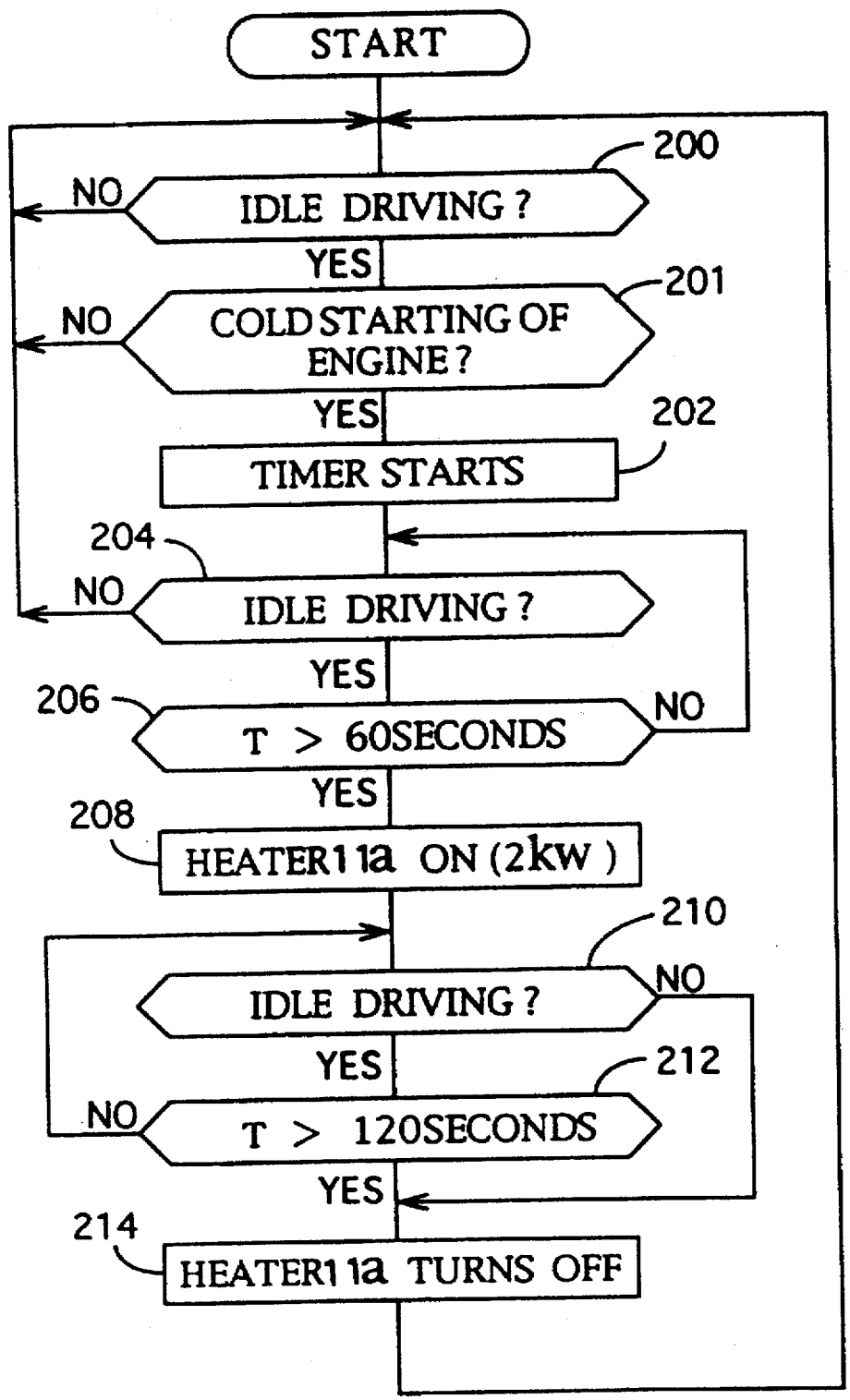
FIG. 36 is a flow chart showing the pre-heating subroutine employed by the exhaust gas purifier of the embodiment 13 illustrated in FIG. 35.

The flow chart illustrated in FIG. 36 shows the resolving operation of the exhaust fumes and the blue-white smoke.

The diesel engine employed in the present embodiment has a heater for heating supplied air in an intake manifold and a glow plug in, a burning chamber similar to an ordinary diesel engine for a car. The heater in the manifold for supplying air to the diesel engine is called a diesel engine heater. The Power is supplied to the diesel engine heater for about 1 minute from starting the engine in order to heat the supplied air. Also, power is supplied to the glow plug for about 1 minute from starting the engine in order to help combustion operation of the diesel engine. In the present embodiment, the power being supplied to the catalyst heater 11a is cut off or decreased for a predetermined period (for example about 1 minute) from starting a cold diesel engine in which cooling water has a temperature less than 0° C.

In the flow chart shown in FIG. 36, initially, the routine is started by a signal of starting the diesel engine.

At the step 200, the engine rotation speed Ne is inputted and it is judged whether the rotation speed of the diesel engine is in the idle rotation speed range or not. If the engine rotation speed Ne is higher than the idle rotation speed range, the temperature of the exhaust gas is hot enough to abbreviate the resolving operation of the blue-white smoke and the exhaust fumes because they are not significant.

If the rotation speed of the diesel engine is in the idle rotation speed range, the routine goes on to the step 201. At the step 201, the temperature of the cooling water in the diesel engine is inputted from a cooling water temperature sensor (not shown) and it is judged whether the temperature of the cooling water is less than 40° C. or not. If the temperature of the cooling water is not less than 40° C., the routine returns to the step 200. Else, if the temperature of the cooling water is less than 40° C., the timer is started at the step 202 as the blue-white smoke and the exhaust fumes are generated because the diesel engine is too cold. At the next step 204, it is also judged whether the engine rotation speed is in the idle rotation speed range or not. If the rotation speed is not in the idle rotation speed range, the routine returns to the step 200. Else if the rotation speed is in the idle rotation speed range, it is judged whether the counted time T of the timer reaches to 60 seconds or not, at the step 206. If the counted time T of the timer has not reached to 60 seconds, the routine returns to the step 204. Else if the counted time T of the timer has reached to 60 seconds or more at the step 208, a power of 2 kW is supplied to the catalyst heater 11a because the power supply to the diesel engine heater and the glow plug has quitted.

Therefore, the rapidly heated catalyst particles resolves the blue-white smoke and the exhaust fumes including the exhaust gas. Further, the catalyst particles resolves the HC, CO and Formaldehyde included in the exhaust gas.

At the next step 210, it is judged again whether the rotation speed of the engine is in the idle rotation speed range or not. If the rotation speed is not in the idle rotation speed range, the routine goes on to the step 214. If the rotation speed is in the idle rotation speed range, it is judged at the step 212 whether the timer started at the step 202 exceeds 120 seconds or not. If the time T counted by the timer is not longer than 120 seconds, the routine returns to the step 210. Else if the time T counted by the timer exceeds 120 seconds, the routine goes on to the step 214. At the step 214, the power supplied to the catalyst heater 11a is cut off and the routine returns to the step 200.

Namely, in the present embodiment, the power being supplied to the catalyst heater 11a for reducing the blue-white smoke and the exhaust fumes is delayed for 1 minute from the starting of the diesel engine. Accordingly, the synchronous supplying of the power to the glow plug and the catalyst heater 11a is prevented. Further, the heat stress of the filter 2 is alleviated.

As described above, the catalyst heater 11a of the present embodiment resolves all of the blue-white smoke, the exhaust fumes generated at the cold starting of the diesel engine and the regeneration smoke generated at the regeneration operation. Further, it decreases the particles from remaining in the downstream portion of the filter 2 by heating the downstream portion.

EMBODIMENT 14

Figure 37:
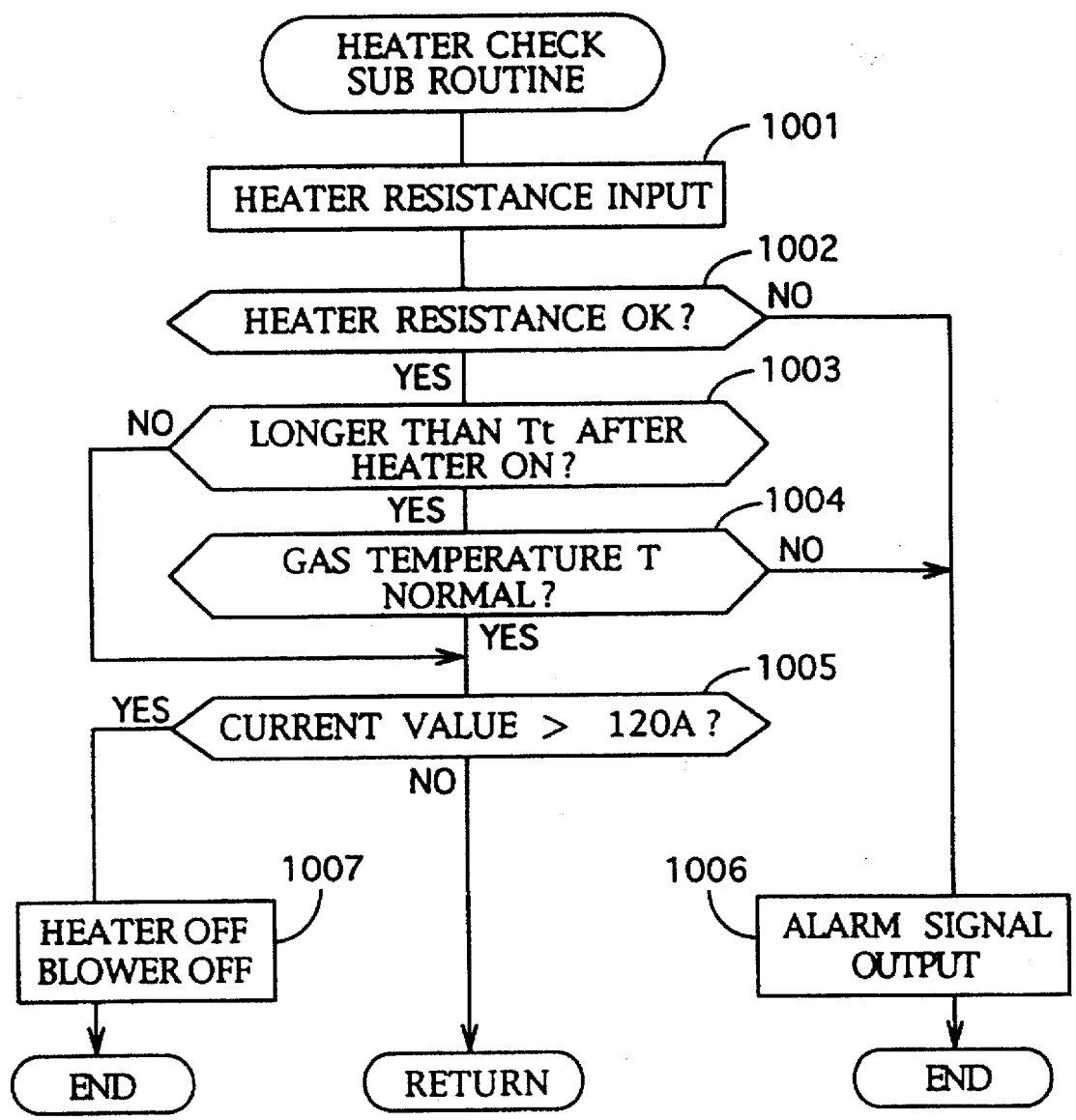
FIG. 37 is a flow chart showing the heater testing subroutine employed by the exhaust gas purifier of the embodiment 14.

FIG. 37 illustrates the flow chart showing the heater check subroutine of the embodiment 14. The heater check subroutine is executed before the execution of the step 1161 shown in FIG. 20, namely just after starting of the timer control subroutine.

Figure 41:
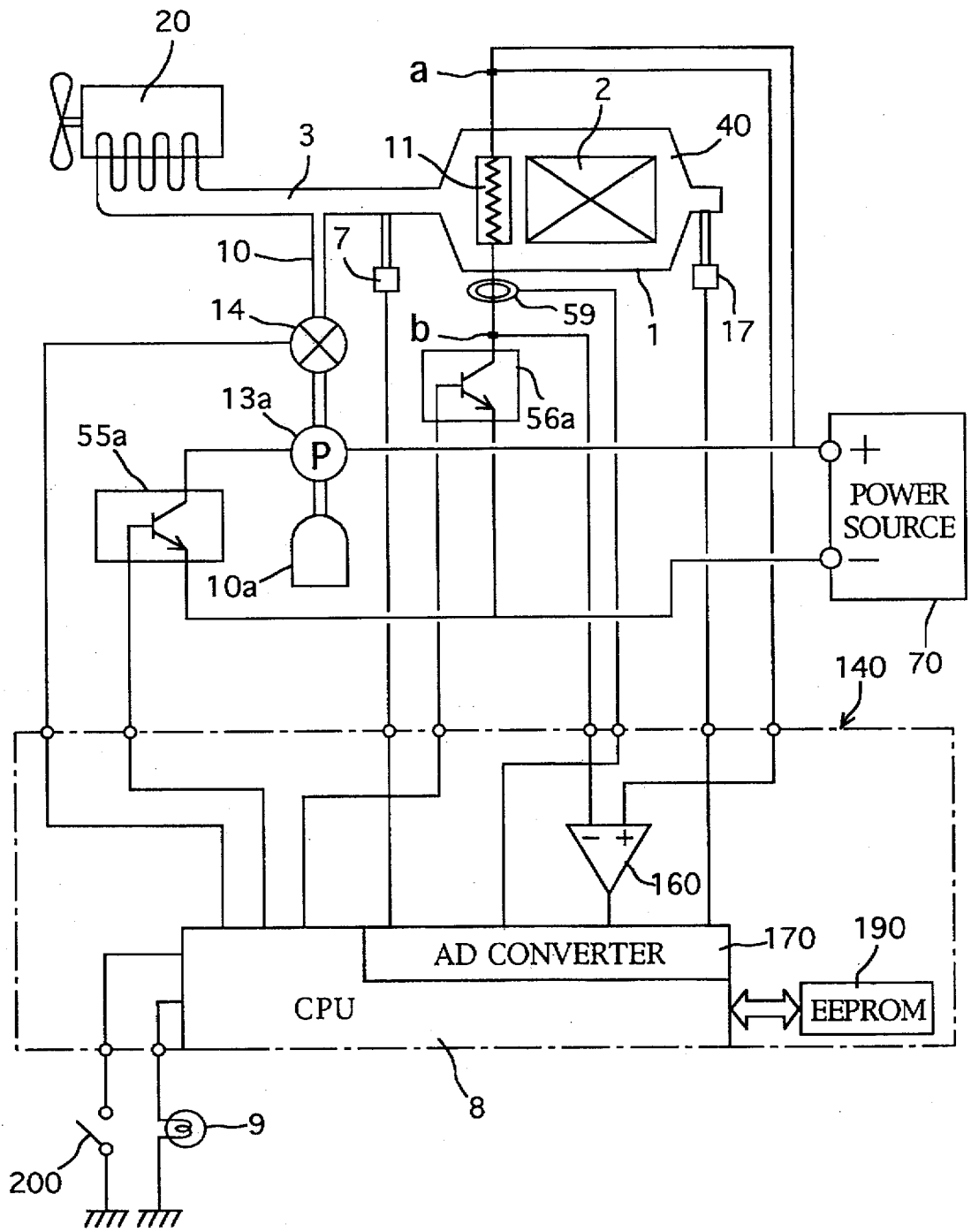
FIG. 41 is a block diagram showing the exhaust gas purifier of the embodiment 16.

Initially, in FIG. 41, the signal which is proportional to a voltage drop of the resistance of the heater 11 having a low resistance value is inputted by the differential amplifier 16a at the step 1001. At the next step 1002, it is judged whether the voltage drop signal being proportional to the resistance value of the heater 11 is in the predetermined allowable range or not. The predetermined allowable range has been written in the memory previously and is the range of resistance which is equal to 90–110% of an initial resistance value of the heater 11 in the present embodiment. If the voltage drop signal is not in the allowable range, it is judged that the heater 11 is abnormal. Accordingly, the routine ends after the alarm lamp 9 is turned on at the step 1006. If the voltage drop signal is in the allowable range, the routine goes on to the step 1003. The power source 11a applies the predetermined constant value of a direct voltage to the heater 11 and the transistor 56a. At the step 1003, it is judged whether the predetermined constant time Tt (8 minutes in the present embodiment) since starting the power supply to the heater 11 has passed or not. If the time Tt has not passed, the routine goes on to the step 1005. Else if the time Tt has passed, at the next step 1004, it is judged whether the temperature of the supplied air, which is detected in the pre-heating period by the temperature sensor 6 (for example shown in FIG. 1), is in the range of 220°–280° C. or not. If the temperature is not in the range, it is judged that the heater 11 is abnormal. Accordingly, the alarm lamp 9 is turned on at the step 1006 and the routine ends. Else if the temperature is in the range, at the next step 1005, it is judged whether the voltage drop of the heater 11 is larger than a previously memorized constant value of the voltage drop or not. In the present embodiment, the constant value of the voltage drop is described as following formula.

(the constant value of the voltage drop)=(120 A)×(initial resistance value of the heater 11)

If the voltage drop is larger than the constant value, it is judged that the supplied current is higher than 120 A. Accordingly, the power supply to the heater 11 and the blower 13 (for example shown in FIG. 1) are cut off and the alarm lamp 9 turns on at the step 1007. Then, the routine ends. If the current is not greater than 120 A at the step 1005, it is judged that the heating quantity generated by the heater 11 is in a predetermined normal range. Accordingly, the routine returns to the main routine to execute the timer control subroutine.

In the above described present embodiment, the errors of the heater 11, for example a short circuit error, a variation of the resistance and cut-off of the line, are detected in accordance with the resistance of the heater 11 and the temperature detected by the temperature sensor 6 located near the heater 11. Consequently, it is possible to monitor the heater 11 and protect the filter without any additional sensors. Consequently, by monitoring of the resistance value of the heater 11, it is possible to detect any trouble with the heater 11 while the power is on the heater 11.

EMBODIMENT 15

Figure 38:
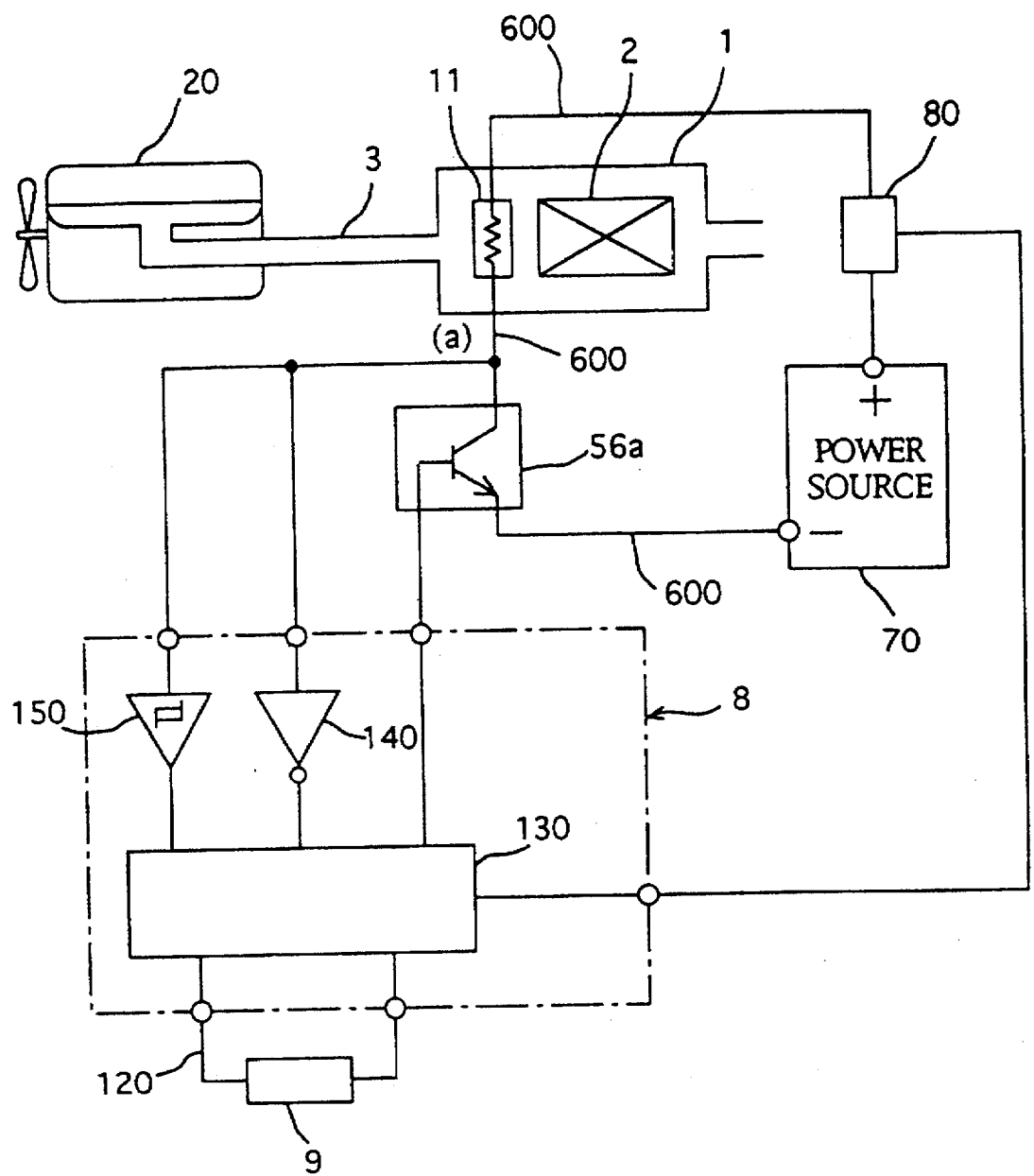
FIG. 38 is a block diagram illustrating the exhaust gas purifier of the embodiment 15.
Figure 39:
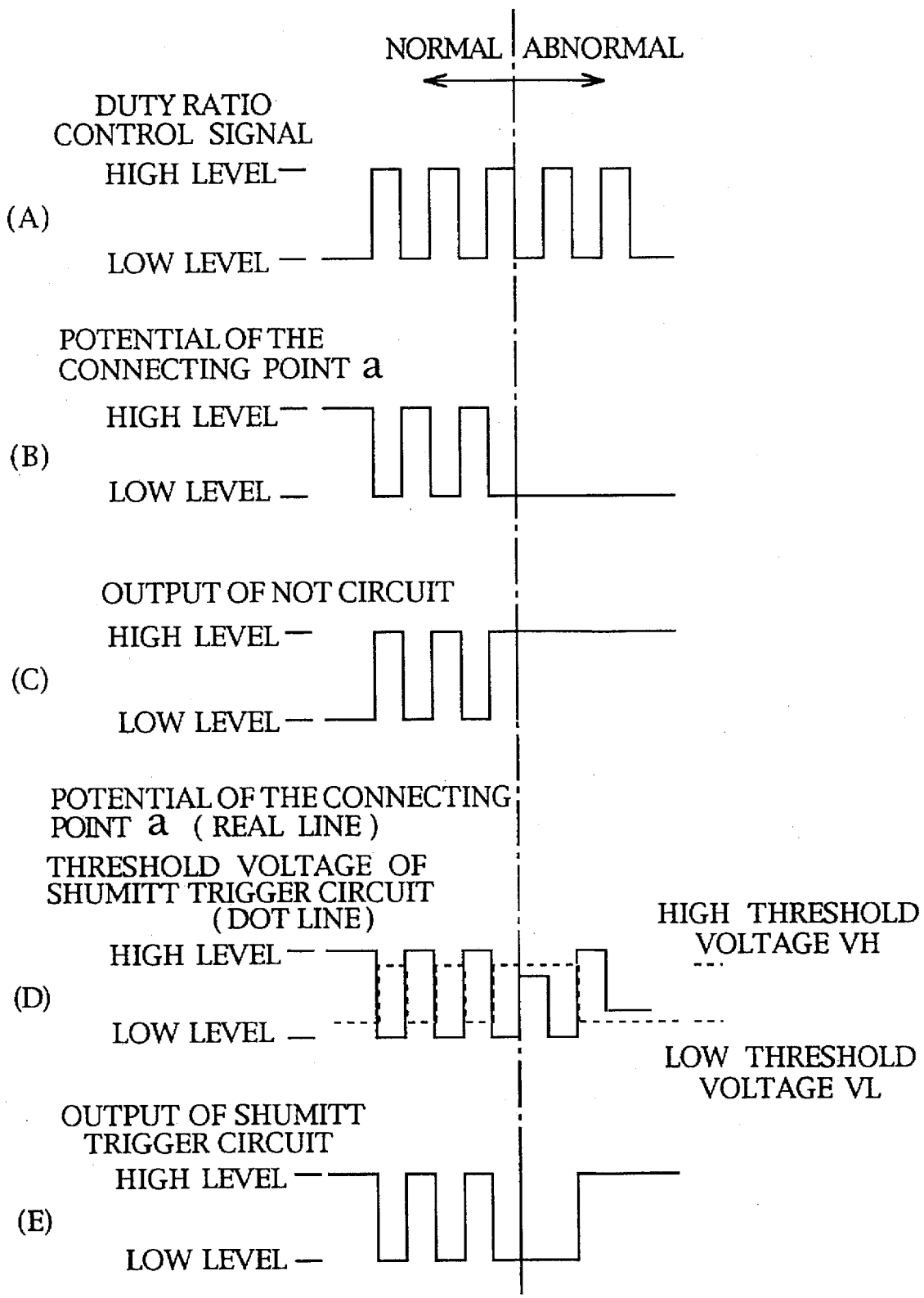
FIG. 39 is a timing chart illustrating the operation of an exhaust gas purifier of the embodiment 15.
Figure 40:
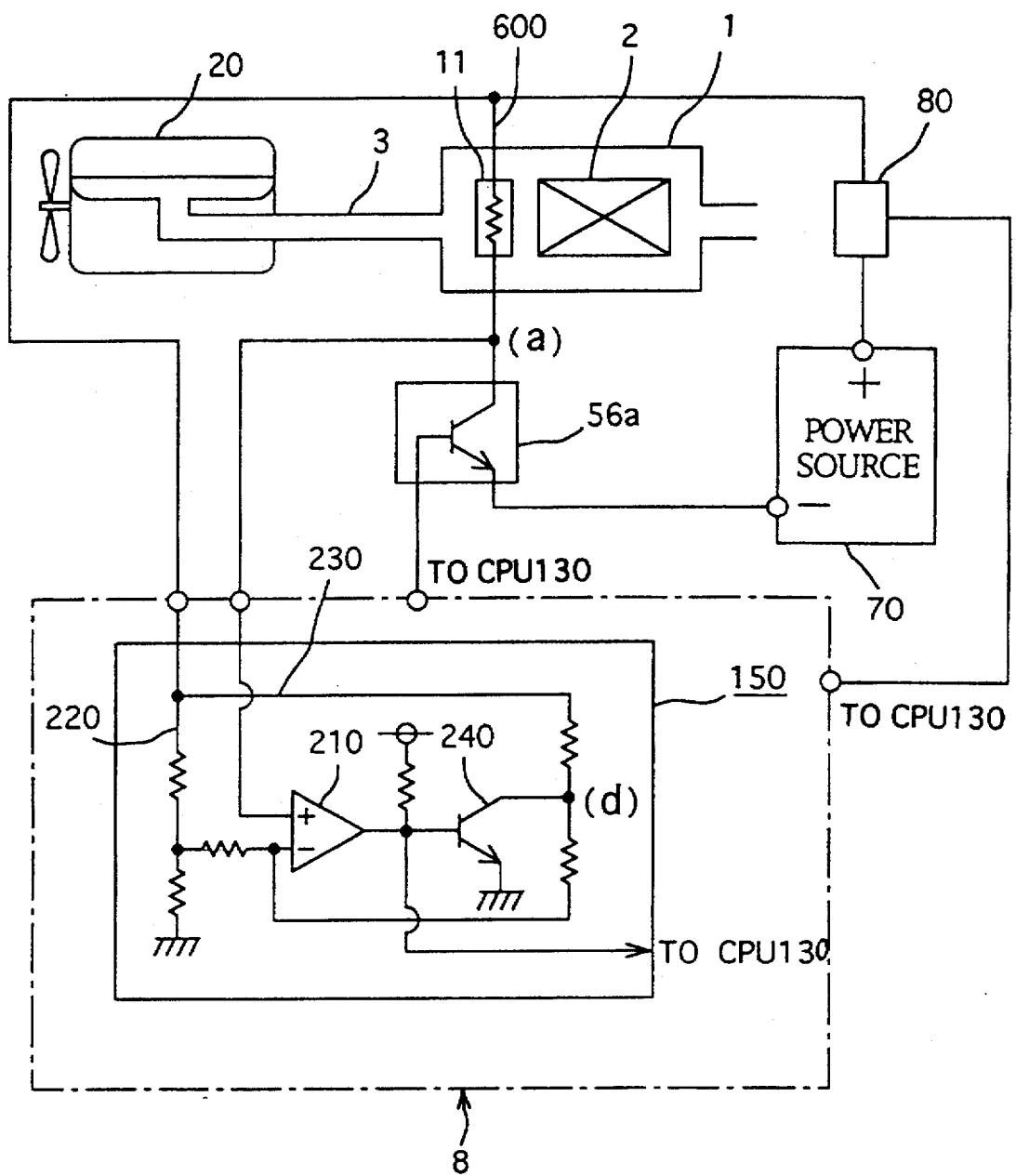
FIG. 40 is a circuit diagram showing an example of the Schmitt trigger circuit shown in FIG. 38.

FIGS. 38–40 illustrate the embodiment 15.

FIG. 38 illustrates the block diagram showing the exhaust apparatus of the present embodiment. The exhaust tube 3 of the diesel engine 20 includes an exhaust gas purifier case 1. The exhaust gas purifier case 1 accommodates the filter 2 and the electric heater 11. The filter 2 is made of porous ceramic material. The heater 11 is connected to the battery 70 of a via the power circuit 600. The power circuit 600 has a circuit break switch 80 and switching transistor 56a. The base electrode of the switching transistor 56a and an alarm lamp circuit 120 are connected to the electronic control unit (ECU 8).

ECU 8 consists of the CPU 130, a NOT circuit 140, a Schmitt circuit 150 and other circuit elements including ROM, RAM and a wave generator (not shown). The NOT circuit 140 and the Schmitt circuit 150 are connected to the CPU 130. ECU 8 deals with inputted signals in accordance with the predetermined program and outputs control signals for controlling the duty ratio of the switching transistor 56a and the alarm signal for turning on the alarm lamp circuit 120. The connecting point (a) of the heater 11 to switching transistor 56a in the power control circuit is connected to input terminals, of the NOT circuit 140 and the Schmitt circuit 150. The output terminals of circuits 140 and 150 are connected to the CPU 130. The operation of the exhaust gas purifier in the present embodiment is described as follows.

The CPU 130 generates the duty ratio signal for the switching transistor 56a. Therefore, the amount of power supplied to the heater 11 is controlled by the duty ratio.

As shown in timing charts (A), (B), (C) as illustrated in FIG. 39, if a high duty ratio control signal is outputted from the CPU 130 in order to turn on the switching transistor 56a, the power circuit 600 is turned on and the power is supplied to the heater 11. At that time, the electric potential of the connecting point (a) of the power control circuit 600 is a low level. Meanwhile, if the duty ratio control signal changes to a low level, the switching transistor 56a and the heater 11 are cut off and the potential of the connecting point (a) changes to a high level.

The potential of the connecting point (a) is inputted into CPU 130 after the potential is inverted by the NOT circuit 140. Accordingly, the duty ratio control signal outputted from the CPU 130 and the potential signal inputted into the CPU 130 are synchronized in the transient period in which the level of the signals changes from high to low or from low to high. Further, both of the signals have the same level in the stable period. If the switching transistor 56a short-circuits, the potential of the connecting point (a) is low as shown in a right side of FIG. 39 (B) even if the duty ratio control signal is at a low level. Accordingly, the potential signal outputted from the NOT circuit 140 to the CPU 130 rises to a high level as shown in the right side of FIG. 39. Consequently, it is possible to test the condition of the exhaust gas purifier by comparing the duty ratio control signal from the CPU 130 with the potential signal from the NOT circuit 140. Namely, if both of the two signals have same level, the purifier operates in normal conditions. However, if the two signals have a different level each other, it is judged that the purifier operates in abnormal conditions.

The functions of the Schmitt circuit 150 is described as follows. A threshold voltage of the Schmitt circuit 150 changes the low threshold voltage value VL to, the high threshold voltage value VH at the moment when the potential of the connecting point (a) becomes lower than the low threshold voltage value VL. Similarly, the threshold voltage of the Schmitt circuit 150 changes the high threshold voltage value VH to the low threshold voltage value VL at the moment when the potential of the connecting point (a) becomes higher than the high threshold voltage value VH as shown in the timing chart (D) and (E) in FIG. 39. Accordingly, when the exhaust gas purifier is operated normally, the potential of the connecting point (a) exceeds the high threshold voltage value VH of the Schmitt circuit 150 in the period supplying power to the heater 11. Similarly, the potential of the connecting point (a) becomes lower than the low threshold voltage value VL of the Schmitt circuit 150, in the period cutting off the power supply to the heater 11. Therefore, the variation of the level of the signal inputted from the Schmitt circuit 150 to the CPU 130 becomes the same as the variation of the level of the potential signal at the connecting point (a) and becomes opposite to the level of the duty ratio control signal outputted from CPU 130.

However, if the operation of the heater 11 or the switching transistor 56a is abnormal, the potential of the connecting point (a) can not cross over the threshold voltage value VL or VH of the Schmitt circuit 150. When the switching transistor 56a is not cut off and has some resistance value at the level change timing of the duty ratio control signal, the potential of the connecting point (a) varies from a low level to a high level. However, an absolute potential value of the connecting point (a) becomes lower in comparison with the normal condition and can not cross over the high threshold voltage VH of the Schmitt circuit 150. As shown in the timing charts (A) and (E) illustrated in FIG. 39, if the duty ratio control signal drops to a low level, the level of the signal inputted from the. Schmitt circuit 150 into CPU 130 keeps a low level without synchronous change.

On the other hand, if the duty ratio control signal has changed from the low level to the high level, the potential of the connecting point (a) changes a high level to a low level. However, if the switching transistor 56a has larger resistance value than normal resistance value, the potential of the connecting point (a) becomes higher than the normal potential. Accordingly, the potential of the connecting point (a) can not cross over the low threshold voltage value VL of the Schmitt circuit 150, in some case. Consequently, even if the duty ratio control signal outputted from the CPU 130 becomes to the high level, the signal inputted from the Schmitt circuit 150 into the CPU 130 keeps a high level without synchronous change.

Therefore, by comparing the duty ratio control signal outputted from the CPU 130 with the signal from the Schmitt circuit 150, it is able, to judge that the exhaust gas purifier is normal when both signals have an opposite level to each. Conversely, it is able to judge that the exhaust gas purifier is abnormal when both signals have the same level. Consequently, the power control circuit 600 is cut off by turning off switch 80 and the alarm lamp 9 is turned on.

FIG. 40 shows the example of the Schmitt trigger circuit as employed in the present embodiment. The voltage dividers 220 and 230 divide a voltage of a power source (battery) 70.

The divided voltage signal divided by the voltage dividers 220 and 230 is applied to an inverting (−) input terminal of a differential amplifier 210. The connecting point (a) of the power circuit 600 is connected to a non-inverting (+) input terminal of the differential amplifier 210.

Accordingly, the divided voltage signal applied to the inverting (−) input terminal becomes the threshold voltage. If the potential of the connecting point (a) is low, the differential amplifier 210 outputs a low level signal and the switching transistor 240 is cut off.

Therefore, the potential of a contact point (d) is determined by resistance values of the dividers 220 and 230. Similarly, the threshold voltage of a potential of the (−) input terminal of the differential amplifier 210 is determined by resistance values of the divider 220 and 230.

When the potential of the connecting point (a) is high as shown in FIG. 39, an output voltage of the differential amplifier 210 is high.

Then, the switching transistor 240 is turned on and the connecting point (d) is contacted to the earth. In the above condition, the threshold voltage has a different value from the value of the threshold voltage at the condition that the potential of the connecting point (a) is a low level. The variation of the threshold voltage shown in the timing chart D of FIG. 39 is realized by adjusting resistance values of the voltage dividers 220 and 230.

In some case, the potential of the connecting point (a) can not exceed the threshold voltage, even if the potential of the connecting point (a) varies from a low level to a high level in the case that the threshold voltage is fixed and the voltage drop of the battery is in a normal range. As a result, it may be happened a misjudgment that the condition of the exhaust gas purifier is not normal. However, this type misjudgment is prevented because the variation of the threshold voltage of the Schmitt trigger circuit in the present embodiment is corresponded with the variation of the voltage of the battery 70 and values of the resistances. Some other semiconductor switching power devices can be employed instead of the switching transistors 56a and 240.

As mentioned present embodiment, the voltage drop, of the heater controlled by the duty control method is detected by the voltage detecting means.

Further, the changing timing of the voltage drop detected by the voltage detecting means is compared with a control timing when the heater is turned on or off by a judging means.

The voltage drop detected by the voltage detecting means is compared with both of a predetermined voltage value in a power supply period and a predetermined voltage value in a no-power supply period by a voltage level judging means.

Further, the controller for controlling, monitoring the exhaust gas purifier and alarming of troubles of the exhaust gas purifier alarms in accordance with an output signal of the judging means or the voltage level judging means.

Consequently, the controller makes it possible to increase a reliability of the exhaust gas purifier.

Further, the standard voltage of the voltage level judging means can follow the variation of the voltage of the power source because the voltage level judging means adopts the voltage of the power source. Consequently, the reliability of the exhaust gas purifier increases.

EMBODIMENT 16

FIGS. 41–44 illustrate the embodiment 16.

FIG. 41 shows the block diagram of the exhaust gas purifier of the present embodiment.

The case 1 of the exhaust gas purifier 40 is connected in the exhaust tube 3. The exhaust gas flows through the case 1. The filter 2 is accommodated in the case 1 and is made of porous ceramic material.

The filter 2 collects the particulates in the exhaust gas. The electric heater 11 is accommodated in the case 1. The heater 11 faces the upstream side end surface of the filter 2.

The particulates collected in the filter 2 is fired by the heater 11. One end of air supply tube 10 is connected to the upstream portion of the exhaust tube 3 disposed between the engine 20 and the filter 2. The other end of the air supplying tube 10 is connected via the electromagnetic valve 14, to an outlet of the air pump 13a for the air supply. The electromagnetic valve 14 is the valve for preventing the exhaust gas being blown out through the air supply tube 10. The air pump 13a has a motor for driving the air pump when the power is supplied to the motor.

When the electromagnetic valve 14 is opened, the air is supplied through an air cleaner 10a and the air supply tube 10 into the exhaust tube 3 by the air pump 13a. Further, the heater 11 is connected to the power source 70 via the semiconductor switching device 56a which is npn bipolar transistor.

The predetermined power having required duty ratio is supplied to the heater 11 by switching the semiconductor switching device 56a. The motor of the air pump, 13a is connected to the power source 70 via the semiconductor switching device 55a.

The predetermined power having required duty ratio is supplied to the motor of the air pump 13a by switching the semiconductor switching device 55a which is npn bipolar transistor.

The electronic control unit (ECU) 140 has CPU 8 and the differential amplifier 160. The CPU 8 has an AD converter 170.

The CPU 8 is connected to each base electrode of the semiconductor switching devices 56a and 55a and controls the duty ratios of the semiconductor switching devices 55a and 56a.

The connecting point (a) is connected to the positive input terminal of the differential amplifier 160. The connecting point (b) is connected to the negative input terminal of the differential amplifier 160.

The connecting point (a) is located between the positive terminal of the power source 70 and the one end of the heater 11. The connecting point (b) is located between the semiconductor switching device 56a and the other end of the heater 11.

The output terminals of the differential amplifier 160 and the current sensor 59 are connected to the A/D converter 170. The CPU 8 is connected to the EEPROM 190 and is communicated the data with EEPROM 190.

The EEPROM 190 is able to hold the data despite cut-off of the power supply. A manual switch 200 is connected to the CPU 8.

The CPU 8 detects an initial resistance of heater 11 when the switch 200 is turning on. Further, the CPU 8 is connected to the lamp 9 for notifying a trouble with the heater 11. The CPU 8 is connected to the electromagnetic valve 14 and controls it.

Pressure sensors 7 and 17 are disposed in the exhaust tube 3. The pressure sensor 7 is located near the upstream side of the filter 2 and the pressure sensor, 17 is located near the downstream side of the filter 2.

The pressure sensors 7 and 17 detect an upstream side pressure and a downstream side pressure of the filter 2 of the exhaust gas purifier 40 respectively. The pressure sensors 7 and 17 output the pressure signals to the CPU 8 respectively.

In the present embodiment, the resistance detection means consists of the differential amplifier 160, the current sensor 59 and the A/D converter 170. The CPU 8 consists of an initial resistance calculation means, comparing means and abnormal condition detecting means.

Operation of the above mentioned exhaust gas purifier of the diesel engine is described as follows.

Figure 42:
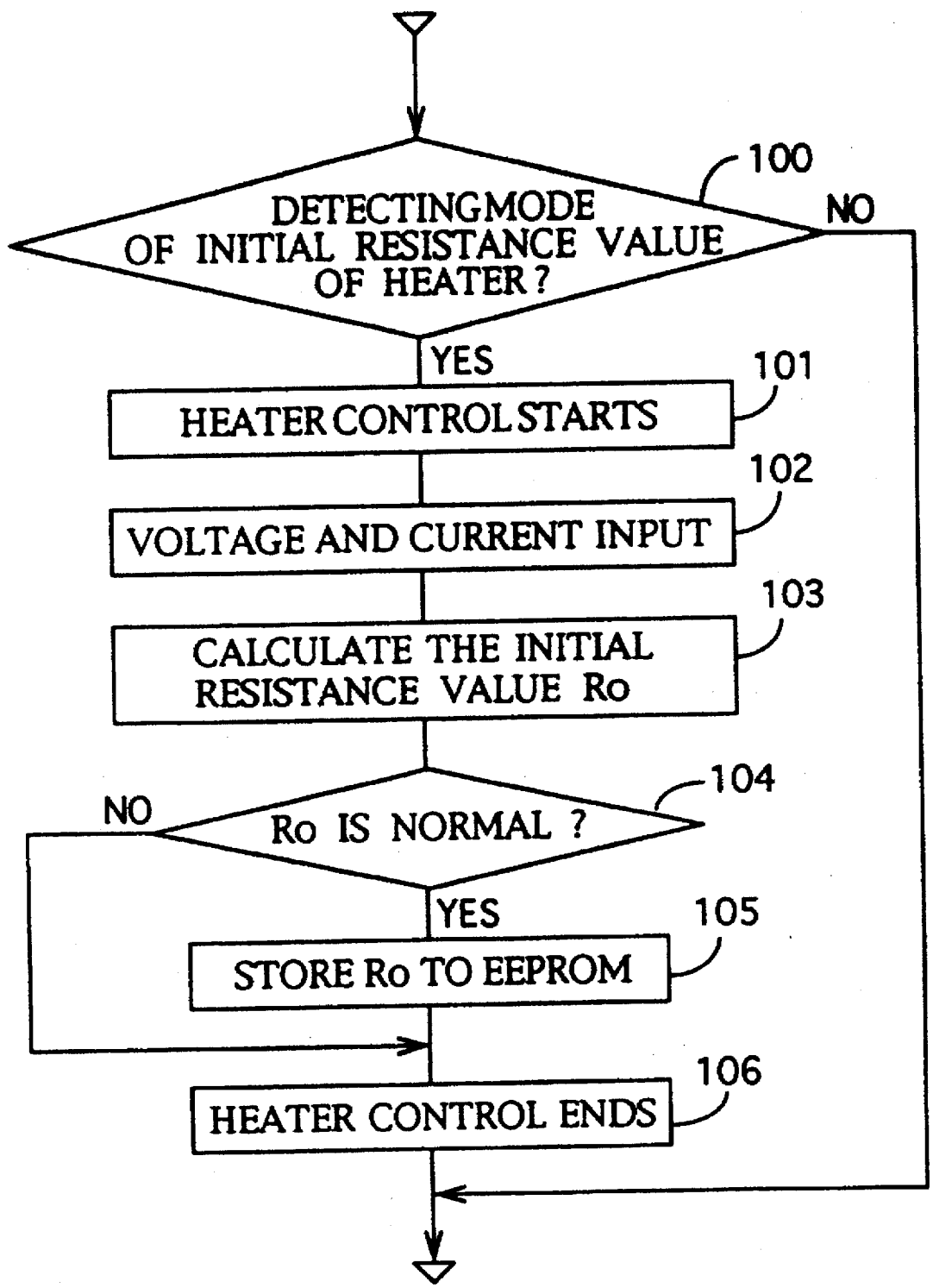
FIG. 42 is a flow chart showing the heater testing subroutine employed by the exhaust gas purifier of the embodiment 16.

FIG. 42 shows the routine detecting the initial resistance of the heater 11. Initially, at the step 100, it is judged whether the switch 200 closes or opens. If the switch 200 closes, the routine executes to detect the initial resistance of the heater 11. If the switch 200 opens, the CPU 8 does not operate this routine. Normally, the switch 200 is turned on when a new heater 11 is disposed.

At the step 101, the CPU 8 outputs a heater driving signal to the semiconductor switching device 56a for supplying the predetermined constant power to the heater 11.

At the next step 102, the CPU 8 reads the output signal of the differential amplifier 160 via the A/D converter 170 as the voltage supplied to the heater 11. Similarly, the CPU 8 reads the output signal of the current sensor 59 via the A/D converter 170 as a normal current supplied to the heater 11.

At the step 103, the initial resistance value Ro of the heater 11 is calculated by dividing the applied voltage by the normal current.

At the next step 104, if the initial resistance value Ro is within the predetermined range, it is memorized into the EEPROM 190 at the step 105.

Then, at the step 106, the power supplied to the, heater 11 is cut off and the routine ends.

Figure 43:
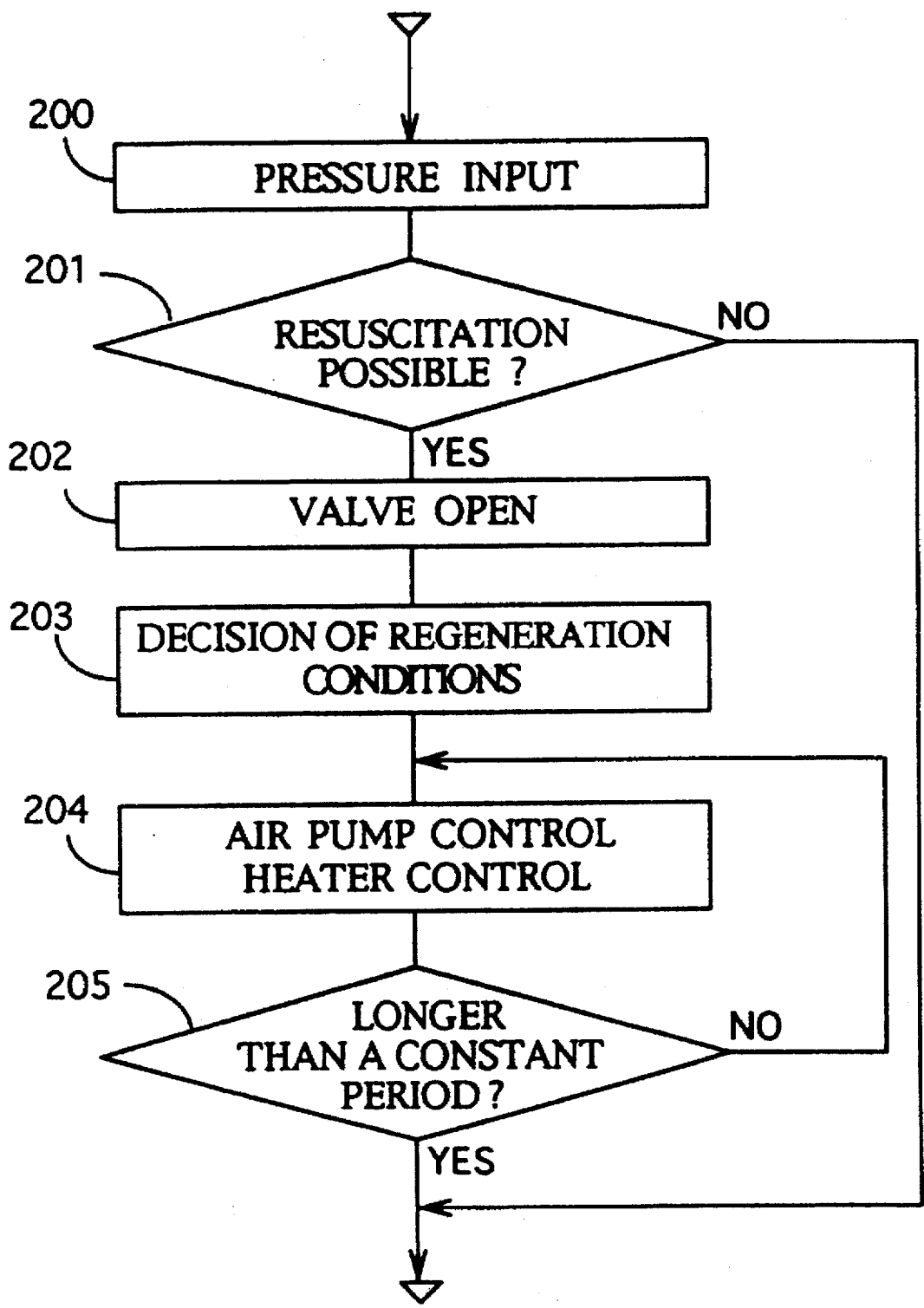
FIG. 43 is a flow chart illustrating part of the operation of the CPU after replacing the heater employed in the embodiment 16 of the exhaust gas purifier.

FIG. 43 shows the routine which is executing after exchanging the heater 11. Initially, at the step 200, the pressure signals of the pressure sensors 7 and 17 are inputted into the CPU 8 when the diesel engine 20 is driven.

At the next step 201, a pressure loss of the filter 2 is detected and the weight of the collected particulates in the filter is calculated in accordance with the pressure loss. Then, it is judged whether the regeneration operation should start in accordance with the weight of the collected particulates or not. If the weight of the collected particulates is enough value to start the operation, the regeneration of the filter 2 should start under suspending the diesel engine 20.

In the regeneration of the filter 2, at the step 202, the electromagnetic valve 14 is opened.

At the next step 203, the regeneration conditions for operating the regeneration of the exhaust gas purifier 40 is determined. In the present embodiment, the predetermined value of the air flow rate of the air pump 13a and the predetermined power value supplied to the heater 11 are determined.

At the next step 204, the air flow rate of the air pump 13a is controlled by the semiconductor switching device 55a which is operated by the duty ratio controlling method. The heater 11 is controlled by the semiconductor switching device 56a which is operated by the duty ratio controlling method. Therefore, both of the air flow rate of the air pump 13a and the generated heat quantity of the heater 11 are kept individually to the predetermined value. Then, the particulates collected in the filter 2 are ignited by the heater 11 and the regeneration is executed.

At the next step 205, it is judged whether the regeneration operation has ended or not, namely whether the time from the starting of the regeneration operation is longer than the predetermined period or not. If the regeneration operation has not ended, the routine returns to the step 204. If the regeneration operation has ended, the routine goes on to end.

Figure 44:
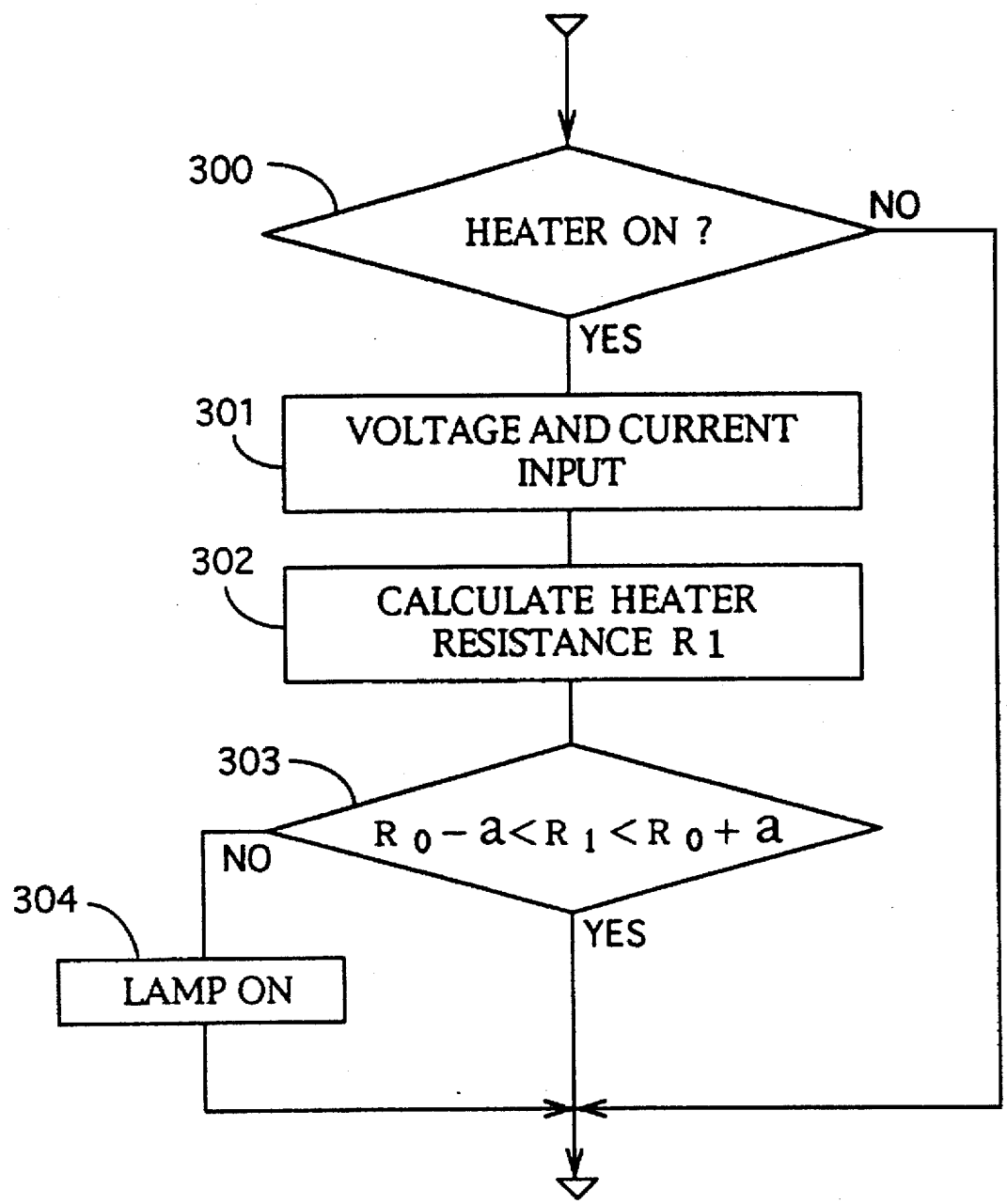
FIG. 44 is a flow chart illustrating another part of the operation of the CPU after replacing the heater employed in the embodiment 16 of the exhaust gas purifier.

FIG. 44 shows the routine which detects abnormal states of the heater 11.

Initially, at the step 300, it is judged whether the power has been supplied to the heater 11 or not. If the power has been supplied to the heater 11, the routine goes to the step 301.

At the next step 301, the CPU 8 receives the output signals from the differential amplifier 160 as an applied voltage to the heater 11 via the A/D converter 170. Similarly, the CPU 8 receives the output signals of the current sensor 59 as the value of the supplied current on the heater 11 via the A/D converter 170.

At the step 302, the resistance value R1 of the heater 11 is calculated by dividing the applied voltage by the supplied current.

At the next step 303, the resistance value R1 is compared with the initial resistance value R0. If the absolute value of the difference between both resistance is greater than a predetermined constant value RX, the lamp 9 is turned on at the step 304.

As mentioned above, in the present embodiment, the filter 2 for collecting the particulates is disposed in the exhaust tube and the heater 11 comprises the end surface of the filter 2. Further, the resistance detecting means comprises of the differential amplifier 160, the current sensor 59 and the A/D converter 170. The CPU 8 calculates the initial resistance R0 of the heater 11 and the initial resistance Ro is memorized in the EEPROM 190.

Further, the CPU 8 compares the resistance R1 of the heater 11 with the initial resistance R0.

Therefore, in the present embodiment, the malfunction of the heater can be detected correctly and simply. Further, the resistance R1 and the initial resistance R0 are detected by the same apparatus which comprises the differential amplifier 160, the current sensor 59 and the A/D converter 170 as shown in FIG. 41. Accordingly, the error is prevented by employing the same detecting means.

Further, each heater has a different initial resistance value but the initial resistance value is calculated and memorized in the EEPROM 190. Further, if the abnormal value of the resistance of the heater 11 is detected, the regeneration operation is quitted.

EMBODIMENT 17

FIGS. 45–51 illustrate the embodiment 17.

The present embodiment decreases the errors of the CPU (not shown in FIG. 45) in the controller 8. The exhaust purifier shown in FIG. 45 is similar to the exhaust purifier shown in FIG. 1.

Figure 45:
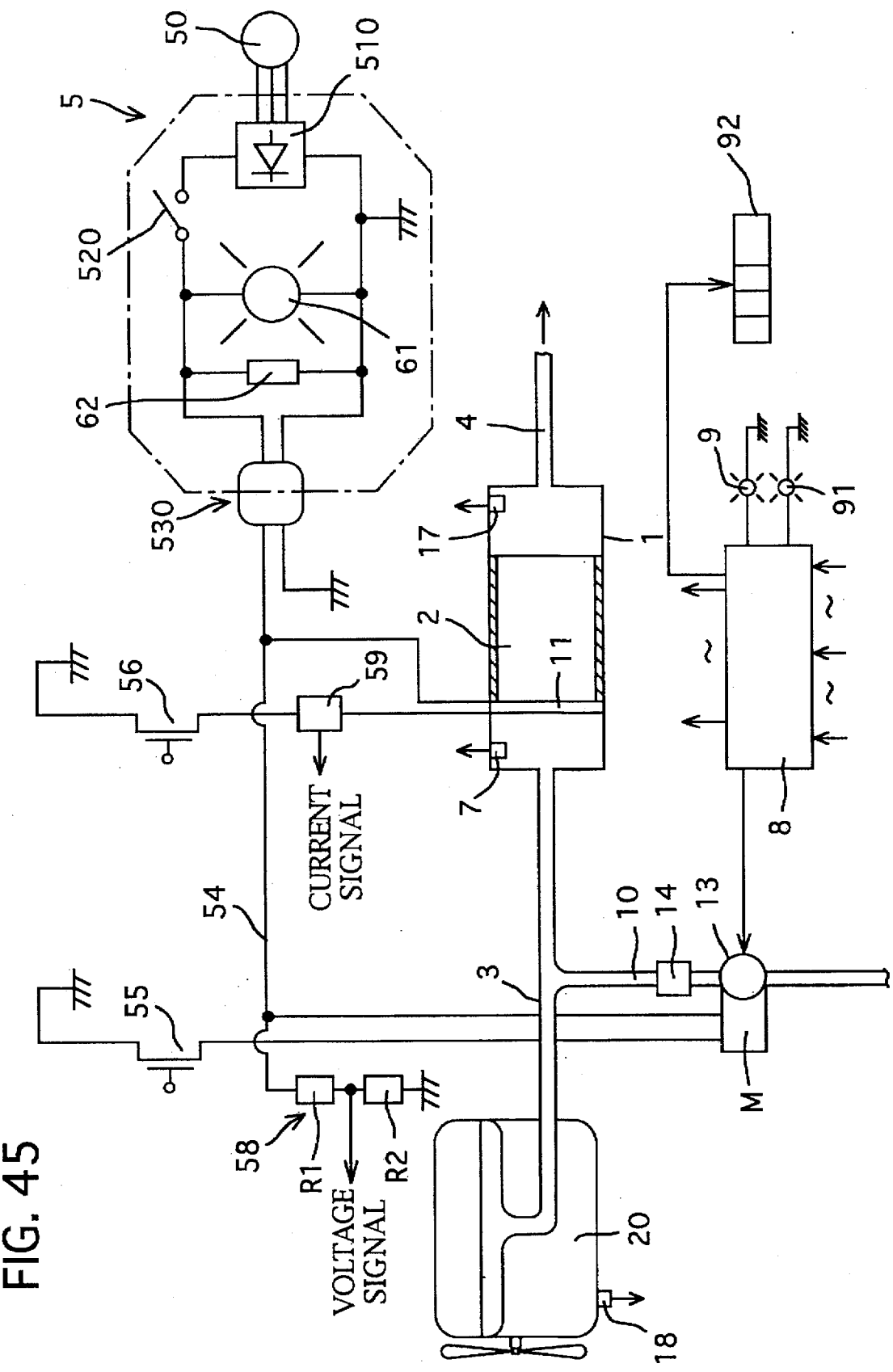
FIG. 45 is a block diagram showing the exhaust gas purifier of the embodiment 17.

However, the outer power source 5 in FIG. 45 has the rectifier 510 rectifying three phase alternative voltages of 200 V to a direct voltage of 24 V. The high potential output terminal of the rectifier 510 is connected to the high level line 54 of the exhaust gas purifier via the magnet switch 520 and the connector 530. A low potential output terminal of the rectifier 510 is connected to the earth.

The output terminal of the magnet switch 520 is connected to the earth via the power indication lamp 61 and the assistant resistance 62.

The high level line 54 supplies the power to the high potential terminal of the heater 11 and the blower motor M. The low potential terminal of the heater 11 is connected to the earth via the relay switch 56. The low potential terminal of the blower motor M is contacted to the earth via the relay switch 55.

Further, the voltage of the high level line 54 is divided by the divider 58 which consists of the resistances R1, R2 connected in series. The divider 58 outputs the divided voltage to a micro computer via the A/D converter. The micro computer and the A/D converter are integrated into the controller 8 but not shown in FIG. 45.

Figure 46:
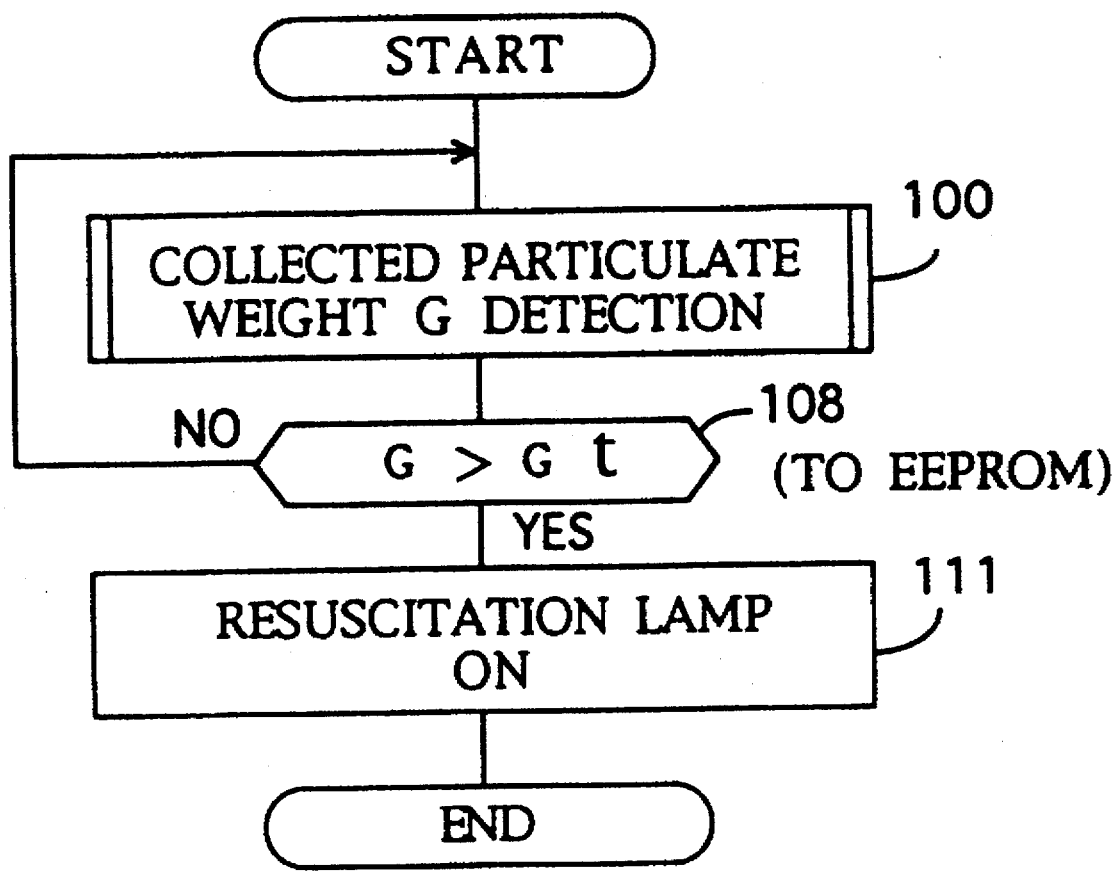
FIG. 46 is a flow chart showing the regeneration operation timing decision subroutine employed by the exhaust gas purifier of the embodiment 17.

Next, a regeneration timing judgment subroutine for the filter 2 is shown in FIG. 46.

The regeneration timing judgment subroutine is started with the starting of the engine 20. At the step 100, the exhaust pressures P1, P2 detected by the pressure sensors 7, 17 and the rotation speed n detected by the rotation speed sensor 18 are outputted to the controller 8. Then, the weight G of the collected particulates is searched by using a map in which the parameters P1, P2 and n are inputted.

At the next step 108, it is judged whether the searched weight G is heavier than the predetermined threshold value Gt or not. If G is not heavier than Gt, the routine returns to the step 100. If G is heavier than Gt, the routine goes on to the step 111. At the next step 111, the routine turns the lamp 91 on and ends.

Next, the filter regeneration operation subroutine based on FIGS. 47–50 is described.

The present regeneration operation subroutine starts when the voltage of the car battery (not shown) is applied to the controller 8. It is judged before going on to the step 200 whether the engine 20 is running or not. In this case, if the engine 20 is running the routine waits until stopping. If the engine 20 is not running, the routine goes on to the step 200.

Initially, at the step 200, the controller 8 is reset and the inner state of the controller 8 becomes an initial stage.

Next, a stage of regeneration operation, which is memorized in a non-volatile memory, stored in the controller 8 is indicated by the stage indication lamp 92 which is the stage indication means.

In the present embodiment the non-volatile memory consists of 2 bit EEPROM.

Further, the data "00" memorized in the EEPROM indicates a completion stage of the regeneration operation. The data "01" memorized in the EEPROM indicates a pre-heating stage. The data "10" memorized in the EEPROM indicates a burning stage. The data "11" memorized in the EEPROM indicates an after-burning stage.

At the next step 202, it is judged whether the current data of EEPROM is "00" or not. If the data is not "00", the routine goes on to the step 204. At the step 204, the regeneration stop lamp (not shown) is turned on and the routine goes on to the step 206 because a previous regeneration operation had been interrupted. If the data is "00", the routine goes on to the step 206. The previous regeneration operation had ended completely. At the next step 206, the operator shall turn the regeneration start switch (not shown) on when the indication of the lamp 92 or the regeneration stop lamp indicates it. At the step 208, it is judged whether the previous regeneration operation had been broken in accordance with the data memorized in the EEPROM or not. If the regeneration operation ends completely (the data is "00"), the routine goes on to the step 220. If the previous regeneration operation is broken off (the data is not "00"), the routine goes on to the step 210.

Figure 49:
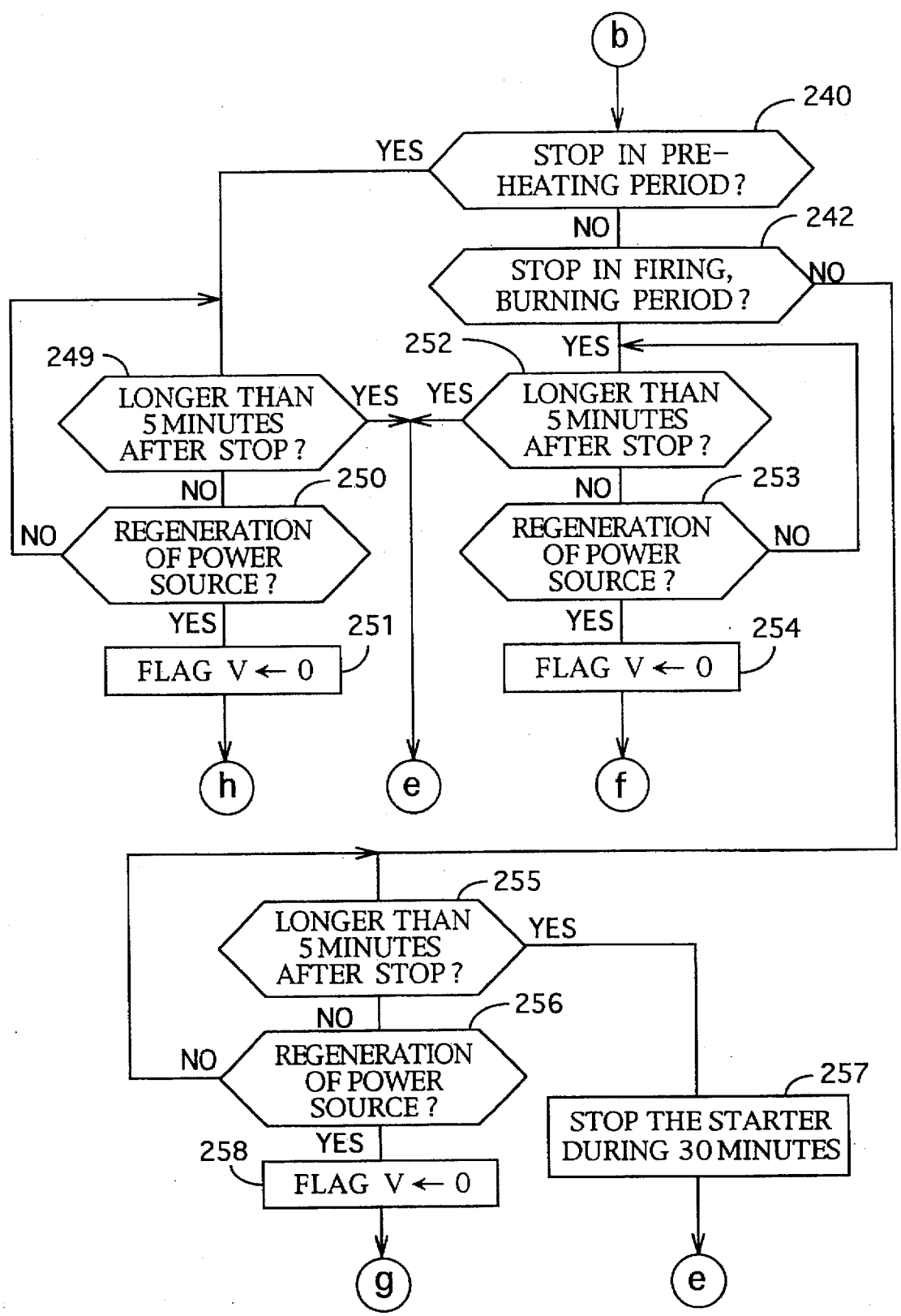
FIG. 49 is a continuation of the flow chart of FIG. 47 showing the regeneration operation employed by the exhaust gas purifier of the embodiment 17.

At the step 210, it is judged whether the previous regeneration break had occurred on account of the cutting off of the power supplied to the high level line 54 from the outer power source 5 or not in accordance with the power drop flag V shown in FIG. 49. If the flag V is "1", it is judged that power is cut off in the previous regeneration operation.

If the flag V is "0", it is judged that the previous regeneration break had occurred and the routine goes on to the step 212 as the noise drop. The noise drop means that the controller 8 is reset at the initial state by the noise power invading the controller 8, for example electromagnetic noise.

If the flag V is "1", the routine goes on to the step 240 as the power drop.

At the next step 214, it is judged whether N is greater than 4 or not. If N is not greater than 4, the routine goes on to the step 240 and the regeneration operation is executed again.

If N is greater than 4, the alarm lamp 9 is turned on in order to indicate the occurrence of the electrical or electronic trouble. Then, the routine ends.

Figure 50:
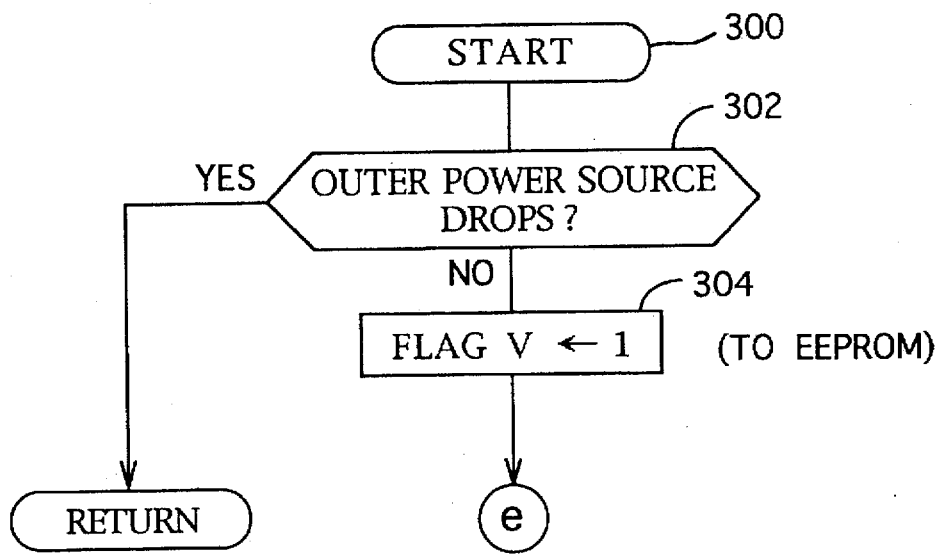
FIG. 50 is a continuation of the flow chart of FIG. 47 showing the regeneration operation employed by the exhaust gas purifier of the embodiment 17.

FIG. 50 shows a searching routine to find the cause of regeneration operation break.

The searching routine is executed at each constant interval. Initially, at the step 302, it is judged whether the inputted voltage supplied by the voltage divider 58 is greater than a standard voltage or not. If the voltage is greater than the standard voltage, it is judged that the power supplied to the switches 55 and 56 is normal. Then the routine goes on to the main routine. Else if the voltage is not greater than the standard voltage, it is judged that the power drop had occurred.

Therefore, the flag V is set to "1" and it is memorized in the EEPROM at the step 304. Then the routine goes on to the step 216.

Figure 48:
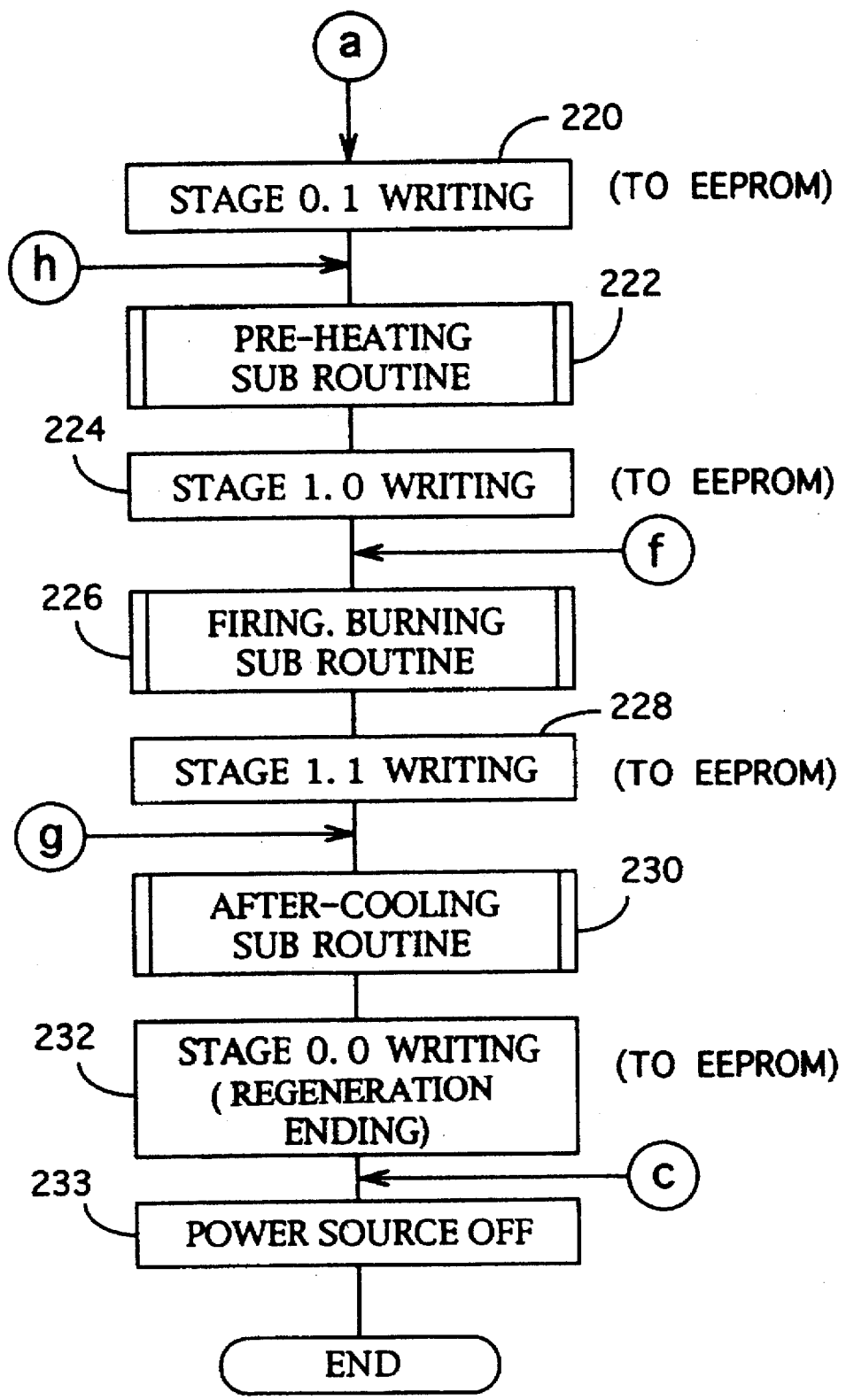
FIG. 48 is a continuation of the flow chart of FIG. 47 showing the regeneration operation employed by the exhaust gas purifier of the embodiment 17.

When it is judged that the regeneration operation ended completely at the step 208, the following burning control subroutine shown in FIG. 48 is executed.

Initially, at the step 220, the stage "01" (a pre-heating stage) is memorized into the EEPROM.

At the next step 222, the pre-heating subroutine is executed. After the pre-heating subroutine, the stage "10" (a burning stage) is memorized into the EEPROM at the step 224.

At the next step 226, the firing and burning subroutine is executed.

After the firing and burning subroutine, the stage "11" (the after-cooling stage) is memorized into the EEPROM at the step 228. Then, the after-cooling subroutine is executed at the step 230 and the stage "00" (the regeneration completion) is memorized into the EEPROM at the next step 232. Then, the power supplied to the controller 8 is cut off at the step 233 and the routine ends.

The above mentioned pre-heating subroutine, the firing and burning subroutine and the after-cooling subroutine are described in the foregoing embodiments.

The pre-heating subroutine executes the supply of the pre-heating power to the heater 11 for the predetermined time Tb when the predetermined time Ta (1 minute in the present embodiment) had passed after the blower 13 had been driven. The firing and burning subroutine executes the supply of the power to the heater 11 for the predetermined time Td after the supply of the pre-heating power had ended.

The after-cooling subroutine executes the cutting off of the power supply after the firing and burning subroutine and drives the b, lower for the predetermined time Te.

FIG. 49 shows the regeneration operation after the regeneration operation break had occurred.

Initially, at the step 240, it is judged whether the break had occurred in the pre-heating period in accordance with the memorized stage of the EEPROM or not.

If the break occurs in the pre-heating period (namely the stage "01"), it is judged whether the breaking time is longer than 5 minutes after the break or not, at the step 249. If the breaking time is not longer than 5 minutes, it is judged whether the power supply had been recovered at the step 250 or not.

If the power supply is not recovered within 5 minutes, the routine returns to the step 249. Else if the power supply is recovered within 5 minutes after the break, the flag V is reset to "0" at the step 251. Further, the routine goes to the step 222 and the pre-heating operation is executed again.

If the power supply is not recovered within 5 minutes at the step 249, the alarm lamp 9 is turned on. The alarm lamp 9 indicates the restart of the regeneration operation to the operator at the step 216 and the routine ends.

If the break of the regeneration operation does not occur at the step 240, it is judged whether the break had occurred in the firing or burning period (namely the stage 10) at the step 242 or not.

If the break occurs in the firing or burning period, it is judged whether the breaking time has passed more than 5 minutes after the break at the step 252 or not. If the breaking time is not longer than 5 minutes (namely within 5 minutes), it is judged whether the power supply is recovered at the step 253 or not.

If the power supply is not recovered, the routine returns at the step 252. If the power is recovered within 5 minutes after the break, the flag V is reset to "0" at the step 254. Further, the routine goes to the step 226 and the firing and burning period is executed again.

If the power supply is not recovered within 5 minutes, the alarm lamp 9 is turned on. The alarm lamp 9 indicates the restart of the operation to the operator at the step 216 and the routine ends.

At the step 242, if the break does not occur in the firing and burning period, it is judged that the break had occurred in the after-cooling period (namely stage 11). Therefore, at the step 255, it is judged whether the time has passed more than 5 minutes after the break or not.

If the time does not pass more than 5 minutes after the break (namely within 5 minutes), it is judged whether the power supply has recovered at the step 256 or not.

If the power supply does not recover at the step 256, the routine returns to the step 255. If the power recover within 5 minutes after the break, the flag V is reset to "0" at the step 258. Further, the routine goes to the step 230 and the after cooling operation is executed again.

If the power supply is not recovered within 5 minutes, the filter 2 is too hot to start the engine. Therefore, the controller 8 inhibits the power supply to a starter (not shown) of the engine at the step 257. Then, the routine goes on to the step 216.

In the above embodiment, if the power supply is recovered within 5 minutes after the break in the firing and burning operation, the firing and the burning operation is executed from the beginning.

However, in the present embodiment, the firing and burning operation (the firing and burning period, the stage 10) is divided into sub-stages, for example, 5 sub-stages, which have the sub-stage number individually. Further, if the power supply is recovered within 5 minutes after the break in the firing and burning operation, the firing and the burning operation is executed from the sub-stage in which the break had occurred. The number of sub-stage, in which the break had occurred is memorized in the EEPROM.

Naturally, the regeneration operation can start again from the sub-stage which is the previous sub-stage of the broken sub-stage.

Further, it is possible to divide the regeneration operation into sub-stages more than 5 sub-stages.

The feature of the present embodiment is described as follows.

In the present embodiment, the power supplied to the heater and blower is controlled in accordance with a predetermined sequence.

The controller 8 has the EEPROM and the indicating means including the alarm lamp 9. A regeneration executing signal which is the stage number in the present embodiment is memorized into the EEPROM during the executing the regeneration.

The regeneration executing signal is erased after the end of the regeneration operation. The indicating means indicates and alarms some information related to the memorized data in the EEPROM before starting the regeneration operation.

Therefore, when the break of the regeneration operation occurs in the period executing the regeneration operation and the regeneration operation executes again, the operator will know that the break of the regeneration operation has occurred by the regeneration executing signal, for example stage number.

Further, in the present embodiment, the controller 8 judges that the break has occurred when the EEPROM holds the regeneration executing signal at the starting of the regeneration operation.

Accordingly, the controller 8 recognizes the occurring of the break at start of the regeneration operation and can select a appropriate operation to decrease influences of the break.

Further, in the present embodiment, the EEPROM memorizes the stages of the regeneration operation sequentially.

Accordingly, the operator recognize the stage of the break and select the appropriate action in accordance with the indicating stage.

Further, in the present embodiment, the outer power source supplies the power to the heater and to the blower and the car battery supplies the power to the controller 8. The controller 8 detects the breaking of the power supply from the outer power source and quits the sequence (routine) controlling the regeneration operation.

EMBODIMENT 18

Figure 51:
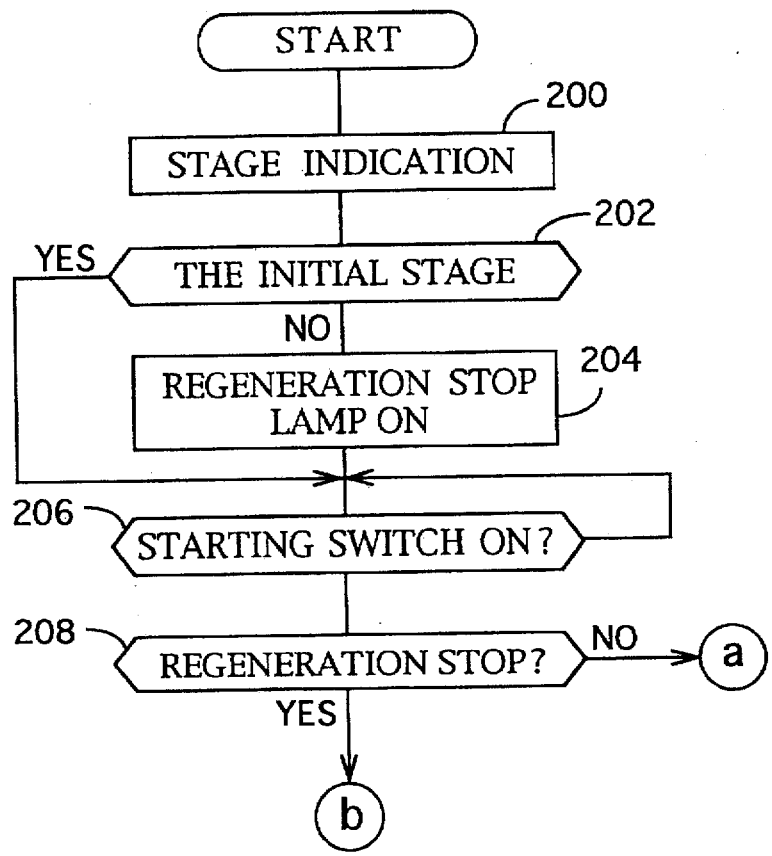
FIG. 51 is a flow chart showing the regeneration operation employed by the exhaust gas purifier of the embodiment 18.

FIG. 51 illustrates the embodiment 18.

A flow chart illustrating in the FIG. 51 shows the embodiment that the power is supplied to the controller 8 by the outer power source 5.

Figure 47:
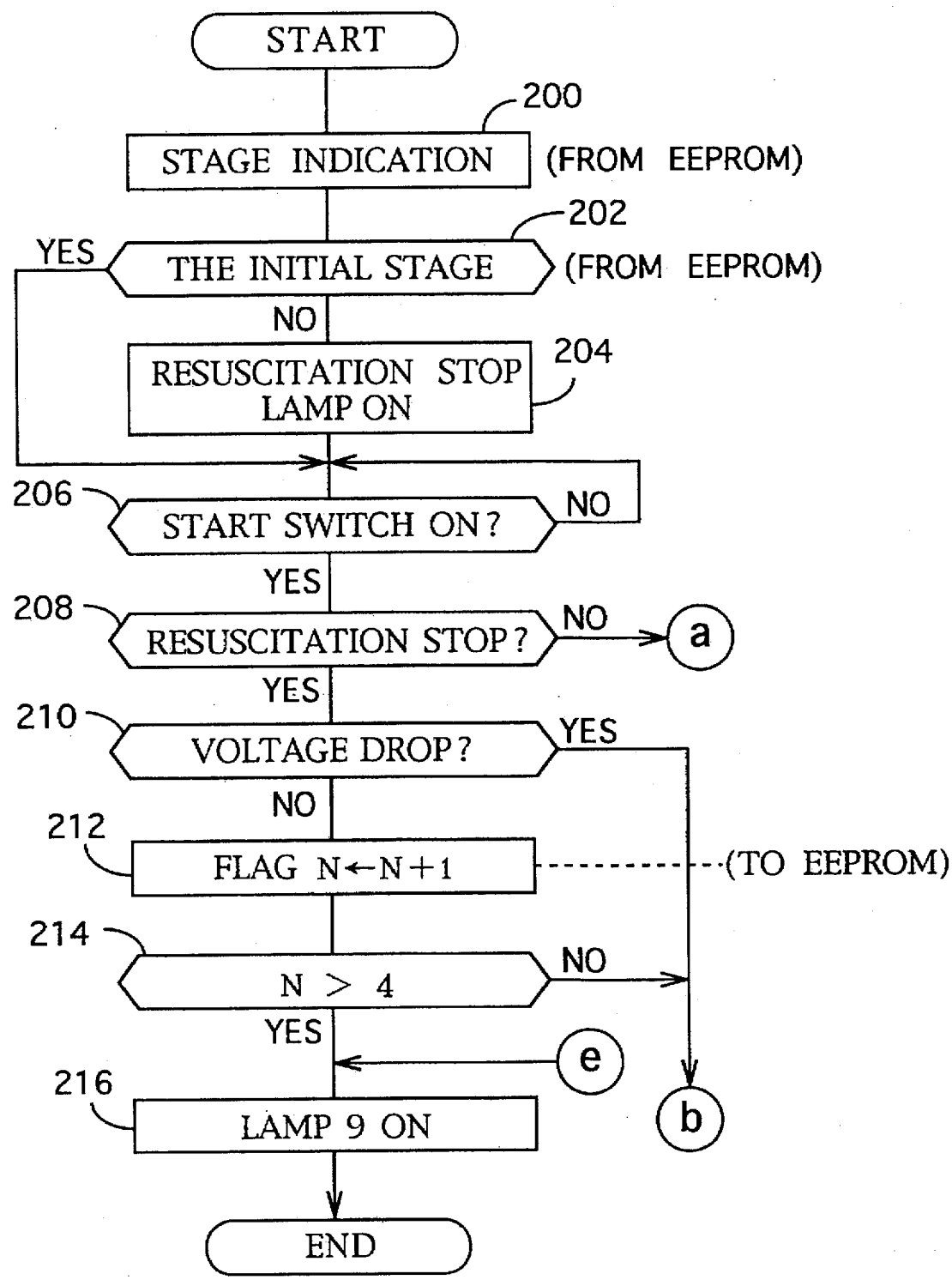
FIG. 47 is a first portion of a flow chart showing the regeneration operation employed by the exhaust gas purifier of the embodiment 17.

FIG. 51 is similar to the FIG. 47 fundamentally. However, the routine showing in FIG. 51 does not have the steps 210–216 of the routine shown in FIG. 47.

Further, in the present embodiment, the flag V is not reset to "0" and the routine shown in FIG. 50 is abbreviated.

Accordingly, the operation goes on to the same routine after the break on account of the noise drop and the break on account of the power drop.

Therefore, it can be prevented that the sequence in the controller goes on.

What is claimed is:

1. An exhaust gas purifier comprising:

a filter placed in an exhaust tube of a diesel engine collect particulates discharged by said diesel engine;

air supply means driven by electric power so as to supply air to said exhaust tube at a point between said engine and said filter;

heating means placed in said exhaust tube in proximity to an upstream end of said filter; and control means for controlling the supply of heating power to said heating means, and for controlling the air flow rate of said air supply means;

wherein said control means, during a period of regeneration of said filter, changes said air flow rate in accordance with a predetermined pattern by controlling said air supply means and said heating means after initiating combustion of said particulates, said control means being constructed to maintain a sufficiently slow burning longitudinal propagation speed at a center portion in a radial direction in a downstream portion of said filter during a predetermined period to encourage burning propagation radially outward by supplying a reduced volume of said air, and to change said burning propagation speed at said center portion into a sufficiently high longitudinal propagation speed before the burning area reaches an end surface of a downstream portion of said filter by increasing said air flow rate to complete burning in the longitudinal direction.

2. An exhaust gas purifier according to claim 1, wherein said control means is constructed to change said air flow rate in accordance with a predetermined pattern after ending said supply of heating power to said heating means.

3. An exhaust gas purifier according to claim 1, wherein said control means is constructed to maintain said slow burning propagation speed during a burning period and to maintain said high burning propagation speed during a first blowing period occurring after said burning period.

4. An exhaust gas purifier according to claim 3, wherein said control means is constructed to reduce said supply of heating power during said first air blowing period.

5. An exhaust gas purifier according to claim 3, wherein said control means is constructed to increase said air flow rate during a second blowing period occurring after said first blowing period in order to cool said filter.

6. An exhaust gas purifier according to claim 3, wherein said control means is constructed to effect an increased air flow rate during a pre-heating period relative to said air flow rate during said burning period.

7. An exhaust gas purifier according to claim 6, wherein said control means is constructed to decrease the supply of said heating power during a pre-heating period relative to said supply of heating power during said burning period.

8. An exhaust gas purifier according to claim 6, further comprising an air flow rate detecting means for detecting said air flow rate, wherein said control means is constructed to control said supply of heating power in accordance with said air flow rate and to heat said particulates during a pre-heating period occurring before start of combustion of said particulates.

9. An exhaust gas purifier according to claim 6, further comprising air flow rate detecting means for detecting said air flow rate, wherein said control means is constructed to control said air flow rate to maintain said air flow rate at a predetermined value.

10. An exhaust gas purifier according to claim 6, further comprising air temperature detecting means for detecting air temperature, wherein said control means is constructed to control the volume of air supplied by said air supply means in accordance with said air temperature and said air flow rate in order to maintain air mass flow at a predetermined value.

11. An exhaust gas purifier according to claim 6, further comprising air pressure detecting means for detecting air pressure, wherein said control means is constructed to control the volume of air supplied by said air supply means in accordance with said air pressure and said air flow rate in order to maintain air mass flow at a predetermined value.

12. An exhaust gas purifier according to claim 3, wherein said control means is constructed to decrease the supply of said heating power during a pre-heating period relative to said supply of heating power during said burning period.

13. An exhaust gas purifier according to claim 3, further comprising air flow rate detecting means for detecting said air flow rate, wherein said control means is constructed to control said supply of heating power in accordance with said air flow rate and to heat said particulates during a pre-heating period occurring before start of combustion of said particulates.

14. An exhaust gas purifier according to claim 3, further comprising air flow rate detecting means for detecting said air flow rate, wherein said control means is constructed to control said air flow rate to maintain said air flow rate at a predetermined value.

15. An exhaust gas purifier according to claim 3, further comprising air temperature detecting means for detecting air temperature, wherein said control means is constructed to control the volume of air supplied by said air supply means in accordance with said air temperature and said air flow rate in order to maintain air mass flow at a predetermined value.

16. An exhaust gas purifier according to claim 3, further comprising air pressure detecting means for detecting air pressure, wherein said control means is constructed to control the volume of air supplied by said air supply means in accordance with said air pressure and said air flow rate in order to maintain air mass flow at a predetermined value.

17. An exhaust gas purifier according to claim 3, wherein said control means is constructed to establish a pre-cooling period for cooling said filter by feeding air at a predetermined flow rate by said air supply means before starting said supply of heating power.

18. An exhaust gas purifier according to claim 3, wherein said control means is constructed to establish a pre-cooling period for cooling said filter by feeding air at a predetermined flow rate by said air supply means before starting said supply of heating power.

19. An exhaust gas purifier according to claim 1, wherein said control means is constructed to decrease the supply of said heating power during a pre-heating period relative to said supply of heating power during said burning period.

20. An exhaust gas purifier according to claim 1, further comprising an air flow rate detecting means for detecting said air flow rate, wherein said control means is constructed to control said supply of heating power in accordance with said air flow rate and to heat said particulates during a pre-heating period occurring before start of combustion of said particulates.

21. An exhaust gas purifier according to claim 1, further comprising air flow rate detecting means for detecting said air flow rate, wherein said control means is constructed to control said air flow rate to maintain said air flow rate at a predetermined value.

22. An exhaust gas purifier according to claim 1, further comprising air temperature detecting means for detecting air temperature, wherein said control means is constructed to control the volume of air supplied by said air supply means in accordance with said air temperature and said air flow rate in order to maintain air mass flow at a predetermined value.

23. An exhaust gas purifier according to claim 1, further comprising air pressure detecting means for detecting air pressure, wherein said control means is constructed to control the volume of air supplied by said air supply means in accordance with said air pressure and an air flow rate in order to maintain air mass flow at a predetermined value.

24. An exhaust gas purifier according to claim 1, wherein said control means is constructed to establish a pre-cooling period for cooling said filter by feeding air at a predetermined flow rate by said air supply means before starting said supply of heating power.

25. An exhaust gas purifier comprising:
a filter made of ceramic and placed in an exhaust tube of a diesel engine so as to collect particulates exhausted by said diesel engine;
air supply means driven by electric power so as to supply air into an upstream portion of said exhaust tube;
heating means placed in said exhaust tube between said engine and said filter in proximity to said filter so as to fire said particulates; and
control means for controlling heating power supplied to said heating means, and for controlling the flow rate of said air supply means so as to fire and burn said particulates sequentially from said upstream side of said filter to the downstream side of said filter;
wherein said control means is constructed that, during a period of regeneration of said filter, said control means changes said air flow rate in accordance with a predetermined pattern by controlling said air supply means and said heating means after initiating combustion of said particulates said control means being constructed such that said predetermined pattern comprises a burning stage, and a first blowing stage carried out just after said burning stage, said burning stage has a predetermined period in which said heating means and said air supply means are driven, said first blowing stage has a predetermined period in which said air supply means is driven, and said air flow rate supplied in said first blowing stage is greater than said air flow rate supplied in said burning stage.

26. An exhaust gas purifier according to claim 25, wherein said control means is constructed such that said first blowing stage is shorter than said burning stage.

27. An exhaust gas purifier according to claim 25, wherein said control means is constructed such that said heating power supplied in said first blowing stage is less than said heating power supplied in said burning stage.

28. An exhaust gas purifier according to claim 25, wherein said control means is constructed such that said predetermined pattern comprises a second blowing stage carried out just after said first blowing stage, and said air flow rate supplied in said second blowing stage is greater than said air flow rate supplied in said first blowing stage.

29. An exhaust gas purifier according to claim 25, further comprising air flow rate detection means and a temperature detection means for detecting air flow rate and a temperature supplied to said filter, respectively, said control means is constructed to calculate the air mass flow supplied to said filter in accordance with said detected air flow rate and said detected temperature, said control means is constructed to decrease said air flow rate supplied to said filter if said calculated air mass flow is greater than a predetermined value, and said control means is constructed to increase said air flow rate supplied to said filter if said calculated air mass flow is less than said predetermined value.

30. An exhaust gas purifier according to claim 29, further comprising air pressure detecting means for detecting the pressure of air supplied to said filter, and said control means is constructed to calculate said air mass flow supplied to said filter in accordance with said detected air flow rate, said detected temperature and said detected pressure.

31. An exhaust gas purifier according to claim 25, wherein said control means is constructed such that said pattern comprises a pre-cooling stage having a predetermined period occurring before supplying of said heating power to said heater, and said air supply means is driven during said predetermined period so as to cool said filter.

32. An exhaust gas purifier comprising:
a filter made of ceramic and placed in an exhaust tube of a diesel engine so as to collect particulates exhausted by said diesel engine;
air supply means driven by electric power so as to supply air into an upstream portion of said exhaust tube;
heating means placed in said exhaust tube between said engine and said filter in proximity to said filter so as to fire said particulates; and
control means for controlling heating power supplied to said heating means, and for controlling the flow rate of said air supply means so as to fire and burn said particulates sequentially from said upstream side of said filter to the downstream side of said filter;
wherein said control means is constructed that, during a period of regeneration of said filter, said control means changes said air flow rate in accordance with a predetermined pattern by controlling said air supply means and said heating means after initiating combustion of said particulates, said control means being constructed such that said predetermined pattern comprises a pre-heating stage and a burning stage carried out after said pre-heating stage, each of said pre-heating stage and said burning stage has a predetermined period in which said heating means and said air supply means are driven, and said air flow rate supplied in said pre-heating stage is greater than said air flow rate supplied in said burning stage.

33. An exhaust gas purifier according to claim 32, wherein said control means is constructed such that said heating power supplied in said pre-heating stage is less than said heating power supplied in said burning stage.

34. An exhaust gas purifier according to claim 33, further comprising air flow rate detection means for detecting the air flow rate supplied to said filter, and said control means is constructed such that said heating power supplied in said pre-heating stage is increased when said detected air flow rate is increased and said heating power supplied in said pre-heating stage is decreased when said detected air flow is decreased.

* * * * *

UNITED STATES PATENT AND TRADEMARK OFFICE
CERTIFICATE OF CORRECTION

PATENT NO. : 5,716,586
DATED : February 10, 1998
INVENTOR(S) : H. Taniguchi

It is certified that error appears in the above-identified patent and that said Letters Patent is hereby corrected as shown below:

IN THE ABSTRACT:

Line 9, after "filter." "The burning" should read as a new paragraph.

Col. 1, line 61, before "power" insert --heating--;

Col. 5, line 62, change "shows" to --show--;

Col. 6, cancel line 52;

Col. 13, line 1, cancel "0";

Col. 19, line 50, after "has" cancel the "commas"--;

Col. 21, line 4, after "by" cancel the "commas"--;

Col. 21, line 18, after "in" cancel the "commas"--;

Col. 21, line 46, after "Else" cancel the "commas"--;

UNITED STATES PATENT AND TRADEMARK OFFICE
CERTIFICATE OF CORRECTION

PATENT NO. : 5,716,586
DATED : February 10, 1998
INVENTOR(S) : H. Taniguchi

It is certified that error appears in the above-identified patent and that said Letters Patent is hereby corrected as shown below:

Col. 23, line 47, after "circuit" insert --600--;

Col. 24, line 20, after "to" cancel the "commas"--;

Col. 24, line 55, after "the" cancel the "commas"--;

Col. 25, line 5, after "able" cancel the "commas"--;

Col. 25, line 55, after "drop" cancel the "commas"--;

Col. 26, line 42, after "pump" cancel the "commas"--;

Col. 27, line 14, after "sensor" cancel the "commas"

Col. 27, line 50, after "the" cancel the "commas"--;

Col. 29, line 58, after "embodiment" insert a comma (,);

Col. 31, line 16, change "b.lower" to --blower--;

UNITED STATES PATENT AND TRADEMARK OFFICE
CERTIFICATE OF CORRECTION

PATENT NO. : 5,716,586
DATED : February 10, 1998
INVENTOR(S) : H. Taniguchi

It is certified that error appears in the above-identified patent and that said Letters Patent is hereby corrected as shown below:

Col. 32, line 21, after "stage" cancel the "commas"--;

Col. 33, line 20, after "engine" insert --to--;

Signed and Sealed this

First Day of September, 1998

BRUCE LEHMAN

Attest:

Attesting Officer

Commissioner of Patents and Trademarks